(12) United States Patent
Hosotsubo

(10) Patent No.: US 8,171,398 B2
(45) Date of Patent: May 1, 2012

(54) CONTENT SERVER AND LAYOUT SYSTEM

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1247 days.

(21) Appl. No.: 11/695,914

(22) Filed: Apr. 3, 2007

(65) Prior Publication Data

US 2007/0240039 A1  Oct. 11, 2007

(30) Foreign Application Priority Data

Apr. 5, 2006  (JP) .................................. 2006-104716

(51) Int. Cl.
*G06F 17/24* (2006.01)
(52) U.S. Cl. ...................................................... 715/243
(58) Field of Classification Search .................. 715/243
See application file for complete search history.

(56) References Cited

U.S. PATENT DOCUMENTS

| | | | |
|---|---|---|---|
| 6,009,485 A | 12/1999 | Hosotsubo | 710/100 |
| 7,430,713 B2 * | 9/2008 | Kobashi et al. | 715/244 |
| 7,770,057 B1 * | 8/2010 | Graham et al. | 714/6 |
| 2005/0172224 A1 | 8/2005 | Kobashi et al. | |
| 2005/0216439 A1 | 9/2005 | Kawakita | |
| 2006/0070084 A1 * | 3/2006 | Novik et al. | 719/318 |
| 2006/0288329 A1 * | 12/2006 | Gandhi et al. | 717/114 |

FOREIGN PATENT DOCUMENTS

| | | |
|---|---|---|
| JP | 2005-122728 A | 5/2005 |
| JP | 2005-216174 A | 8/2005 |
| JP | 2006-065677 A | 3/2006 |
| JP | 2006-074225 A | 3/2006 |
| JP | 2006-074226 A | 3/2006 |
| JP | 2006-085402 A | 3/2006 |

OTHER PUBLICATIONS

Dan Brickley et al., "RDF Site Summary (RSS) 1.0," RSS-DEV Working Group, May 30, 2001, pp. 1-15, available at http://web.resource.org/rss/1.0/spec, last accessed Jun. 22, 2010.
M. Nottingham et al., "The Atom Syndication Format draft-ietf-atompub-format-03", RSS-DEV Working Group, Oct. 20, 2004, pp. 1-26, available at http://atompub.org/2004/10/20/draft-ietf-atompub-format-03.html, last accessed Jun. 22, 2010.

* cited by examiner

*Primary Examiner* — Laurie Ries
*Assistant Examiner* — Tionna Smith
(74) *Attorney, Agent, or Firm* — Fitzpatrick, Cella, Harper & Scinto

(57) ABSTRACT

A server system for generating information to be delivered to a client having an RSS reader according to this invention, includes a layout unit configured to execute layout processing of content data acquired from a content server in accordance with template data, a generation unit configured to generate, when an error has occurred in the layout processing by the layout unit, syndication data including link information to data associated with the error, and an information providing unit configured to provide the syndication data generated by the generation unit to the client, and to provide, when an acquisition request of the data designated by the link information included in the syndication data is issued, that data to the request source.

4 Claims, 48 Drawing Sheets

FIG. 21

| VARIABLE DATA / LAYOUT CHECK | | | | ☒ |
|---|---|---|---|---|
| CLICK [START] TO CHECK VARIABLE DATA AND LAYOUT | | | | |
| RECORD NUMBER | CHECK ITEM | NO DATA | OTHER | |

| | PAGE NUMBER | COMMENT | |
|---|---|---|---|

START (S) — 2101
END (C) — 2102

FIG. 22

| VARIABLE DATA / LAYOUT CHECK | | | | ☒ |
|---|---|---|---|---|

CLICK [START] TO CHECK VARIABLE DATA AND LAYOUT

| RECORD NUMBER | CHECK ITEM | NO DATA | OTHER |
|---|---|---|---|
| 1 | 0 | 1 | 0 |
| 4 | 2 | 1 | 1 |
| 6 | 2 | 1 | 0 |

~2203

| | PAGE NUMBER | COMMENT |
|---|---|---|
| ⚠ | 2 | TEXT CANNOT FIT INTO CONTAINER. |
| ⚠ | 2 | IMAGE CANNOT FIT INTO CONTAINER. |
| ⚠ | 2 | NO DATA IN CONTAINER. |

~2204

START (S)  END (C)

| Template ID | Contents Record IDs String | Layout Error String | Data and Time |
|---|---|---|---|
| MITUMORI | 200, 113, 31, 42938, 3187, 98, ... | Pre-Print:0x13127¥nPrint-Page#1:0x13020 0x13 ... | 2005/10/14 13:45:52.385 |
| PRINTER | 113, 87, 8, 1898, 100, 183, 11 ... | Pre-Print:¥nPrint-Page#1:0x13020 0x13022 0x1 ... | 2005/10/15 18:07:23.987 |
| HOUKOKU | 87, 9131, 1389, 57, 450, 6789, ... | Pre-Print:0x13128 0x13129¥nPrint-Page#1:0x13 ... | 2005/10/17 02:11:52.305 |
| MITUMORI | 345, 89, 18, 37, 25910, 200, 3 ... | Pre-Print:0x13127¥nPrint-Page#1:0x13020 0x13 ... | 2005/10/17 03:12:21.009 |
| ... | ... | | |

FIG. 27

| ERROR NUMBER | ERROR GENERAL DESCRIPTION |
|---|---|
| 0x13020 | TEXT OVERFLOW |
| 0x13021 | IMAGE OVERFLOW |
| 0x13022 | DESIGN OVERFLOW |
| 0x13040 | MINMAX CONT SIZE |
| 0x13041 | MINMAX LINK SIZE |
| 0x13042 | MINMAX FONT SIZE |
| 0x13043 | IMAGE RESOLUTION |
| 0x13060 | EMPTY OBJECTS |
| 0x13061 | DESIGN JUMPED |
| 0x13100 | OBJECTS OVERLAP |
| 0x13101 | DIFF BASIC SIZE |
| 0x13120 | FONTER |
| 0x13121 | IMGFILENOTFOUND |
| 0x13123 | INVALID FIELD |
| 0x13124 | INVALID VARIABLE |
| 0x13125 | INVALID UNIT |
| 0x13126 | CONDVAR NODESIGN |
| 0x13127 | CONDVAR NOFIELD |
| 0x13128 | CONDVAR NOHIT |
| 0x13129 | CONDVAR NOTUSED |

FIG. 28

```
2801  <?xml version="1.0" encoding="UTF-8"?>
2802  <rdf:RDF
         xmlns="http://purl.org/rss/1.0/"
         xmlns:rdf="http://www.w3.org/1999/02/22-rdf-syntax-ns#">
2803    <channel rdf:about="http://www.canon.com/iwBS/5DWF506/
        LayoutErrorList.rss">
2804      <title>Recent Layout Error</title>
2805      <link>http://www.canon.com/iwBS/5DWF506/LayoutErrorList.html</link>
2806      <description>Recent Layout Error List</description>
        </channel>
2807  <items>
2808  <rdf:Seq>
2809     <rdf:li rdf:resource="http://www.canon.com/iwBS/5DWF506/
         LayoutErrorList-MITUMORI.html"/>
          <rdf:li rdf:resource="http://www.canon.com/iwBS/5DWF506/
          LayoutErrorList-PRINTER.html"/>
          <rdf:li rdf:resource="http://www.canon.com/iwBS/5DWF506/
          LayoutErrorList-HOUKOKU.html"/>

<!-rdf:li ELEMENT LIST->

</rdf:Seq>
         </items>
2810  <item rdf:about="http://www.canon.com/iwBS/5DWF506/LayoutErrorList-
      MITUMORI.html">
2811    <title>Template-MITUMORI</title>
2812    <link>http://www.canon.com/iwBS/5DWF506/Template/
        MITUMORI.dle</link>
2813    <description>2005/10/18 13:48:23.785¥n 2005/10/18 12:38:44.008¥n
        2005/10/18 09:13:14.865...(12)</description>
        </item>
2814  <item rdf:about="http://www.canon.com/iwBS/5DWF506/LayoutErrorList-
      PRINTER.html">
2815    <title>Template-PRINTER</title>
2816    <link>http://www.canon.com/iwBS/5DWF506/Template/PRINTER.dle</link>
2817    <description>2005/10/18 13:13:44.006¥n 2005/10/03 12:38:44.038¥n
        2005/09/27 23:08:58.915...(8)</description>
        </item>
2818  <item rdf:about="http://www.canon.com/iwBS/5DWF506/LayoutErrorList-
      HOUKOKU.html">
2819    <title>Template-HOUKOKU</title>
2820    <link>http://www.canon.com/iwBS/5DWF506/Template/
        HOUKOKU.dle</link>
2821    <description>2005/10/18 13:12:03.885¥n 2005/10/18 12:38:44.008¥n
        2005/10/18 09:13:14.865...(117)</description>
        </item>

<!-item ELEMENT LIST->

</rdf:RDF>
```

LayoutErrorList.rss

FIG. 29

```
2901  <?xml version="1.0" encoding="UTF-8"?>
2902  <rdf:RDF
        xmlns="http://purl.org/rss/1.0/"
        xmlns:rdf="http://www.w3.org/1999/02/22-rdf-syntax-ns#">
2903    <channel rdf:about="http://www.canon.com/iwBS/5DWF506/
        LayoutErrorList-MITUMORI.rss">
2904      <title>Recent Layout Error-MITUMORI</title>
2905      <link>http://www.canon.com/iwBS/5DWF506/LayoutErrorList-
          MITUMORI.html</link>
2906      <description>Recent Layout Error List-MITUMORI</description>
          </channel>
2907      <items>
2908      <rdf:Seq>
2909        <rdf:li rdf:resource="http://www.canon.com/iwBS/5DWF506/
            LayoutError-MITUMORI-20051017 031221.009.html"/>
            <rdf:li rdf:resource="http://www.canon.com/iwBS/5DWF506/
            LayoutError-MITUMORI-20051016 124358.120.html"/>
            <rdf:li rdf:resource="http://www.canon.com/iwBS/5DWF506/
            LayoutError-MITUMORI-20051014 134552.385.html"/>

<!-rdf:li ELEMENT LIST->

</rdf:Seq>
            </items>
2910      <item rdf:about="http://www.canon.com/iwBS/5DWF506/LayoutError-
          MITUMORI-20051017 031221.009.html">
2911        <title>2005/10/17 03:12:21.009</title>
2912        <link>http://www.canon.com/iwBS/5DWF506/Data/
            MITUMORI-20051017 031221.009.zip</link>
2913        <description>Pre-Print:0x13127¥nPrint-Page#1:0x13020
            0x13...</description>
            </item>
2914      <item rdf:about="http://www.canon.com/iwBS/5DWF506/LayoutError-
          MITUMORI-20051016 124358.120.html">
2915        <title>2005/10/16 12:43:58.120</title>
2916        <link>http://www.canon.com/iwBS/5DWF506/Data/MITUMORI-
            20051016 124358.120.zip</link>
2917        <description>Pre-Print:0x13127¥nPrint-Page#1:0x13020
            0x13... </description>
            </item>
2918      <item rdf:about="http://www.canon.com/iwBS/5DWF506/LayoutError-
          MITUMORI-20051014 134552.385.html">
2919        <title>2005/10/14 13:45:52.385</title>
2920        <link>http://www.canon.com/iwBS/5DWF506/Data/MITUMORI-20051014
            134552.385.zip</link>
2921        <description>Pre-Print:¥nPrint-Page#1:0x13020 0x13126... </description>
            </item>

<!-item ELEMENT LIST->

</rdf:RDF>
```

LayoutErrorList-MITUMORI.rss

FIG. 47

[Plan],[Catch],[Image]
"Travel plan A:","Enjoyable!Relaxing!",Image-200.jpg
"Travel plan K:","Reasonable but gorgeous!",Image-113.jpg

⋮

11285.csv — 4701

[Plan],[Catch],[Image]
"Travel plan N:","Ocean View!Dramatic!",Image-345.jpg
"Travel plan Y:","Exciting Night!",Image-89.jpg

⋮

32485.csv — 4702

CONTENT SERVER AND LAYOUT SYSTEM

BACKGROUND OF THE INVENTION

1. Field of the Invention

The present invention relates to a content server and layout system, which merges a template with selected content to lay it out on a document based on, e.g., an instruction from a client, and send the merged document to the client.

2. Description of the Related Art

In recent years, a Web system which delivers digital brochures that are customized according to a user's preference is available. With this system, the user selects a template and a content to be merged with that template on a Web page provided by a Web server, and a client receives a digital document as a result. Note that merging data (content data) with a template is to lay out the content data according to a layout defined by the template. Therefore, when the content data is merged with the template, already laid-out content data as a combination of the content data and layout data indicating its layout is generated.

A content server which manages and provides contents and templates forms a part of such a system.

The above system uses an automatic layout system to generate a digital document according to a user's choice. The automatic layout system can change the sizes of containers which are to be filled with contents, and container intervals. In this way, images, and the like, the sizes of containers laid out on a template and the distance between neighboring containers can be changed in accordance with the volume of a content such as text. For this reason, the automatic layout system can generally support various volumes of contents and combinations of these contents by a single template. Note that a container is a frame defined in a template, and contents such as text, images, and the like are laid out in that frame.

However, in the automatic layout system, data beyond the assumed variable settings set for each container and between containers may be merged depending on differences in the contents, variations of combinations of contents, or the like. In this case, layout errors such as text overflow (text cannot fall within a container), image overflow (image data cannot fall within a container), and the like may occur.

Some template editors comprise a proofing function that makes so-called preflight inspection so as to allow the user to check occurrence of layout errors and to re-edit a template so as to apply corrections against layout errors. The preflight inspection is that for an actual operation, and includes an inspection for checking whether or not the system operates normally using test data. That is, from the technical viewpoint, the preflight inspection of the automatic layout system is the same as its normal use. The purpose of the operation of the preflight inspection lies in inspection of content data or template data unlike the normal use. The preflight inspection will also be simply referred to as "preflight" hereinafter.

In the preflight inspection of the automatic layout system with the proofing function, test data of content is merged with the template to experimentally lay out the data. Then, the preflight inspection result is displayed for the user.

A user as a template editor re-edits the template while observing the preflight inspection result, and changes variable setting values and levels which are set for each container or between containers so as to obtain a template free from any layout errors.

The user as the template editor downloads contents to be applied to a template from the content server, and makes creation and editing operations of a template free from any layout errors using this proofing function.

A user as a content server administrator uploads and registers the template free from any layout errors created by the template editor to the content server. The registered template is set and allocated to be selectable on a Web page by the user who requests a digital document from a Web client.

The automatic layout system of documents is described in, e.g., Japanese Patent Laid-Open No. 2005-216174 and the like. As a technique that notifies clients of update on the Internet, an RSS (RDF (Resource Description Framework) site summary) technique is known (for example, see Dan Brickley and other 10 members, "RDF Site Summary (RSS) 1.0", May 30, 2001, RSS-DEV Working Group, [searched on Mar. 17, 2005], Internet <URL: http://purl.org/rss/1.0/spec>, and M. Nottingham and R. Sayer Ed., "The Atom Syndication Format draft-ietf-atompub-froamat-03", Oct. 20, 2004, RSS-DEV Working Group, [searched on Mar. 17, 2005], Internet <URL: http://atompub.org/2004//10/20/draft-ietf-atompub-froamat-03.html>.

In this automatic layout system, the content server administrator adds and updates content data to be handled by the content server as needed. For this reason, the template which has been edited to be free from any layout error using the proofing function is more likely to cause layout errors due to a new content or a combination of new and existing contents after it is registered in the server.

In the prior art, when the layout errors have occurred after registration of the template in the server, an error log upon layout, which is recorded by the server is checked to specify a template that causes problems, and that template must be corrected. In this case, the administrator further specifies, from the log, content data which has caused problems in that template, and the merging order of the content data with the template. The administrator downloads the specified content data from the content server by manually designating an editor environment. For the template re-edit operation, the administrator further manually designates the arrangement order of the content data to reproduce a proofing error in the editor. Such time-consuming procedures are required. For this reason, when proofing errors of different cases have occurred in a single template or there are many templates which have caused problems, the re-edit operations for correcting the templates require much labor.

SUMMARY OF THE INVENTION

The present invention has been made in consideration of the aforementioned problems, and has as its object to provide a content server and layout system which facilitate template edit operations that are made to eliminate errors when layout errors have occurred after registration in a server.

In order to achieve the above object, a content server and layout system according to the present invention comprise the following arrangement. That is, there is provided a server system for generating information to be delivered to a client having an RSS reader, comprising:

a layout unit configured to execute layout processing of content data acquired from a content server, in accordance with template data;

a generation unit configured to generate, when an error has occurred in the layout processing by the layout unit, syndication data including link information to data associated with the error; and an information providing unit configured to provide the syndication data generated by the generation unit to the client, and to provide, when an acquisition request of the data designated by the link information included in the syndication data is issued, that data to the request source.

Alternatively, there is provided a network service system for generating information to be delivered to a client having an RSS reader, comprising:

a service providing unit configured to execute processing in response to a request from the client;

a generation unit configured to generate syndication data including status information indicating status of the processing by the service providing unit, and link information to information associated with the status information; and an information providing unit configured to provide stored data to the client, wherein the information providing unit stores the syndication data generated by the generation unit and provides the stored syndication data to the client, and when an acquisition request of data designated by the link information included in the syndication data is issued, the information providing unit provides that data to the request source, and the client comprises an edit unit configured to issue, when a user instructs to acquire data designated by the link information included in the syndication data, the acquisition request of the data to the information providing unit, and to edit the data acquired from the information providing unit in response to the acquisition request in accordance with a user's operation.

According to the present invention, when a layout error has occurred in a template registered in a server, an environment that allows a template editor of a client to reproduce that proofing error can be easily built. For this reason, the correction operation of the template which has caused problems can be facilitated, and the productivity of automatic layout processing can be improved.

Further features of the present invention will become apparent from the following description of exemplary embodiments with reference to the attached drawings.

BRIEF DESCRIPTION OF THE DRAWINGS

FIG. 21 shows a "variable data/layout check" dialog of the template edit application program according to the present invention;

FIG. 22 shows the preflight result displayed on the "variable data/layout check" dialog of the template edit application program according to the present invention;

FIG. 26 shows a description example of a layout error log storage table according to the present invention;

FIG. 27 shows error numbers and corresponding general error description character strings;

FIG. 28 shows a description example of RSS data of "type 1" according to the present invention;

FIG. 29 shows a description example of RSS data of "type 2" according to the present invention;

FIG. 47 shows a description example of a generation data file of the content server according to the present invention.

DESCRIPTION OF THE EMBODIMENTS

Figure 1:
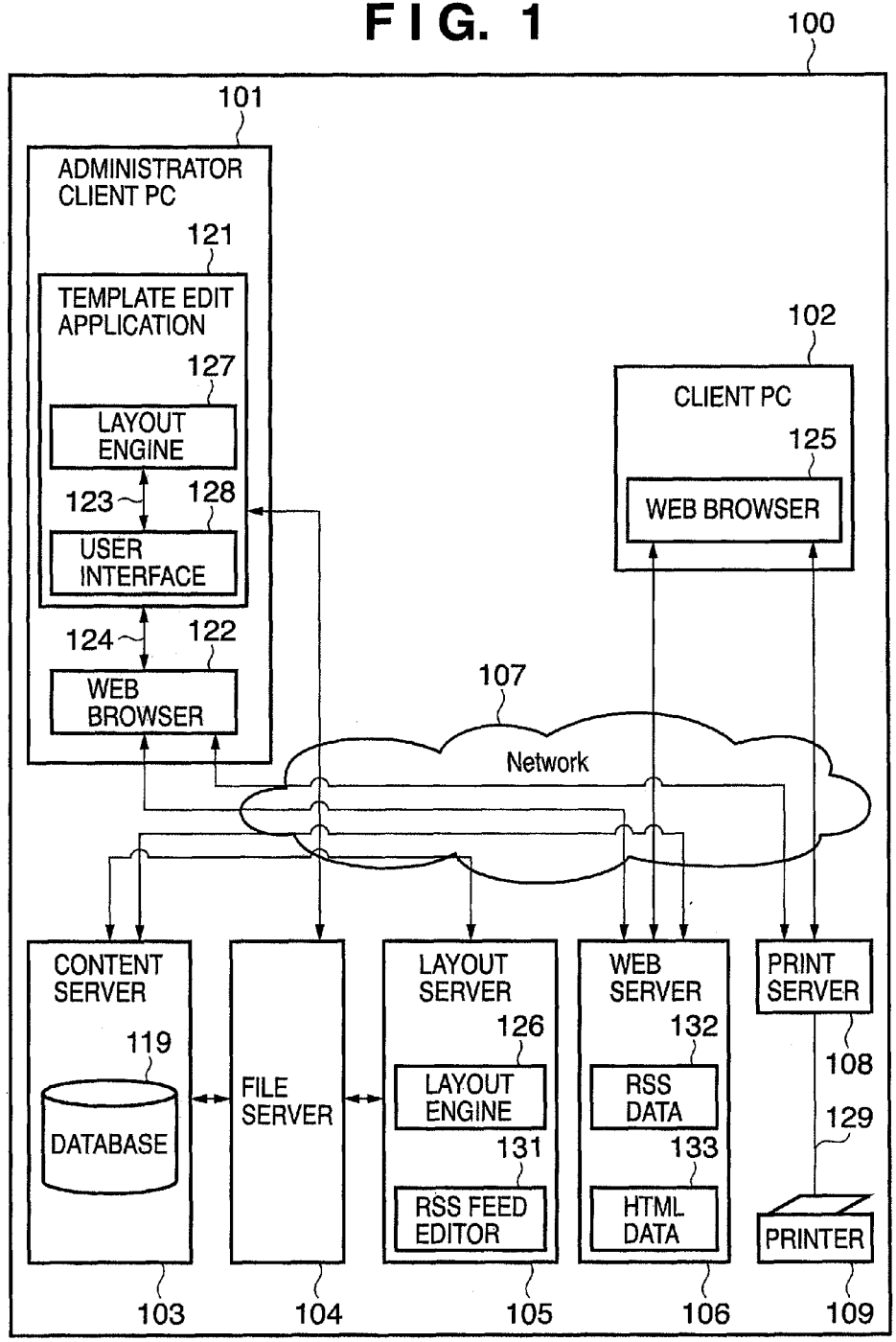
FIG. 1 is a block diagram showing the arrangement of a computer system according to the present invention.

Preferred embodiments of the present invention will be described hereinafter. An overview of an automatic layout system according to this embodiment will be described first.

(1) A layout server records log information of a layout error upon preflight inspection or an actual operation. The layout error log is stored together with identification information of a template that has caused the layout error, identification information of content merged with the template, and the merging order. Note that merging the content with the template means layout processing of content data such as a text, image, and graphics data into a frame (container) defined by a template. In this example, content data indicates static data which does not have time as a parameter, since it becomes an object to be printed. The content data will also be simply referred to as a "content" hereinafter. The layout error log information will be referred to as a preflight log hereinafter. Not only a log of an error which is recorded upon preflight inspection but also a log of layout errors collected upon an actual operation are called preflight logs.

(2) A content server syndicates (provides an information delivery service of) the preflight log of the layout error as RSS data to have a template name as a header. That is, the content server sets the identification name of a template as a header, edits the identification name and URI of the template data and log information such as an error count and the like in an RDF format, and stores the edited log information in a given storage location. RSS data is popularly used, and has a format that can be processed by RSS reader software which is distributed as freeware or shareware, or an RSS reader function of a Web browser or e-mail software. This example uses client software which has both the RSS reader function and Web browser function. The software of this type can browse Web page data and RSS data on the user interface without especially distinguishing them from each other. For example, upon clicking a hyperlink included in the RSS data, even when the link destination is normal HTML data, that HTML data can be displayed using components of the Web browser function. By launching an application program associated with data displayed by the Web browser function, processing by that application program can be executed within the browser pane.

(3) A client displays syndication of the preflight log of the layout error on an RSS reader of a browser as a news feed. The error contents, the identification name of template data associated with the error, that of content data associated with the error, and the like are displayed. The identification name of the template data and that of the content data are associated with link information to their data themselves, and upon clicking a similar alias, data at the link destination is accessed.

(4) When an administrator user clicks one of template names (URI links) that have caused layout errors (to select a preflight log) on the RSS reader of the client browser, selection of the template name is transmitted to the server. The server sends the selected template data recorded in the preflight log of the layout error to the client.

(5) The client browser launches a template edit program (also called a template editor). The template editor is installed locally (in the client itself), or ActiveX components or a program described in Java™ or the like are downloaded from the server.

(6) The server makes an RSS feed (news feed) of a log of a layout error which has occurred in the template sent to the client to have that layout error (its identification name) as a header. That is, the server sets occurrence of the layout error as a header, edits the identification name and URI of content data that has caused the layout error in an RDF format, and stores the edited information in a given storage location.

(7) The display on the RSS reader of the client browser is switched to a channel of the layout error (preflight log) unique to the template.

(8) When the user clicks one of layout errors (URL links) fed to the RSS reader of the client browser (to select a preflight log), the server sends a content group linked to that layout error to the client.

(9) The client browser passes the content group received from the server to the template editor. The template editor merges the content group with the template to generate a layout preview. Merging the content group into the template is to lay out content data in accordance with the template.

(10) The user of the client browser executes layout check processing on the template editor. That is, the user tries to lay out the content data obtained in (8) according to the template data obtained in (4). As a result, the same error as the fed layout error displayed on the RSS reader is to be obtained as a trial result. The user re-edits the layout while observing the result, and corrects the layout error.

(11) The user of the client user can click a link of another layout error displayed on the RSS reader (to select a preflight log). As a result, the user receives another content group from the server, and corrects that layout error using the template editor.

(12) The user of the client browser uploads (re-registers) the template whose layout error has been corrected, and has undergone the re-edit processing to the server.

(13) Upon reception of re-registration (updating) of the edited template, the server deletes the log information associated with that template. Also, the server deletes information associated with that template from the syndication of the preflight log, and makes an RSS feed (news feed) to have the template name as a header again. That is, the server delivers elimination of the error.

As described above, according to the layout system of this embodiment, upon detection of occurrence of a layout error, information indicating occurrence of the error, and information that can specify a template and content data associated with the error are delivered by an RSS feed. The client (administrator or the like) that received the feed can immediately reproduce the layout error that has occurred based on the received information that can specify the template and content data. The client can specify a cause of the error based on the reproduced layout error, and can easily correct the template data or content data so as not to cause any error. The client can also immediately conduct a re-test after correction.

For this reason, the operations for eliminating a layout error can be reduced and speeded up. As a result, in addition to the productivity of the correction operations for eliminating an error, that of the processing for generating already laid-out data can be improved.

Since the client is notified of the information indicating occurrence of an error and information required to correct that error, it need not always monitor the layout server, and resources to be assigned for monitoring can be reduced.

<System Block Diagram>

Prior to a description of an embodiment of the present invention, a system arrangement and application configuration to which the present invention can be applied will be described.

FIG. 1 is a brochure delivery system 100 in which a server generates a document of a digital brochure based on variable data in response to a request from a client, and delivers that document to the client as a response.

Figure 2:
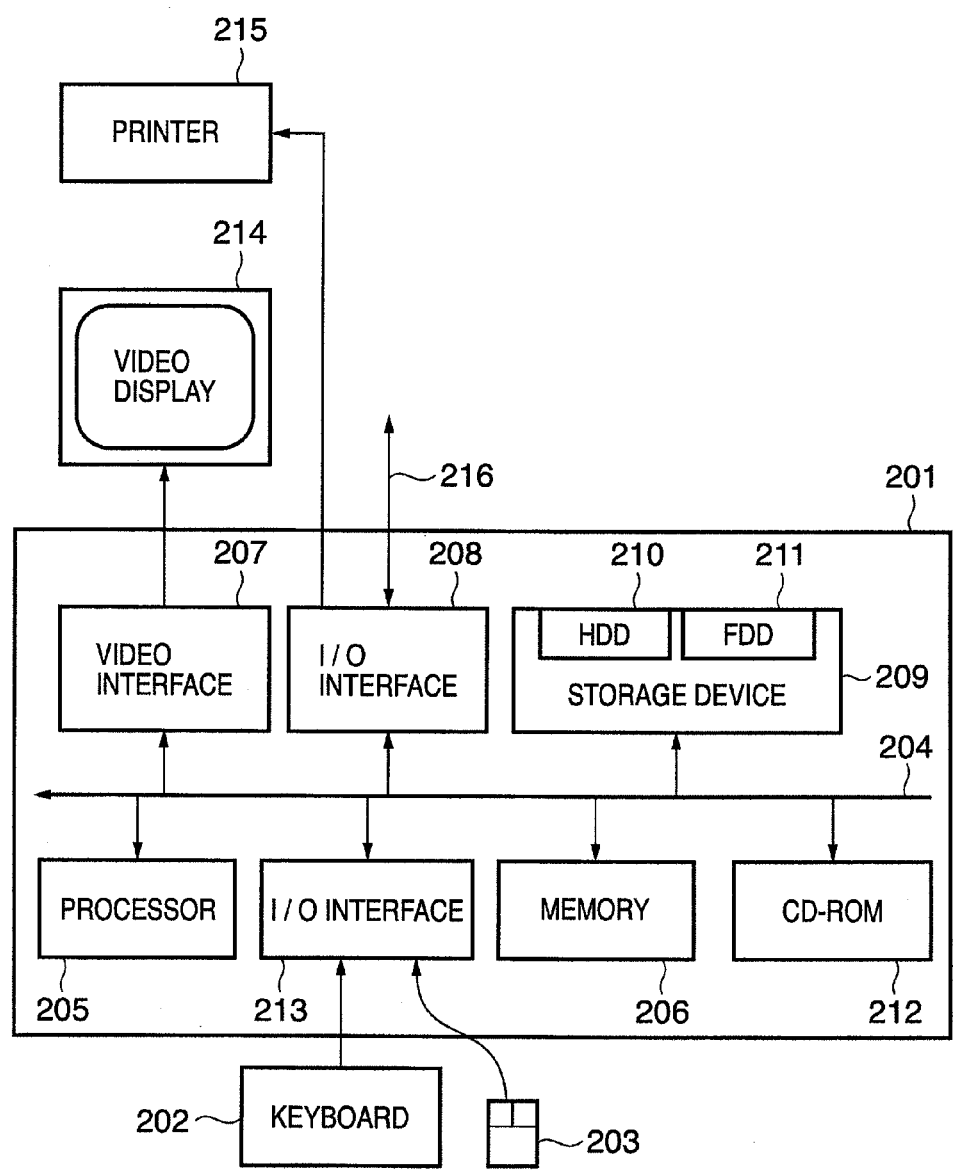
FIG. 2 is a schematic diagram showing computer modules according to the present invention.

FIG. 2 is a block diagram of a computer which implements a server and client terminal shown in FIG. 1. A computer 201 shown in FIG. 2 shows the hardware arrangement of an administrator client computer module 101, client computer module 102, content server 103, file server 104, layout server 105, and Web server 106. The computer 201 executes a template edit application program 121 and the like which can be executed on the system 100. Template edit and print steps are executed by instructions of software executed by the computer 201. Software is stored in a readable medium of the computer which includes a storage device, as will be described later. The software is loaded from the computer readable medium onto the computer, and is executed by the computer 201. Such software and a readable medium that records a computer program are computer program products.

The computer module 201 connects input devices such as a keyboard 202, a pointing device (e.g., a mouse 203), and the like, and also connects output devices including a display device 214 and a local printer 215 depending on the situation. An input/output (I/O) interface 208 allows the computer module 201 to connect from a network connection 216 to other computer apparatuses of the system 100. The network connection 216 is typically a local area network (LAN) or a wide area network (WAN).

The computer module 201 typically includes at least one processor unit 205, and a memory unit 206 which comprises, e.g., a semiconductor random access memory (RAM) and read-only memory (ROM). The computer module 201 includes I/O interfaces including a video interface 207, and an I/O interface 213 for the keyboard 202 and mouse 203. A storage device 209 typically includes a hard disk drive 210 and flexible disk drive 211. Although not shown, a magnetic tape drive may also be used. A CD-ROM drive 212 is provided as a non-volatile data source. The computer module 201 uses the I/O interface 213 from its processor 205 that makes a communication via an interconnection bus 204 by a conventional method of the computer system.

As an example of the computer shown in FIG. 2, an IBM compatible PC, Sparc Station available from SUN Microsystems, or a computer system including them may be used.

The template edit application program 121 and a Web browser application program 122 or 125 typically reside on the hard disk drive 210, and the processor 205 controls execution and loading of these programs. Data fetched from a media storage device of the programs 121 and 122 or 125 and a network 107 use the semiconductor memory 206 in response to the hard disk drive 210. In some instances, the application programs 121 and 122 or 125 are encoded on a CD-ROM or flexible disk, and are loaded via the corresponding drives 212 and 211, and are provided to the user. As another method, the user may load the application programs 121 and 122 or 125 via the network connection 216. Furthermore, software may be loaded from a computer readable medium into the computer module 201. The medium includes a magnetic tape, ROM, integrated circuit, magneto-optical disk, another device connected via a wireless interface or infrared communication, a computer readable card such as a PCMCIA card, and another device connected via the Internet or intranet. These are simply examples of the related computer readable media. Other computer readable media may be used.

The template edit application 121 includes two software components required to attain variable data printing. The first one of these components is a layout engine 127, which is a software component used to calculate the positions of rectangles and lines based on limitations and sizes given within the rectangular range. A user interface 128 as the second component provides a mechanism which allows the user to create a document template, and to associate a data source in the document template. The user interface 128 and layout engine 127 communicate with each other via a communication channel 123. The data source of variable data required to generate a document is a typical database 119 assured on the content server 103 which comprises an independent computer on which a database application used to generally manage contents runs. An administrator client computer 101 communicates with the content server 103 by means of the network 107. The template edit application program 121 generates a document template to be stored in a file server 104 which generally comprises an independent computer. The template edit application program 121 generates a document by merging data with the document template. Such document is stored in a local file system of the administrator client computer 101 or in the file server 104.

The Web browser application 122 or 125 is an application program used to browse Web pages. The Web browser application 122 or 125 accesses Web pages provided by a Web server 106 which comprises an independent computer, and sends information to the Web server 106 via a request form provided by the Web server 106. The request form is, e.g., an HTML form or the like. The Web browser application 122 communicates with the template edit application program 121 via a communication channel 124, and mediates data received from the Web server 106 or data to be sent to the Web server 106.

A layout server 105 is a typical computer. The layout server 105 generates a document by combining data supplied from the content server 103 and a document template stored in the file system of the file server 104 using the layout engine 126. That is, the layout server 105 can lay out content data in accordance with a template.

The layout server 105 comprises an RSS feed editor 131 which edits RSS data associated with notification of a layout error by executing the sequences shown in, e.g., FIGS. 30A to 31 (to be described later). The generated RSS data is uploaded to the Web server 106. Of course, the RSS feed editor 131 may be included as a part of the layout server 105.

The Web server 106 is a typical computer, and receives a reply of a request form sent to the Web browser application 122 or 125 as a Web client. The Web server 106 requests the content server 103 to generate a document using the requested content data and template in accordance with the user's request contents described in the request form, and returns the document generated based on the request to the client as a response.

When the RSS feed editor 131 generates RSS data, RSS data 132 is uploaded to and stored in the Web server 106. The stored RSS data is periodically polled by an RSS client (RSS reader) and is used to update information associated with errors in the client. The Web server receives a request for hyperlink information embedded in the RSS data, requests the content server to execute required processing, and returns data according to a request from the client to the client. This processing has already been described.

A print server 108 is a computer which provides a network function to a printer which is not directly connected to the network. The print server 108 and printer 109 are connected via a typical communication channel 129.

The content server 103 is a typical computer, and also serves as an application server.

<Application Configuration Diagram>
(Main Window)

Figure 3:
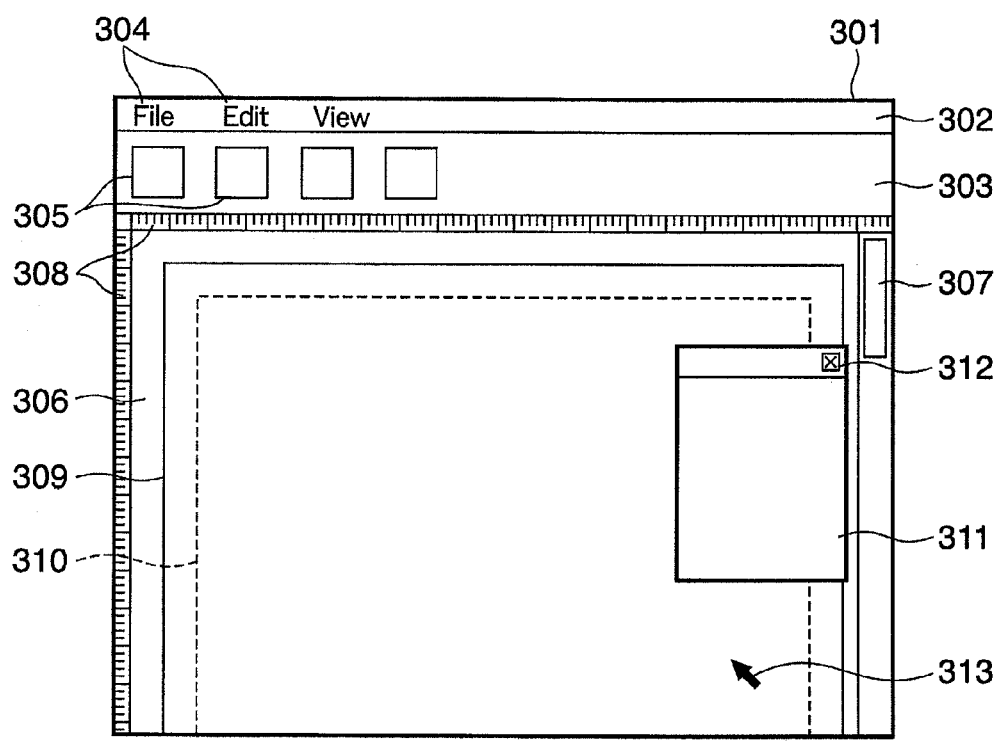
FIG. 3 shows a main window of a typical application including a menu bar, tool bar, work area, and floating palette according to the present invention.

As shown in FIG. 3, the user interface 128 includes a user interface formed by an application window 301 which is to be displayed on a video display 144 upon operation. The window 301 is characterized by a menu bar 302, tool bar 303, work area 306, optional palette 311, and cursor/pointer device 313. The menu bar 302 can be hidden or can be moved to various locations on the screen. The location of the work area 306 can be moved based on the position and operation of the mouse 203.

The menu bar 302 has many menu items 304 which are expanded under the layer of menu options, as is known as a state-of-the-art technique.

The tool bar 303 has many tool buttons and widgets 305 which can be hidden or displayed in a special mode of an application.

A ruler 308 as an option is used to indicate the position of a pointer, page, line, margin guide, container, or object in the work area.

The palette 311 is used to access an additional function such as a variable data library. The palette 311 has a window control 312 used to move, resize, or close it. The palette 311 is displayed as an option in front of the work area, or is hidden behind an object. The palette 311 is limited to be displayed only within the range of the application window 301 or is permitted to be partially or entirely displayed outside the application window 301.

Figure 4:
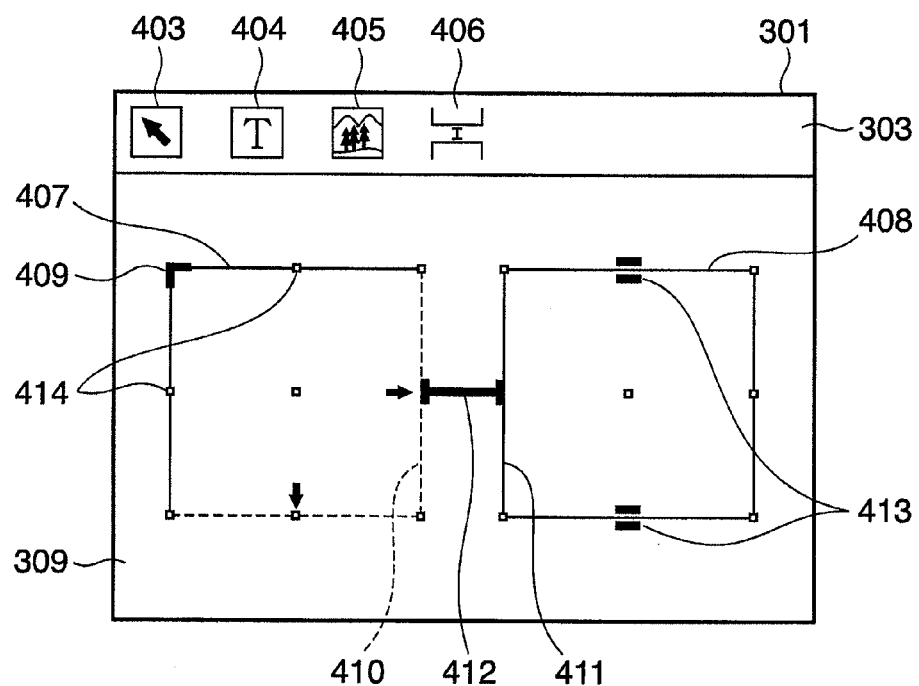
FIG. 4 shows a screen that shows typical containers having a link between containers, anchors, and sliders, tools, and icons according to the present invention.

The tool bar area 303 has at least the following user selectable "buttons" (see FIG. 4).

(1) Selection tool button 403: used to select, move, change a size of, resize, and lock or unlock the sides of a container. A plurality of containers can be selected by dragging a selection box around containers or by pressing a CTRL key while selecting a plurality of containers.

(2) Image container tool button 405: used to create a container having a static or variable image.

(3) Text container tool button 404: used to create a container having static or variable text.

(4) Link tool button 406: used to create a link required to control the distance between the containers.

These buttons are implemented as tooltips of icons which change depending on the operation state, as is known as a state-of-the-art technique.

(Document Template)

The work area 306 is used to display and edit the design of a document template. This allows the user to design an overview of a preliminarily printed document, and to understand how the merged document changes based on the volume and size of variable data.

If an external data source is linked to the template, variable text and images are displayed in their containers so as to allow the user to preview the current document.

Visual clues upon rendering the document structure and variable data containers are always displayed when a cursor is moved above each container or a container is selected.

The work area 306 is characterized by a scroll bar 307, the ruler 308 as an option, and a document template 309. The document template 309 can indicate the presence of a plurality of pages.

The user designates the page size of a given document template as a state-of-the-art technique. The actual number of pages of each document may change depending on variable data. If data cannot be fit within one page, an additional page is automatically created.

A boundary line in each page is an arbitrary page margin 310 which indicates the maximum width of an object which can be printed on that page.

FIG. 4 shows an example of objects which can be displayed on the document template 309 for one page. These objects have a plurality of containers 407 and 408, an anchor icon 409 to be arbitrarily applied, non-fixed sides 410, a link 412, and sliders 413.

(Container)

A container is a space having static or variable text or a static or variable image in the document template, and is laid out together with another container and object. The container can be moved, resized, and re-created using the pointer 313 by operating the mouse 203 on the user interface.

More properly, the container has a set of settings, visual expression, interaction, and edit operation. The container is defined as follows.

(1) The container has a static or variable content. A variable content is dynamic in the sense that pieces of content brought from the data source and to be merged into different documents may be different. The variable content is not intended to include a content which cannot be printed, i.e., that which is changed or animated along with an elapse of time. Likewise, a static content is displayed in the same way in all documents generated using the container. However, the static content may have different positions in respective documents due to the operation of the variable container (dynamic object).

(2) The container has a modification function of text settings such as a background color, border, font, style, and the like to be applied to a content.

(3) The container is merged with data from a data source upon generation of a document. The modification function is visible on typically printed output materials like every static contents. The variable content allows display of specific data from a data source. This expression of the container can be attained, e.g., when it is printed, when it is displayed on the screen 144, or by both the methods.

(4) The container has a user interface. For example, the container has an interactive GUI used to, e.g., edit the container and to make its display settings. Elements of the interface are displayed on the screen 144 but they are not printed upon printing the document. The user interface 128 displays some modification functions of the container such as a choice of background colors and fonts, and adds a function required to permit to edit or display the settings of the container. A special function of the UI 103 includes, for example, a corner icon which is used to interactively change the size, position and border of the container. Furthermore, the special function includes a number, line, icon, and text which are overpainted to indicate the operation of the container when the container is merged with data from a data source. As describe above, the layout edit user interface of this embodiment is a set of direct editing techniques and display methods associated with GUI components of a container.

(Limitations on Container)

According to a known technique, the container has limitations to control how to link contents displayed by respective documents. These limitations, together with linkage of static and variable contents and containers, are the principal method of allowing the user to control generation of a large number of documents from a single document template. An example of the limitations is that "the height of a content of this container has a maximum value of 4 inches". Another example of the limitations is that "the left ends of contents of the containers must be displayed at an identical horizontal position in respective documents". The contents described here are various methods for displaying and editing such limitations using a GUI.

A contents place holder which designates a layout of static contents like that an image has a defined place on a page is known in the digital print technique. In the following examination, a container has a position and size, which are edited and displayed by a method known as a state-of-the-art technique. This examination will be explained while focusing on the display and edit processes by a method specialized to variable data printing.

The container allows the user to designate the sizes and positions of contents of documents. Since some documents are generated based on a single document template, the container must use a user interface required to designate and display many possibilities and limitations.

The sides of one container define virtual boundary lines within which associated contents are displayed in documents. Discussing about the left side of the container in this patent amounts to discussing about the displayable leftmost sides of the associated contents in every documents. Likewise, discussing about the height of the container amounts to discussing about the limitation on the heights of the content associated with created documents. In this patent specification, the above differences will be clarified below upon discussing the sides or the size of the container with reference to the user interface 128.

In the following examination, term "fixed" used to define some values to limit display of the content is common to all documents.

(1) If the width of the container is fixed, the same widths are assigned to the associated contents in all documents.

(2) If the height of the container is fixed, the same heights are assigned to the associated contents in all documents.

(3) If the limitation on the distance is fixed, the designated distance is a limitation for all documents.

(4) If the right and left sides of the container are fixed, the horizontal positions of the right and left sides are the same for all documents. However, the height or vertical position of the container may be variable. For example, if the left side of the container is fixed, the contents associated with that container may be displayed near the top of a page in one document, or may be displayed near the bottom of a page in another document. However, the left sides have the same horizontal position in all cases.

(5) If the top and bottom sides of the container are fixed, this means that the vertical positions of the sides are the same in a page for all documents. However, the widths or horizontal positions of the containers may be variable.

(6) The vertical axis of the container is an imaginary vertical line located between the parallel right and left sides of the container. If the vertical axis of the container is fixed, the averages of the horizontal positions of the right and left sides of containers are the same in all documents. With this limitation, the width of the container may change. In a document having different right and left sides, the right and left sides may be far from or near the vertical axis. However, the vertical axes are located at the same horizontal position in all documents. The height and horizontal position of the container are not influenced by this limitation.

(7) Likewise, if the horizontal axis is fixed, it limits the vertical positions of the top and bottom sides of the container, but the height of the container is not influenced by this limitation.

(8) If both the horizontal and vertical axes are fixed, this means that the central position of each container is fixed. However, the width and height of the container are not influenced by this limitation.

(9) If a corner of the container, the middle position between the sides of the container, or the central position of the container is fixed, contents are displayed at the same positions in all documents and at the same positions associated with containers. For example, if the upper left corner of the container is fixed, this means that the upper left positions of laid-out containers are the same in all documents.

(10) The vertical side or axis is fixed in terms of the right or left side, right or left margin, or another horizontal position of a page. Likewise, the horizontal side or axis is fixed in terms of the top or bottom side or margin, or another vertical position of a page.

Antonym "variable" of term "fixed" means that limitations on the side, axis, corner, middle position, or document may change among documents. However, a specific document setting may not require this. For example, there are other external limitations such as actual preferred positions of sides due to change. If no external limitations are applied, since the sides are labeled as "unfixed", the positions of the sides can be changed.

(Display and Edit Container)

[Creation Method of New Container]

Containers are described using two types of containers, i.e., a text container and image container. The text container has text and an embedded image. The image container has an image alone.

A new text or image container is created on the document template 309 by clicking the text container tool button 404 or image container tool button 405 in FIG. 5, and dragging a rectangle on the document template 309 using the mouse 203.

As another method, a new container can be easily created by activating the text container tool button 404 or image container tool button 405, and then clicking an arbitrary position on the document template 309. A dialog box or another prompt used to insert a container of a default size or to set the size of a new container is displayed. Some containers are automatically created and laid out by a schema which is defined or calculated in advance. Also, other ideas may be used.

[Container Display Method]

FIGS. 5A to 5D are views showing examples of exemplary side rules of a container. The application 121 expresses the states of the sides of a container using label objects shown in FIGS. 5A to 5D. The application 121 draws the sides using solid lines 503 or broken lines 504, and displays a container using anchors, handles, sliders, extend/shrink icons 505, and colors. The anchors are lines, shapes, or icons, which are rendered near the sides and are denoted by reference numerals

506, 507, and 509. The handles are control points 502 which are rendered near the sides or shape to move or correct a container. The sliders are short parallel lines 413 rendered on both sides of a side.

The container display rules in FIGS. 5A to 5D are as follows:

(1) In order to fix each side, that side is rendered by a solid line.

(2) If the width is fixed, the right and left sides are rendered by solid lines.

(3) If the height is fixed, the top and bottom sides are rendered by solid lines.

(4) No axis is rendered.

(5) All sides which are not rendered are rendered by broken lines, and extend/shrink icons are rendered near them.

(6) If a pair of crossing sides or axes are fixed, an anchor is rendered at their intersection.

(7) If an anchor is rendered nowhere on the fixed side, a slider is rendered near the center of an edge.

(8) If neither an anchor nor slider are rendered for the crossing sides or axes, a handle is rendered at their intersection.

Lines compliant to rules (1), (2), and (3) are rendered using solid lines if they are fixed or limited. A flexible side compliant to rule 5 is rendered by a broken line. Anchors are displayed for fixed points compliant to rules (6), (7), and (8), sliders are displayed for some fixed sides, and handles are displayed for some other fixed sides.

In the above description, a side must be rendered only once. Once a given rule is applied to the side to be rendered, other rules are never applied to the same side again later. For example, if a container is too small and icons overlap each other, or it makes other display functions indistinct, different icons may be rendered, or display of the icons may be omitted.

The rendering position of the flexible side depends on the content of a container. As will be described later, "dynamic calibration processing" which means that the content is merged with the document template and is visualized by the user interface is used. Alternative execution means that decides whether the contents areas or flexible sides of containers which are averaged in all documents are to be laid out on the UI 103 may be used.

These content expressions provide graphical means that displays the states of the sides of a container. The expressions can be interpreted as follows.

(1) Like the sides 410 shown in FIG. 4, dotted lines depend on the content in a container, and mean the positions of the sides in a document.

(2) The solid lines mean the limited sides. This is because the sides are fixed (sides 414) or the width or height of the container is fixed (both the width and height of the container 408 are fixed).

(3) An anchor means that the intersection of the sides or axes is fixed. Therefore, anchor points appear at horizontal and vertical positions of all documents. Obviously, the anchor is fixed. The anchor 409 shown in FIG. 4 is an example of an anchor icon which means that crossing sides 414 are fixed.

(4) A slider means that the associated side is fixed. The position of a container is decided by the "length of the slider" along the side. For example, the sliders 413 shown in FIG. 4 mean that the content of the container 408 may be displayed at the left or right side of a position expressed by a specific diagram in a document.

Some or all of these icons and sides may or may not be rendered depending on the selected tool or container to be highlighted or activated. In general, since the sides and icons of a container are used to help design the document template, they are not rendered on printed materials.

Settings of the minimum or maximum values of the width and height of a container are displayed on a subsidiary dialog window.

Figure 5A:
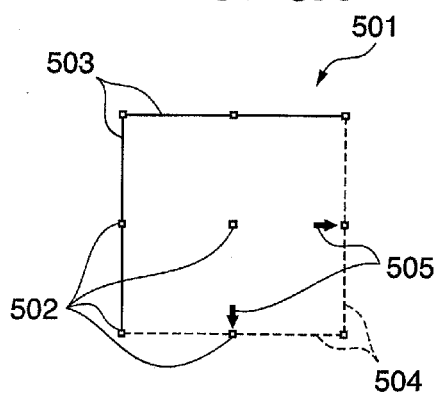
FIGS. 5A to 5D show typical container rules according to the present invention.

In a container 501 shown in FIG. 5A, both the width and height are not fixed. Fixed sides 503 are expressed by the solid lines. Flexible sides 504 are expressed by the broken lines. Extend/shrink icons 505 are additional or alternative indicators which indicate that the neighboring sides 504 are variable.

Figure 5B:
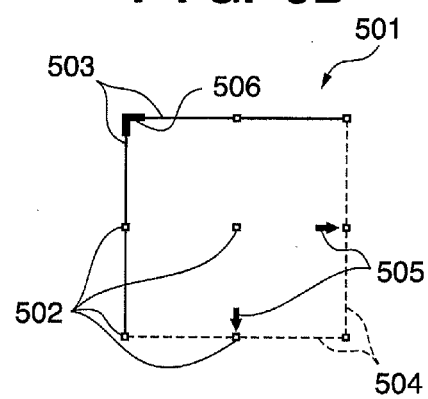

In a container 501 shown in FIG. 5B, both the width and height are variable. An anchor 506 additionally or alternatively indicates that two crossing sides 503 are fixed.

Figure 5C:
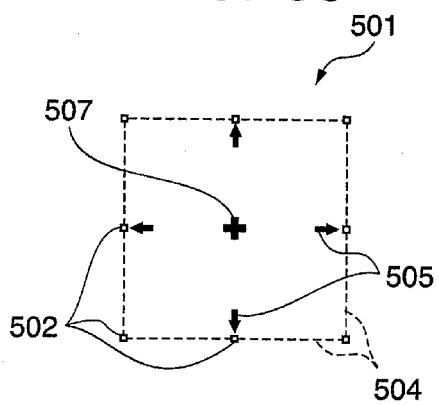

In a container 501 shown in FIG. 5C, both the width and height are variable in a state wherein the container is evenly extended or shrunk about the central point as indicated by an arbitrary anchor icon 507.

Figure 5D:
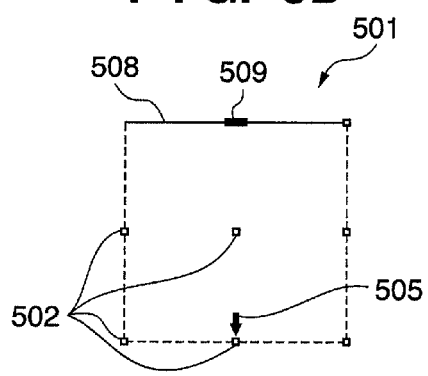

In a container 501 shown in FIG. 5D, both the width and height are variable except that a top side 508 is fixed. An anchor icon 509 located near the center of the top side 508 indicates that the top side 508 is fixed, and also that the right and left sides of the container are extended or shrunk about the central axis (vertical axis) which passes through the icon and is rendered vertically.

(Link)

A link indicates an association between containers. The association indicates the distance between the containers, and the layouts of the containers associated by the link are calculated while they are influenced by each other's layout changes. A link 412 shown in FIG. 4 associates the containers 407 and 408 in FIG. 4 with each other. The link setting method and the dynamic layout calculation method of the containers associated by the link will be described later.

(Link Setting Method)

Figure 6:
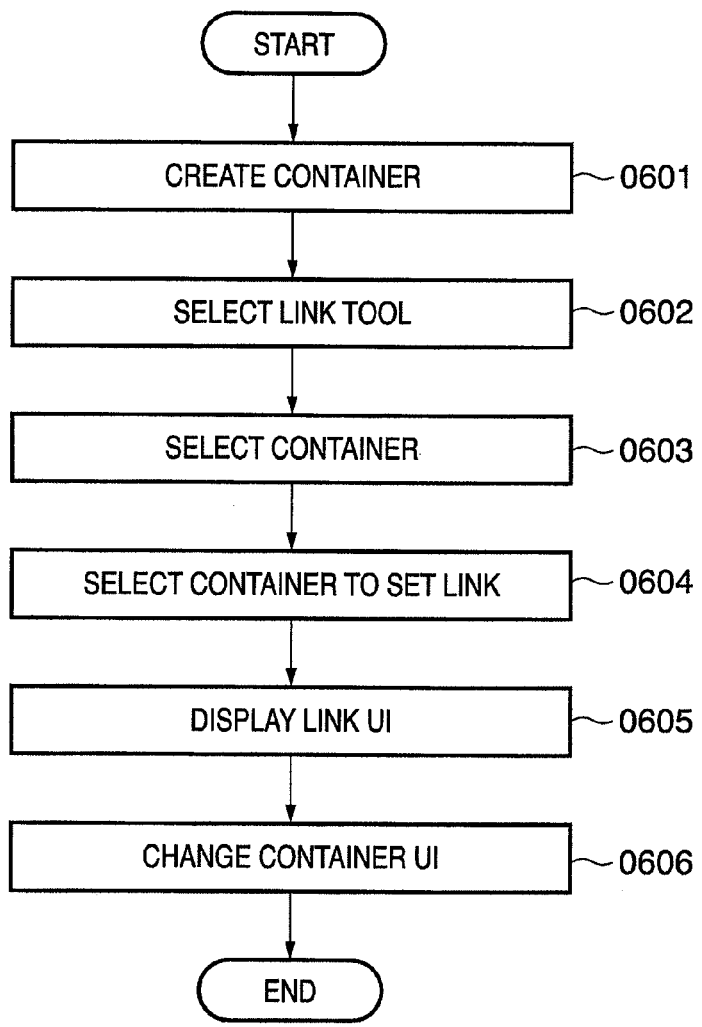
FIG. 6 is a flowchart of the procedure for generating a link according to the present invention.
Figure 7:
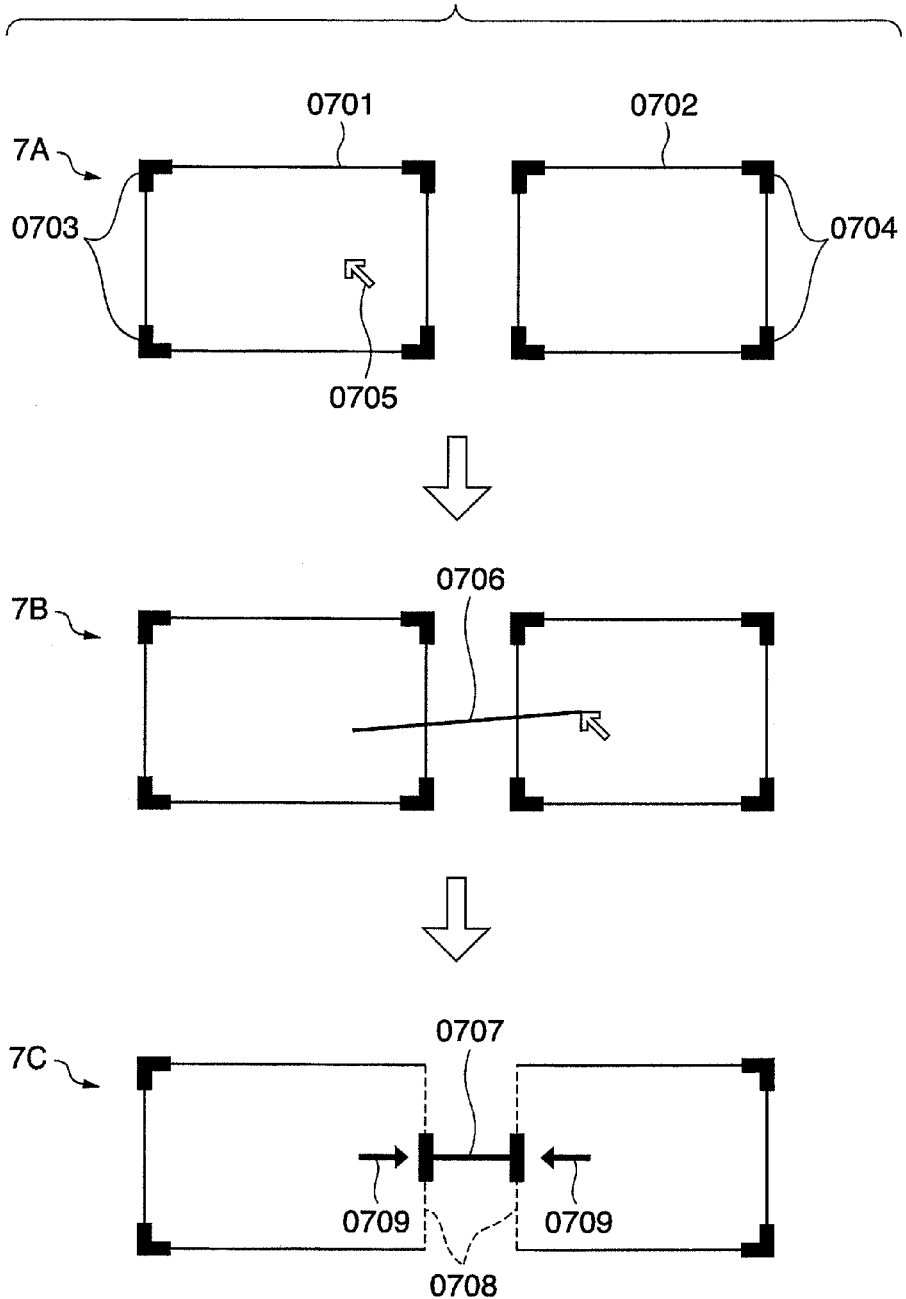
FIG. 7 shows UI examples upon generating a link.

FIG. 6 is a flowchart showing the link setting method. FIG. 7 shows UI examples. The method of setting a link to containers will be described below using these drawings.

Upon setting a link, the user creates at least two containers to which a link is to be set (0601). A graphic 7A shows an example in which the user creates two containers and sets a link. The user activates the aforementioned link tool button 406 (0602). The graphics 7A to 7C show the operations for setting a link after the user creates containers and activates the link tool. The graphics 7A to 7C will be explained in turn.

Containers 0701 and 0702 in the graphic 7A are the same as the containers 407 and 408 in FIG. 4 described above, and are containers having fixed sides. Objects 0703 and 0704 are the same as the object 409 and mean anchors. An object 0705 means a mouse pointer. The user selects one container to which a link is to be set by clicking it (0603). As shown in a graphic 7B, the user moves the mouse pointer to the other container, and clicks it (0604). A line 0706 shown in the graphic 7B is a line which connects the position clicked in the graphic 7A and that of the moved mouse pointer, and is a UI which presents, to the user, the position where the link is set. After completion of process 0604, a link UI denoted by reference numeral 0707 is displayed at the set position (0605). The containers have a state shown in a graphic 7C. Upon setting the link, the UIs of the containers are automatically changed (0606). Reference numeral 0708 denotes sides indicated by the broken lines in the graphic 7C, i.e., flexible sides, as described above. The reason why the states of the sides of the containers change, as shown in the graphic 7C, is that the sides of the containers must be set to be variable as a result of the setting of the link. This processing is automatically done to avoid inconsistency that all the sides are fixed although the link is set. Objects 0709 are the same as the objects 505 in FIGS. 5A to 5D, and are marks which visually show the user the directions in which the containers can be changed upon setting of the link. In the example of the graphic 7C, the right side of the left container and the left side of the right container become variable. However, this is merely an example, and the right container may change to a setting having sliders 413 shown in FIG. 4.

<Dynamic Layout Calculation Method (Overall Sequence)>

Figure 8:
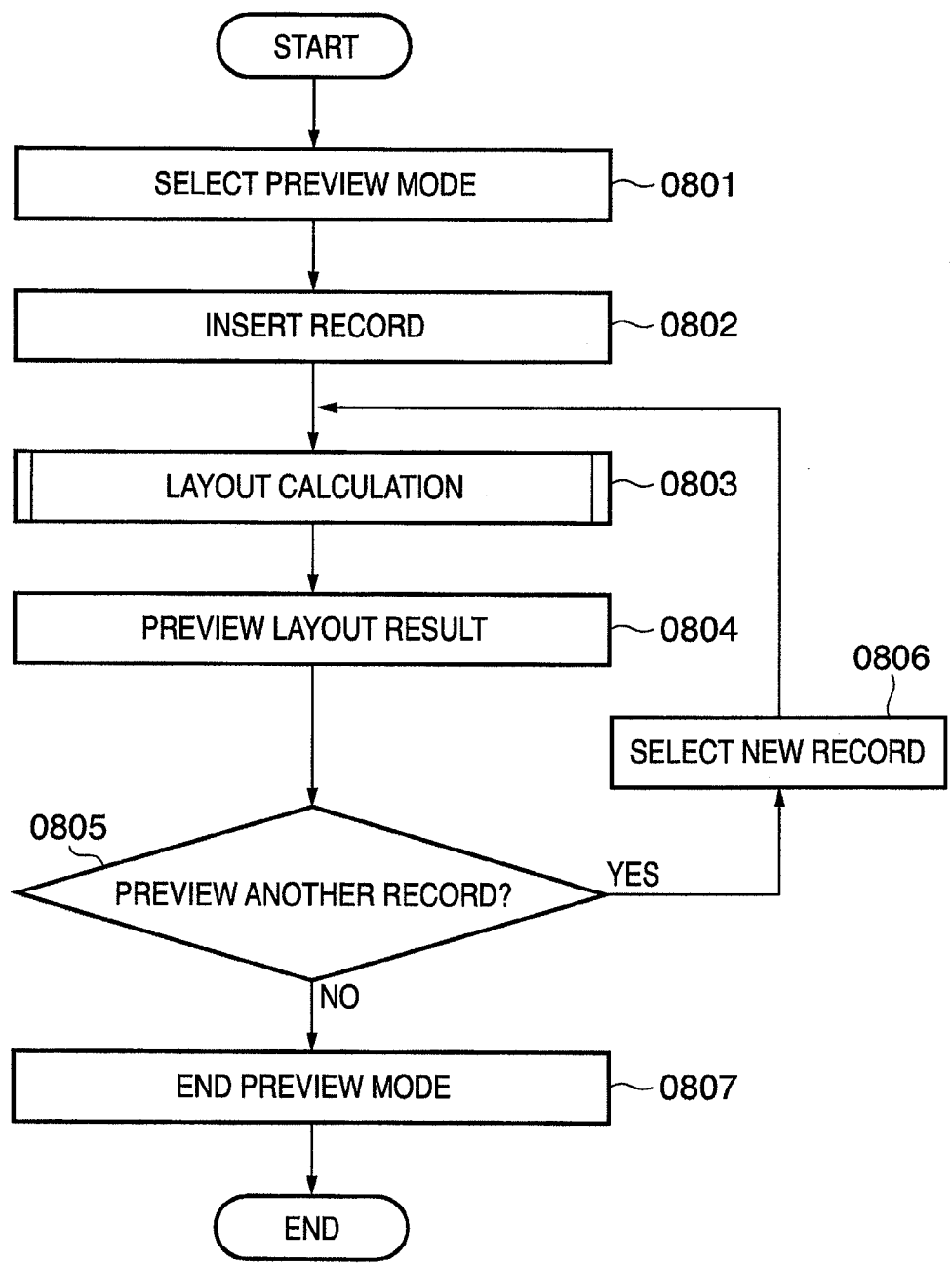
FIG. 8 is a flowchart showing the overall procedure of layout calculations according to the present invention.

FIG. 8 is a flowchart of the dynamic layout calculation. The user selects a preview mode (0801). The aforementioned automatic layout system has a layout mode and preview mode as its operation modes. In the layout mode, containers are created, and are associated to create template data. In the preview mode, a record is inserted into the created template, and a layout result after the record is actually inserted is previewed. In this preview mode, an actual record is inserted, and a layout is calculated. However, the preview mode executes a layout calculation on display. In an actual print mode as well, a record is inserted and a layout is calculated. The calculation method in such case is the same. After the preview mode is selected, the user selects a record to be previewed and inserts it (0802). Upon inserting the record, a calculation is made to lay out that record (0803). The layout calculated in process 0803 is displayed (0804). It is checked if another record is to be previewed (0805). It is determined in process 0805 that another record need not be previewed, the preview mode ends (0807). If another record is to be previewed, the other record is selected, and a layout calculation is made again to preview the calculated layout (0806). Not in the preview mode but in the print mode, layout calculations are made in turn for all records to be printed. Therefore, processes 0805 and 0807 are not present. Upon completion of printing of all records, the processing ends.

<Dynamic Layout Calculation Method (Detailed Sequence)>

Figure 9:
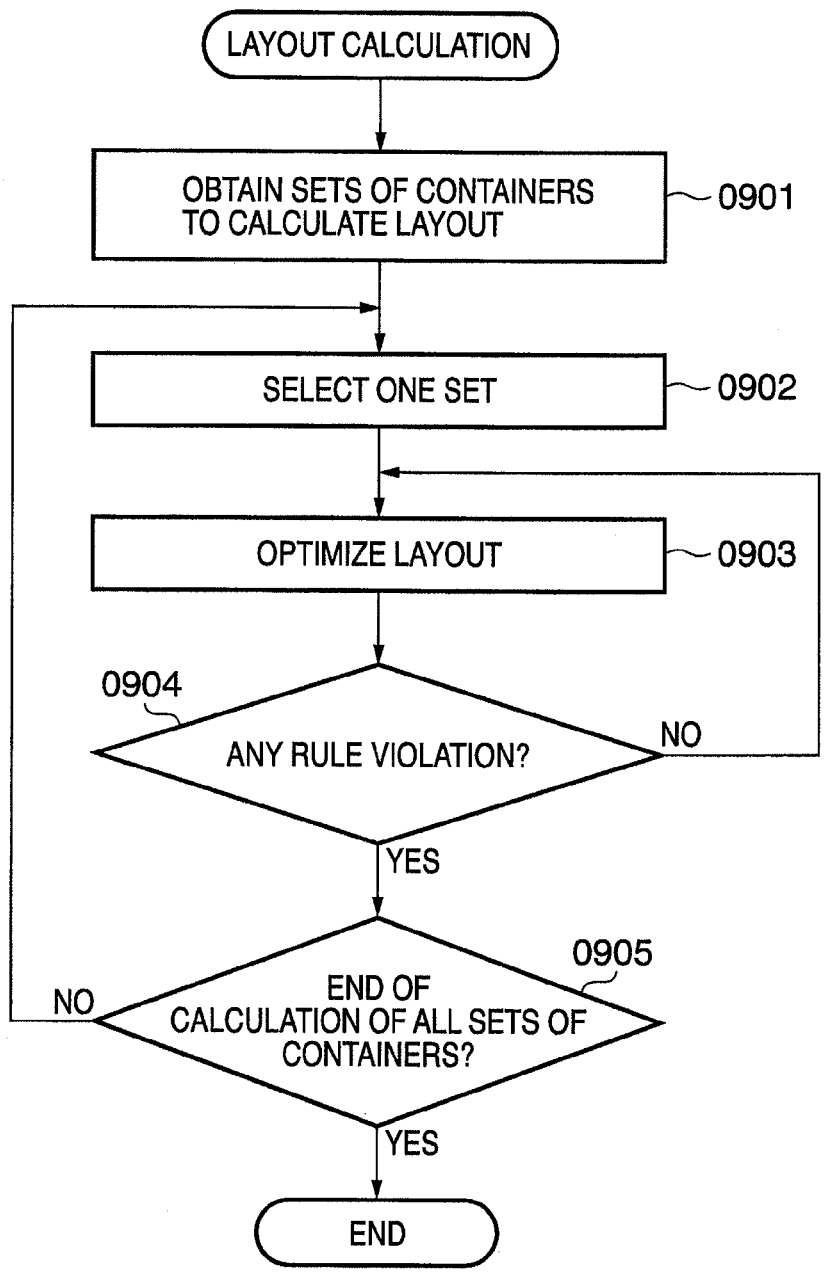
FIG. 9 is a flowchart showing the detailed procedure of the layout calculations according to the present invention.
Figure 10:
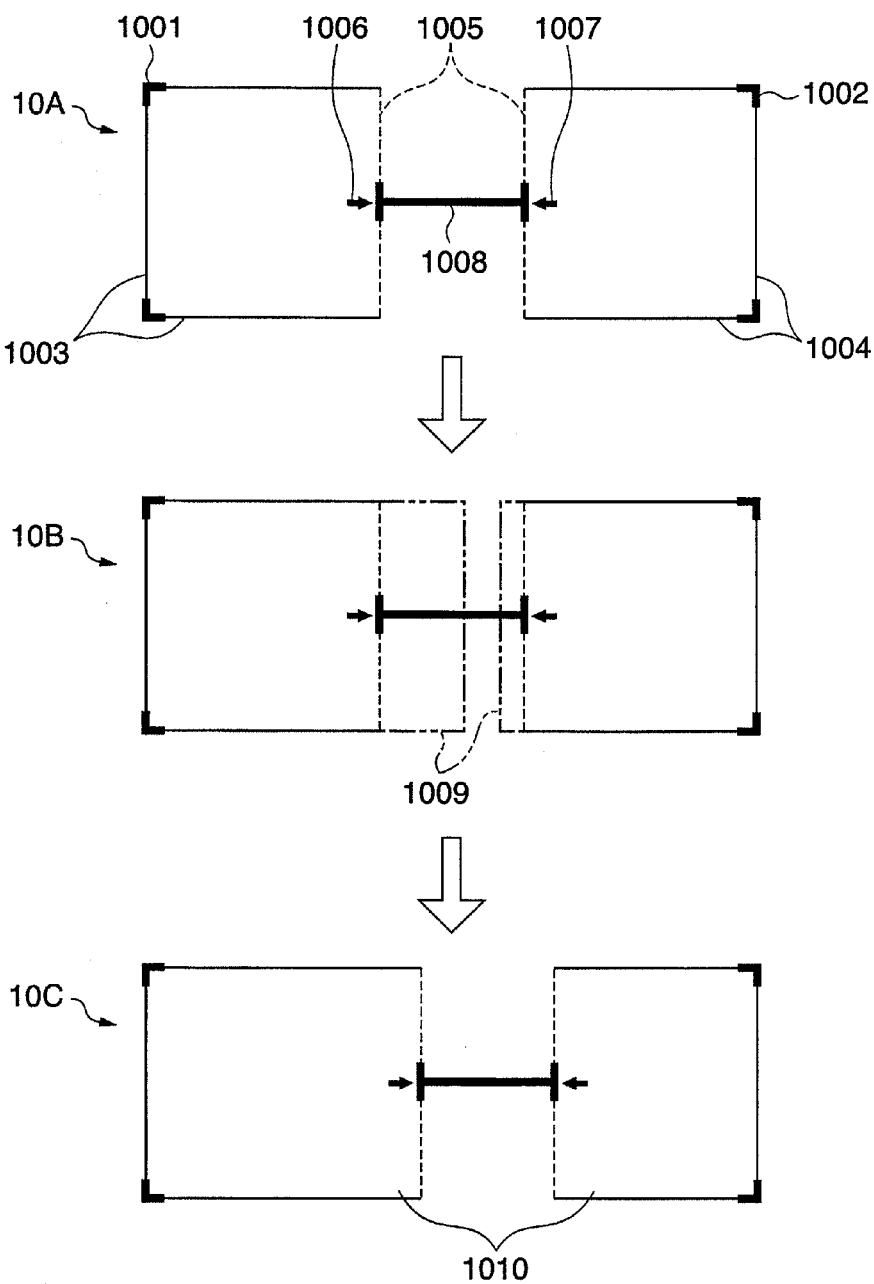
FIG. 10 shows a UI example corresponding to the procedure shown in FIG. 9 according to the present invention.

FIG. 9 is a flowchart showing details of the dynamic layout calculation. Also, FIG. 10 shows a UI display example at that time.

Figure 11:
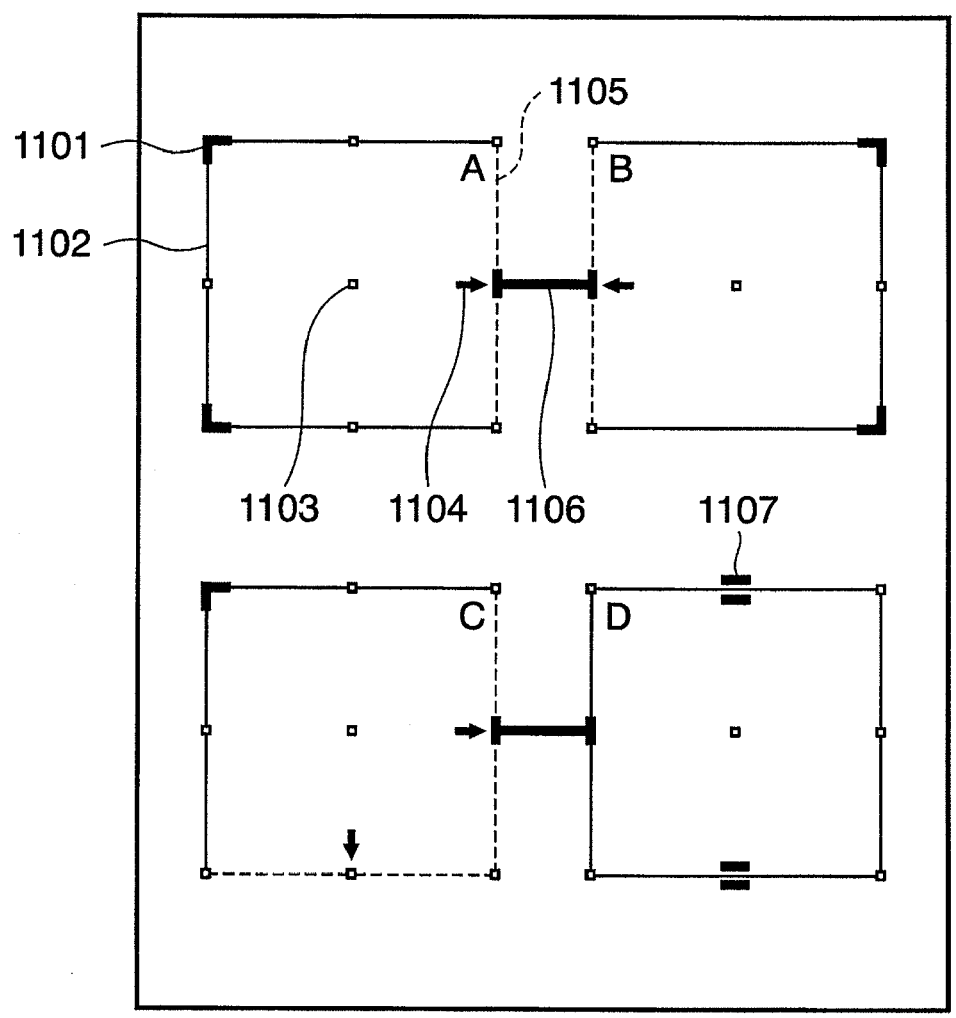
FIG. 11 is a view for explaining sets of containers upon layout calculations according to the present invention.

Sets of containers, the layout of which is to be calculated, are obtained (0901). The layout calculation is made for the associated containers as one set. For example, referring to FIG. 11, four containers are laid out on a page, and are associated with each other. In this case, containers A and B, and containers C and D are associated by links. Hence, containers A and B form set 1, and containers C and D form set 2. Referring to FIG. 11, reference numeral 1101 denotes anchors; 1102, fixed sides; 1103, controllers; 1104, arrows which indicate change directions of flexible sides; 1105, flexible sides; and 1107, sliders.

One set is selected from the obtained sets of containers so as to calculate a layout (0902). The layout of the selected set is calculated. The layout is optimized to minimize the differences between the sizes of the containers to be laid out and those of actual contents (0903). The optimization of the layout is done so that the differences between the sizes of contents respectively inserted into the associated containers to allow a dynamic change in size and those of the containers to be laid out are possibly equal to each other between the containers. After optimization of the layout, if any rule violations are found, the layout is calculated again to correct the rule violations (0904). The rules are limitations which are set by the user upon creation of a layout, and include the sizes and positions of containers, the length of a link, and the like. If the layout free from any rule violations is calculated, the layout of that set is completed. The processes in steps 0902 to 0904 are applied to all the sets on the page to calculate the layout on the entire page (0905).

If an insoluble layout error has occurred in step 0904, error delivery using an RSS feed in this embodiment is executed. For example, if an error cannot be eliminated even after execution of the layout calculation twice, it is determined that an insoluble error has occurred. An explanation of this sequence will be given later with reference to FIG. 19 and the like.

FIG. 10 shows UI examples upon layout calculation. A graphic 10A represents a state in which given records are inserted into the already defined template to decide a layout. Objects 1001 and 1002 are anchors. Objects 1003 and 1004 are fixed sides. Objects 1005 indicate flexible sides, objects 1006 and 1007 indicate change directions of the flexible sides, and an object 1008 indicates a link. In this state, records of content data to be inserted into the template are changed, and content data with different sizes are inserted into the containers. A graphic 10B shows the sizes of new contents to overlap the state of the graphic 10A. Two-dashed chain lines 1009 represent the sizes of the contents of the new records to be inserted into the respective containers. Then, the layout calculation is made. The sizes of the containers after calculation are calculated to have a difference equivalent to that between the sizes of the contents to be actually inserted and not to violate the aforementioned rules. As indicated by a graphic 10C, the content size (1009) to be inserted, which is indicated by the graphic 10B and content size (1010) after calculation have equivalent differences.

<Set Flexible Link>

Figure 12:
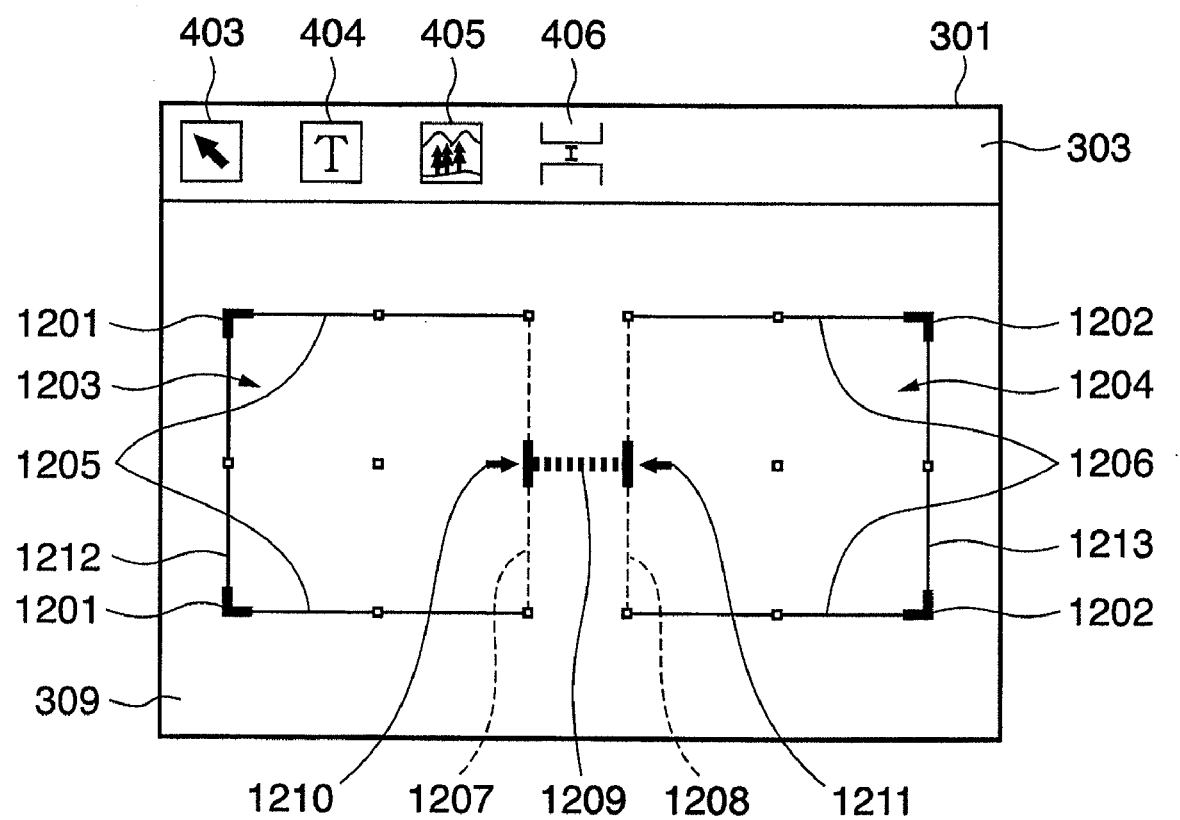
FIG. 12 shows a container layout by a typical flexible link according to the present invention.

FIG. 12 shows the state of a general flexible link. As in FIG. 4, FIG. 12 shows the application window 301 and tool bar 303, and containers 1203 and 1204 exist on the document template 309. The respective containers are typically made up of anchors icons 1201 and 1202 and fixed sides 1205 and 1206. A link 1209 with a variable size is set between the edge containers 1203 and 1204 to connect them. Since the link is set between the containers 1203 and 1204, a right side 1207 and a left side 1208 of these containers are expressed by the broken lines. For this reason, indicators 1210 and 1211 are displayed on the respective containers to indicate that the sides 1207 and 1208 are variable.

Figure 14:
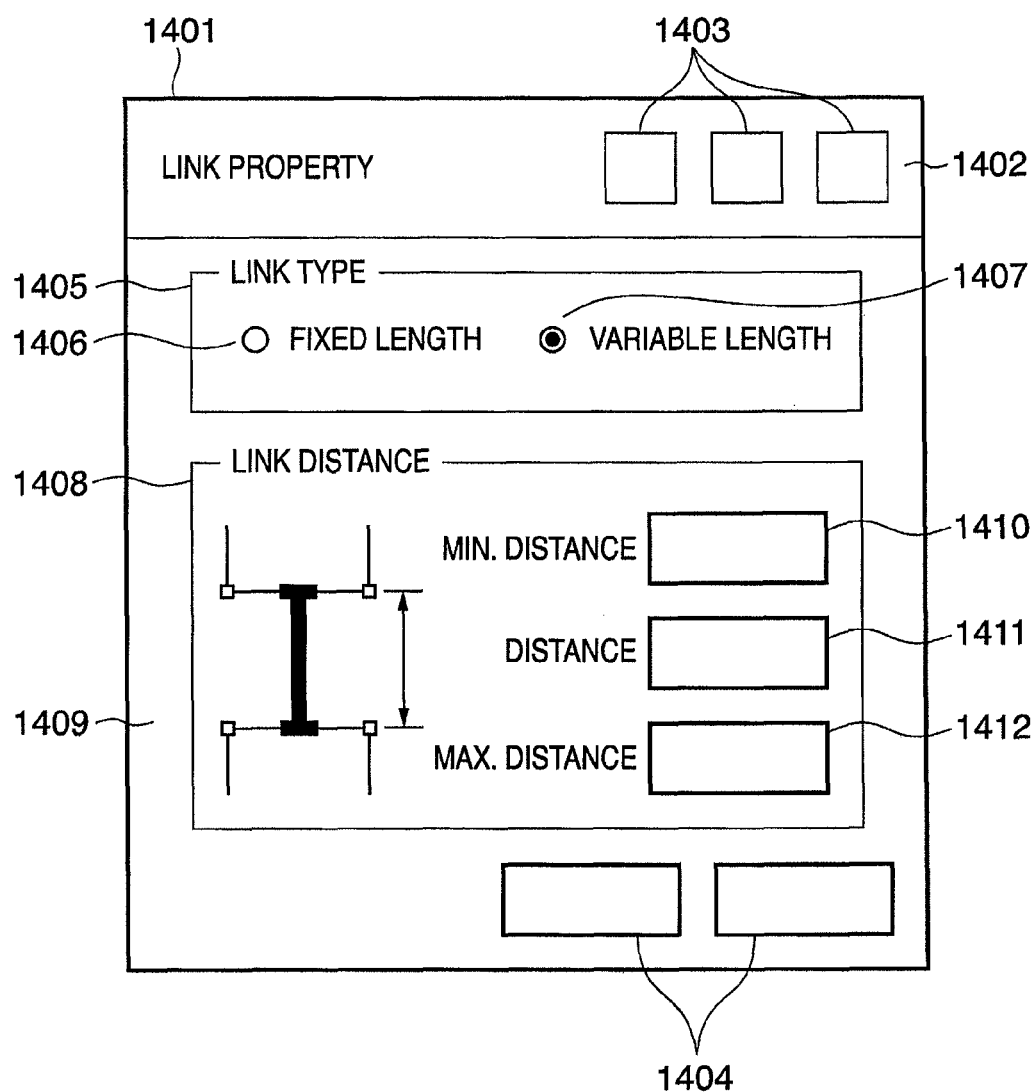
FIG. 14 shows a typical link setting dialog window according to the present invention.

FIG. 14 shows an example of a dialog window 1401 used to set information of the link 1209. This dialog typically includes a title bar 1402, tool buttons 1403, buttons 1404 used to open or close the dialog window, and an area 1409 on which various kinds of information are set. This dialog window allows to select a link type from a flexible length and fixed length using buttons 1407 and 1406, and to set a maximum value, minimum value, and current value of the link distance in text boxes 1410, 1412, and 1411 in case of the flexible length.

Figure 13:
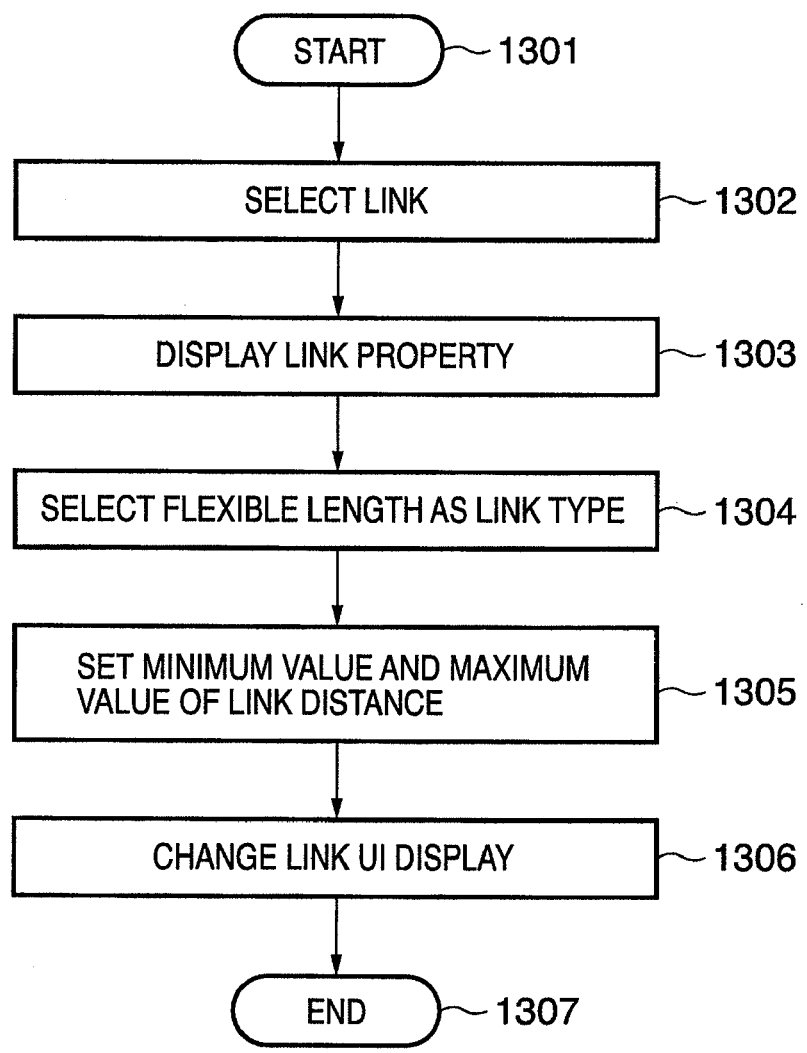
FIG. 13 is a flowchart showing an operation transition up to the state shown in FIG. 12 according to the present invention.
Figure 15:
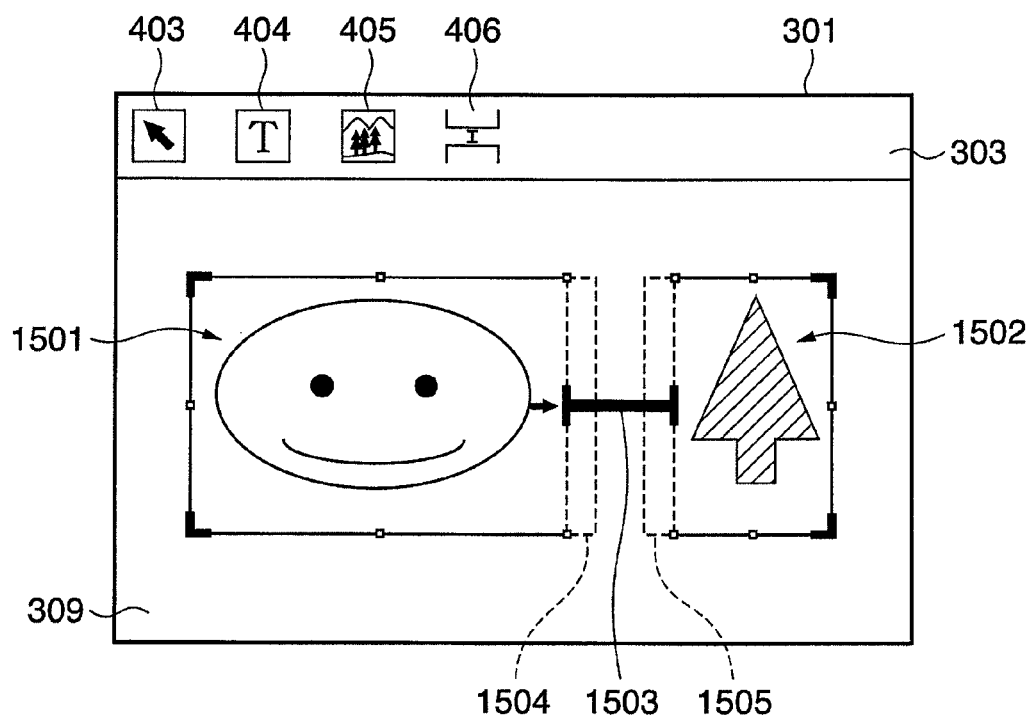
FIG. 15 shows a layout result based on a fixed link according to the present invention.

FIG. 13 is a flowchart showing transition of the operations from the state of, e.g., a link 1503 with a fixed size, which is set between containers A and B in FIG. 15 to the state in FIG. 12 that shows the link 1209 with a flexible size, in accordance with the aforementioned link setting method. The user selects the link 1503 by clicking the mouse button (1302). The user clicks the right button of the mouse or presses a specific key on the keyboard to display the property dialog window 1401 of the selected link 1503 (1303). In this state, since the link size is not flexible but fixed, the fixed length button 1406 is selected on the link type field 1405. In order to change the link from the fixed size to the flexible size, the user selects the flexible length button 1407 on the link type field 1405 (1304). As a result, the max. distance, min. distance, and distance text boxes 1412, 1410, and 1411 in the link distance field 1408 are enabled to allow the user to set numerical values. Hence, in order to set the flexible size of the link, the user sets the maximum value, minimum value, and current value of the link distance in the max. distance, min. distance, and distance text boxes 1412, 1410, and 1411 (1305). When the user applies the settings using the general dialog window open/close button 1404, the UI display of the link changes to the state of the link 1209 shown in FIG. 12 (1306). The setting information on this dialog window 1401 is stored in the memory.

FIG. 15 shows a layout result when the link with the fixed size is used. The layout calculation method is executed according to the sequence described above. For example, when data of different sizes are respectively inserted into the containers 1203 and 1204 in FIG. 12, the sizes of these containers change to fit those of the data. For example, the container 1203 changes its size to extend to the right so as to be close to a frame 1504 (optimal container size) of the inserted image size. Likewise, the container 1204 also changes its size to slightly extend to the left so as to be close to a frame 1505 (optimal container size) of the inserted image size. Assume that the link with a fixed size is set between the containers 1203 and 1204. Since a left side 1212 and right side 1213 of the containers 1203 and 1204 cannot move since they are fixed by the anchors 1201 and 1202. For this reason, in order to fit the container sizes to the image sizes, the container sizes after change cannot meet the limitations of the link distance. Since the link size is fixed, it is preferentially calculated upon layout calculation. For this reason, the sizes of the containers 1203 and 1204 are changed in correspondence with the link distance. As a result, the containers 1203 and 1204 cannot assure optimal sizes that fit the data sizes, and finally become smaller than the optimal sizes (frames 1504 and 1505) like the containers 1501 and 1502 in FIG. 15. Since the size of the link 1503 is fixed, the containers 1501 and 1502 do not attain the optimal sizes.

Figure 16:
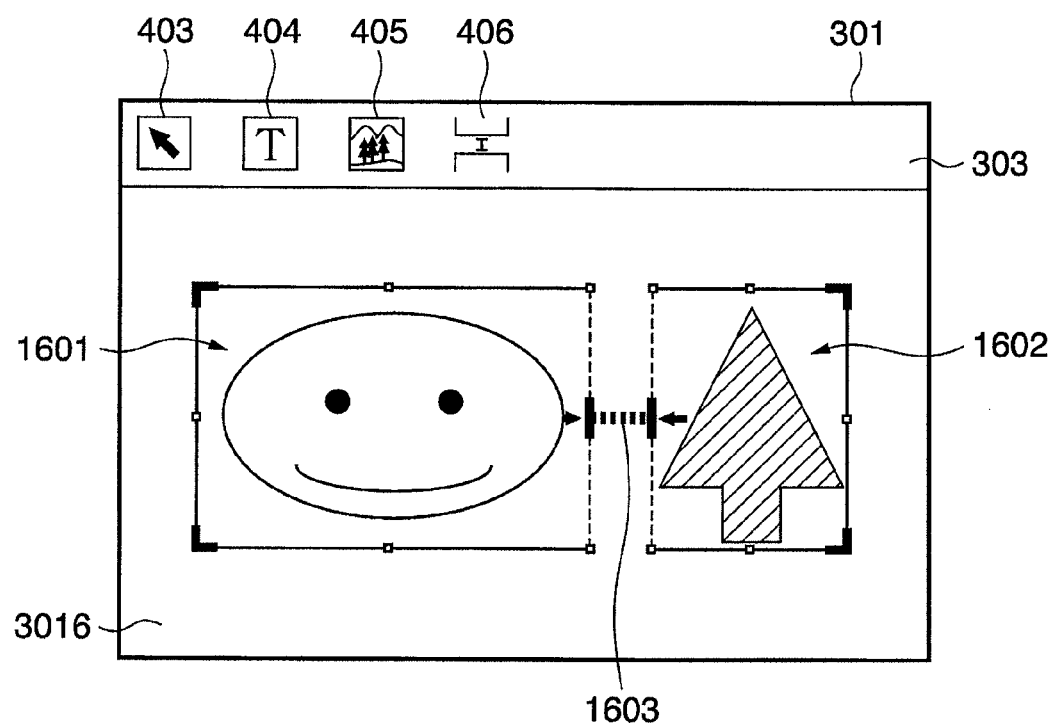
FIG. 16 shows a layout result based on a flexible link according to the present invention.

FIG. 16 shows a case in which a link is set to have a flexible size. In this case, assume that a link with a flexible size is set between the containers 1203 and 1204 in the above example, as shown in FIG. 16. Upon changing the sizes of the containers 1203 and 1204, since the link size decreases, the sizes of the containers 1203 and 1204 can become larger than those in the above example. For this reason, the optimal container sizes that fits the data sizes to be inserted can be attained. Alternatively, the frames of the containers can be calculated to be closer to the data sizes to be inserted (optimal sizes). As a result, containers 1601 and 1602 in FIG. 16 are obtained. The flexible link 1209 changes to have a size of a flexible link 1603 as a result of the layout calculation, and in this case, the containers 1601 and 1602 respectively have optimal sizes (those that fit the data sizes).

As will be described later, in this embodiment, when an error has occurred like in FIG. 15, (an image overflow error in the example of FIG. 15), link information to template data and content data is delivered to the user (or administrator) together with information indicating occurrence of the error. Upon reception of the information, the user edits a template to change the link between the containers to a flexible link, as shown in, e.g., FIG. 16, thus creating a template free from any error.

<Property Setting of Container>

Figure 17:
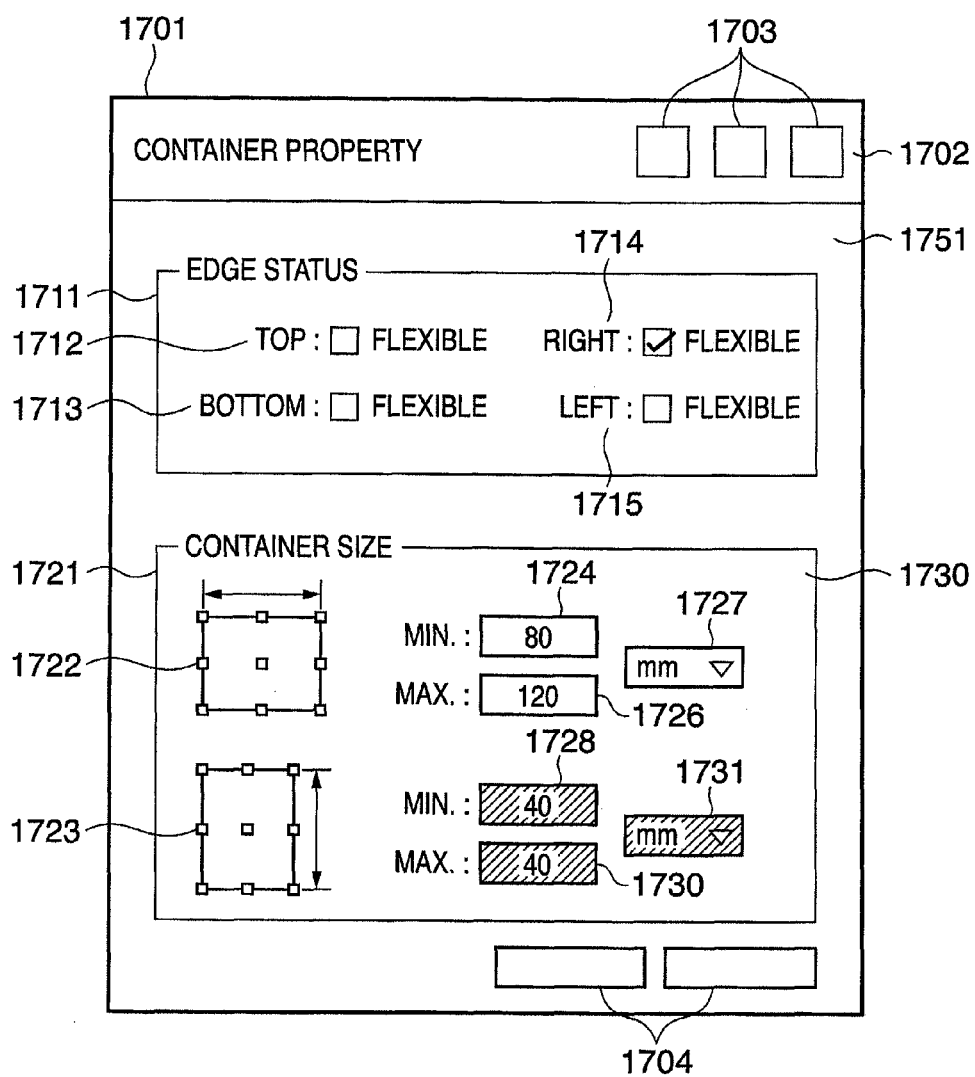
FIG. 17 shows a dialog used to set the properties of a container according to the present invention.

FIG. 17 shows a dialog used to set the properties of a container. The property dialog window is typically displayed when the user selects a container using the keyboard 202 or mouse 203, and selects an corresponding item from a menu displayed by clicking the right button of the mouse or presses an Alt key or the like on the keyboard. In this embodiment, the property dialog window displays only settings as to whether or not the edges of a container are flexible and which layout method is to be applied. This property dialog window 1701 typically includes a title bar 1702, tool buttons 1703, buttons 1704 used to open or close the property dialog window, and an area 1751 on which various kinds of information are set. On this property dialog window 1701, an edge status group box 1711 includes options 1712 to 1715 used to set flexible edge status of a container and to set a flexible container itself. When at least one of these options is ON, a container size group box 1721 is enabled. In case of this example, since only the "right" (right side) check box 1714 is checked to set "flexible", this container can change its size only in the widthwise direction (in the right direction in practice). For this reason, on the container size group box 1721, width size item text boxes 1724 and 1726 are enabled, and height size item text boxes 1728 and 1730 remain disabled. A graphic 1722 is a bitmap which visually assists designation of the width size of the container, and a graphic 1723 is a bitmap which visually assists designation of the height size of the container. In the box 1724 (min. size), a minimum value of the width of the container is set. Currently, a value "80" is set in this box. In the box 1726 (max. size), a maximum value of the width of the container is set. Currently, a value "120" is set in this box. Likewise, the boxes 1728, 1729, and 1730 are used to set a maximum value of the height of the container, a basic width, and a maximum value of the height of the container. List boxes 1727 and 1731 are used to set a unit of the container size. In this case, "mm" is selected as an example, but "inch", "pixel", and the like may be selected.

Figure 18:
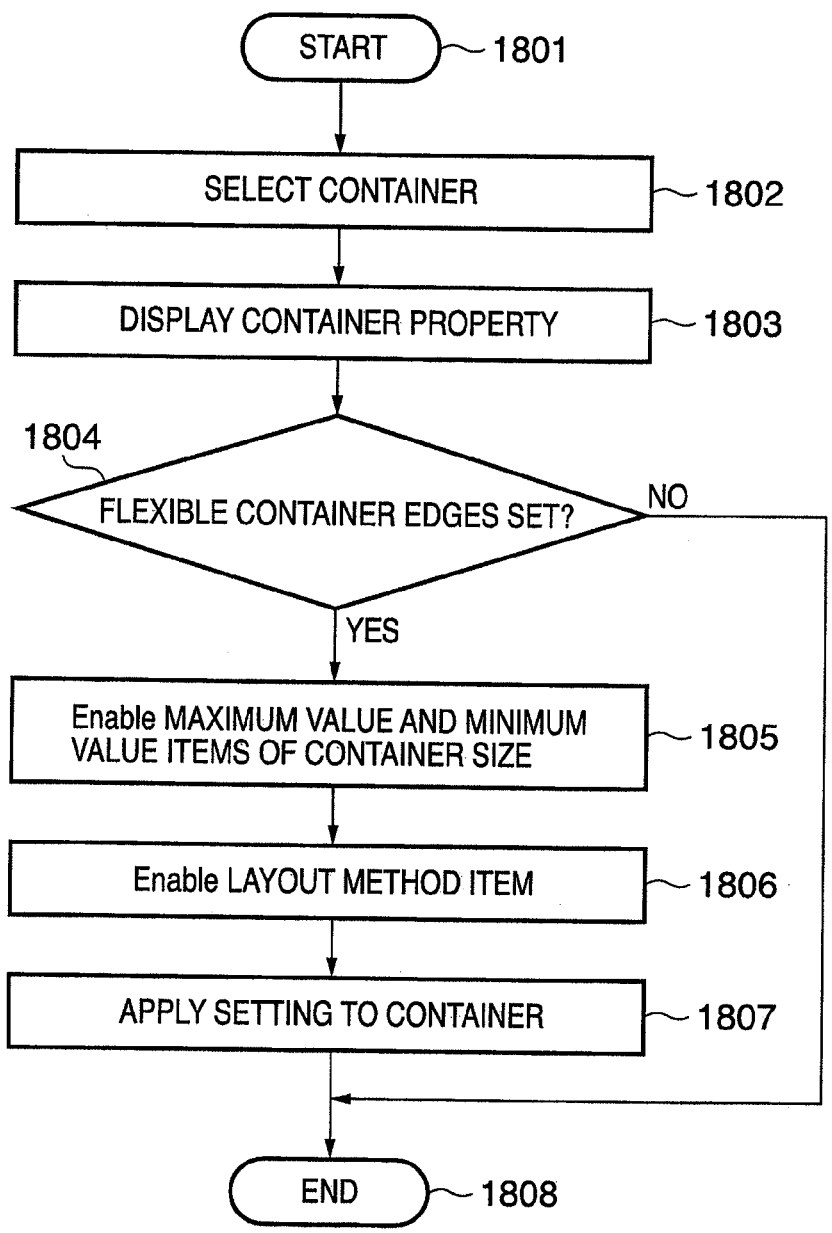
FIG. 18 is an operation flowchart of a layout application program in the container property setting operation according to the present invention.

FIG. 18 is a flowchart showing the operation of the template edit application program 121 in the above container property setting operation. The user selects a container (1802), and the program displays the properties of that container (1803). The program checks for items of respective sides if each container edge is set to be flexible (1804). If the container edge or edges is or are set to be flexible, the program enables the maximum value and minimum value boxes (1805). At the same time, the program enables option items of layout methods (1806). Upon pressing of an OK button or the like, the program closes the container property dialog, and applies the settings to the container (1807).

<Example of Information Included in Template>

As described above, the template data (or layout data) includes the following information.

(1) Container Property Information

Container property information includes information indicating the position of a container, the size of the container, whether the sides or vertices of the container are flexible or fixed at corresponding positions (also called side properties), the type (text, image, and the like) of object to be merged, properties (character size and the like) of the object, and so forth.

(2) Information Between Containers

Information between containers includes the distance between the containers indicated by a link, information indicating whether the distance is fixed or flexible, information indicating the positional relationship between the containers, and the like.

(3) Fixed Information

Fixed information includes information of character strings, images, and the like fixed to the template.

As described above, the template includes the container property information, information between containers, and fixed information. The user can edit these pieces of information via the graphical user interface of the aforementioned layout editor.

<Layout Check Function of Template Edit Application>

Figure 19:
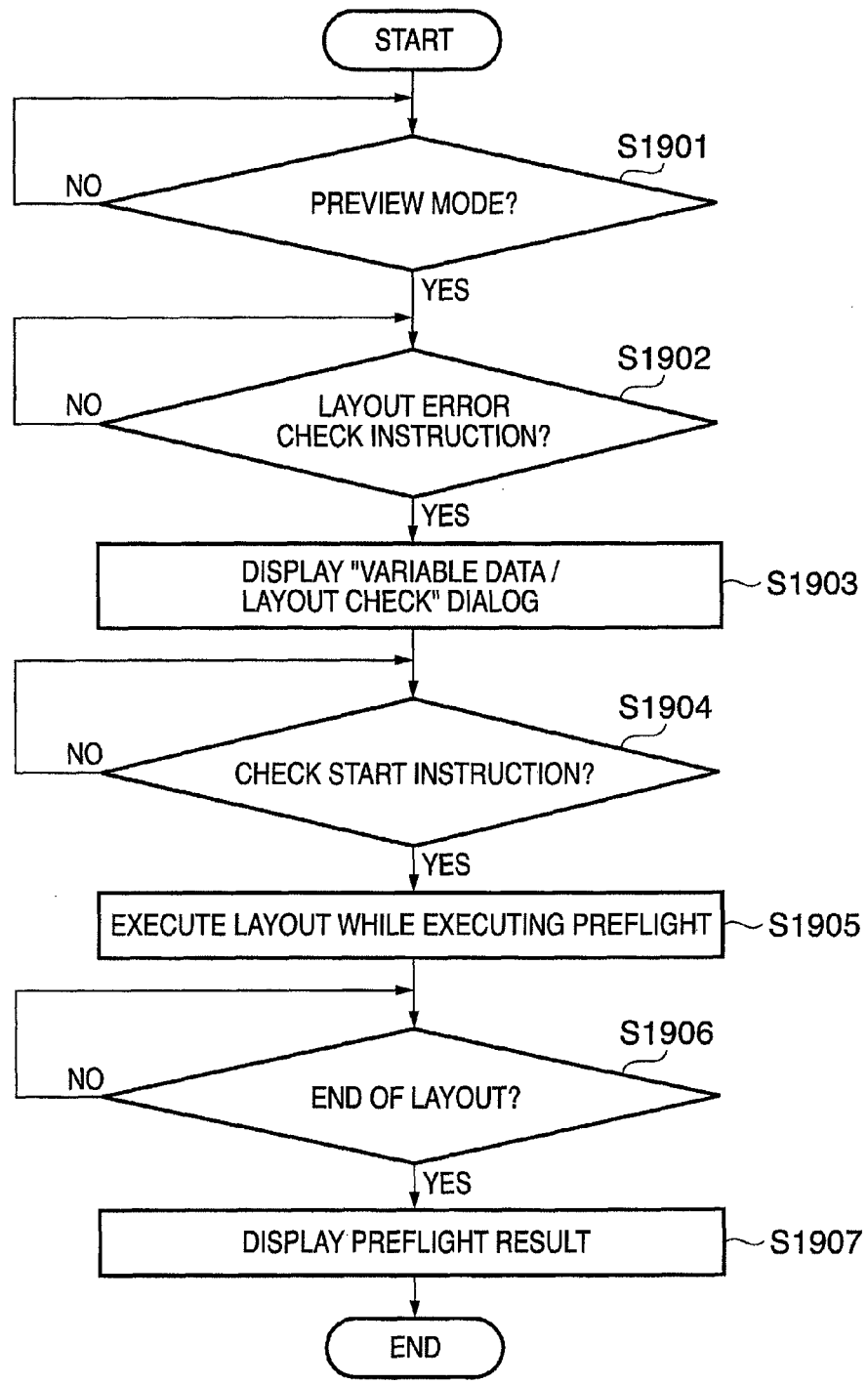
FIG. 19 is an operation flowchart of a layout check function of a layout edit application program according to the present invention.
Figure 20:
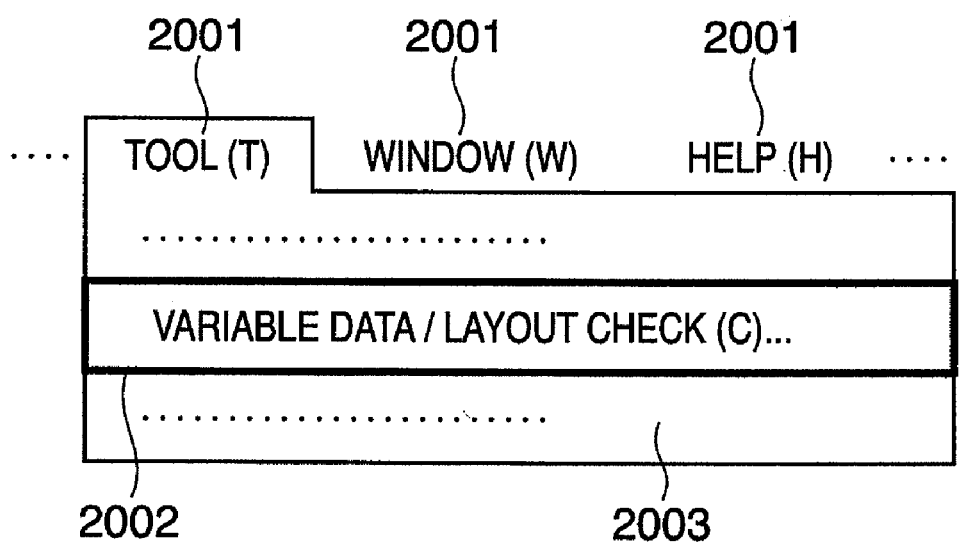
FIG. 20 shows a menu bar of a template edit application program according to the present invention.

FIG. 19 is a flowchart showing the operation of the layout check function of the template edit application program 121. FIG. 20 shows a menu bar 2001 of the template edit application program 121. A menu list includes a plurality of items, and a "variable data/layout check (C) . . . " menu item 2002 is prepared in these items. This menu item is valid in only the preview mode of data. More specifically, this menu item can be selected when the template edit application program 121 merges variable data with the template, and the layout engine 127 lays out the variable data. The sequence shown in FIG. 19 is executed when the user selects the "variable data/layout check" menu item 2002.

When a template editor selects the "variable data/layout check (C) . . . " menu item 2002 from the menu bar 2001 of the template edit application program 121 using a mouse pointer 2003 shown in FIG. 20, and instructs the template edit application program 121 to check any layout error, the processing in FIG. 19 starts.

In FIG. 19, the program checks if the preview mode is set (S1901), and then checks if the layout check instruction is received (S1902). However, since the item 2002 is displayed in only the preview mode, these steps may be omitted.

The template edit application program 121 displays a "variable data/layout check" dialog 2101 shown in FIG. 21 (S1903). On the "variable data/layout check" dialog 2101, the user can press a [start] button 2102. The template edit application program 121 checks if the user has pressed the check [start] button 2102 (S1904). If the user has pressed the [start] button, the template edit application program 121 makes re-layout while conducting the preflight inspection using the layout engine 127 (S1905). After completion of the re-layout (S1906), the program 121 displays the preflight inspection result on a "variable data/layout check" dialog 2201, as shown in FIG. 22 (S1907). The program presents layout errors to the user via this display. A [relevance number] list box 2203 in FIG. 22 displays a list of the numbers of errors relevant to respective check items. The first column displays relevant record numbers, and the second and subsequent columns display the numbers of errors in respective check items. Note that content data used in the sequence of FIG. 19 is loaded from a data file independently designated by the user. The loaded data is laid out in accordance with the template. Note that variable data is content data to be laid out according to the template, and variable data to be applied to one template forms one record.

The displayed check items include text overflow, image overflow, container, general error, and the like. Text overflow checking is to check a text overflow which occurs when text cannot fit in a container. Image overflow checking is to check an image overflow which occurs when an image cannot fit in a container. Container checking is to check whether or not an empty object without any values exists due to absence of values in a database. General error checking is to check other general errors.

An [error/alert] list box 2204 in FIG. 22 displays a list of error/alert details of a record selected in the [relevance number] list box 2203. The first column of the [error/alert] list box 2204 displays error/alert icons each indicating an error or alert, the second column displays page numbers where errors have occurred, and the third column displays comments of the error/alert.

The user of the template edit application program 121 performs the edit operation of a template free from any layout errors or a template which does not generate an unexpected layout using the result of the layout check function.

<Execution of Layout Check in Server>

(Layout Check Processing in Content Server)

Figure 23:
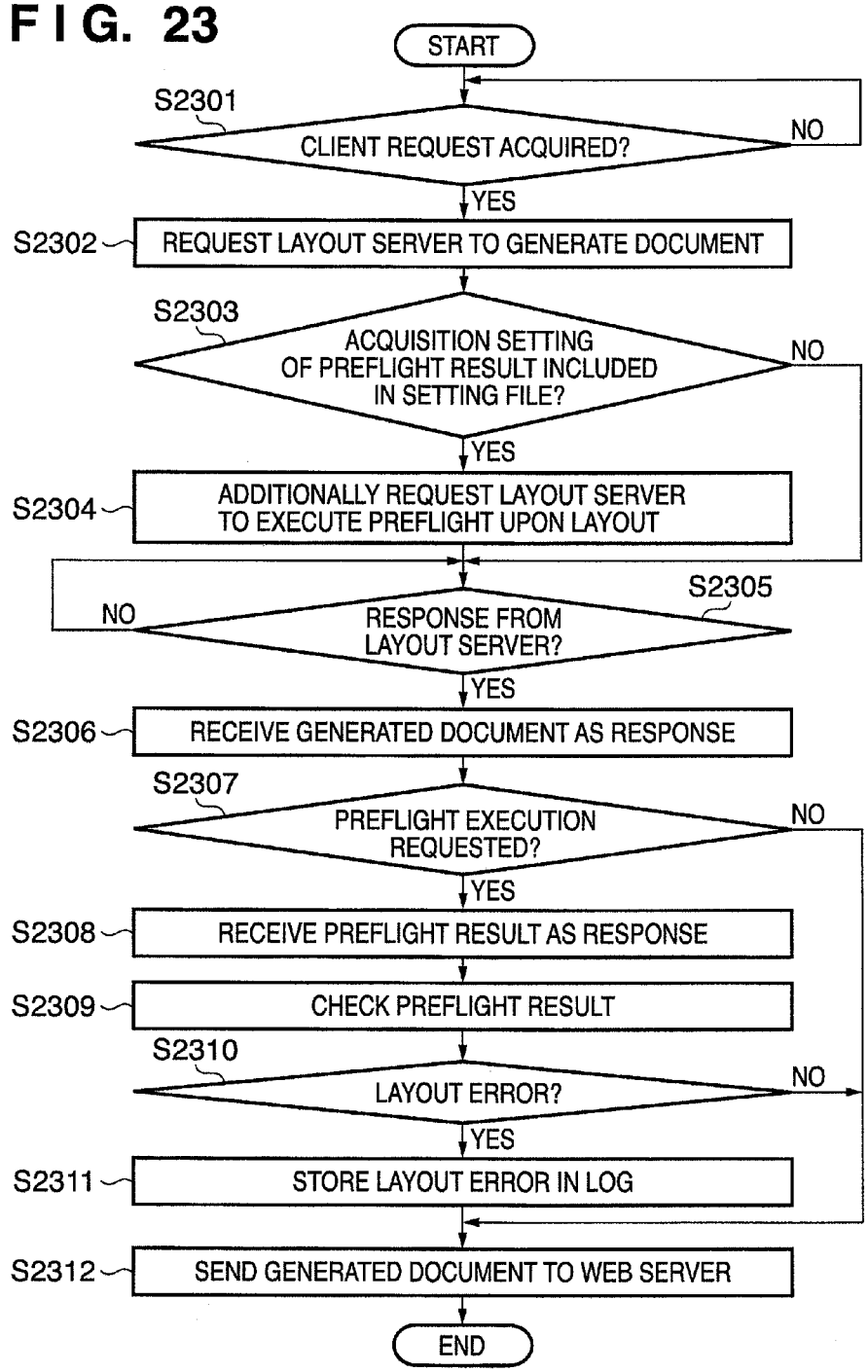
FIG. 23 is an operation flowchart upon execution of layout check processing of a content server according to the present invention.

FIG. 23 is a flowchart showing the operation upon execution of the layout check processing in the content server 103.

In FIG. 23, the content server 103 can receive a request from the Web browser application 125 used by a general user via the Web server 106. Upon reception of the request (S2301), the content server 103 sends a document generation request to the layout server 105 together with template designation, variable data designation and actual data transmission, and document format designation (S2302).

In this case, if an acquisition setting of the preflight result is made in the setting file of the content server 103 (S2303), the content server 103 sends an additional request to execute preflight upon layout to the layout server 105 (S2304). More specifically, the setting file with the acquisition setting of the preflight result includes the following contents.

```
<?xml version="1.0" encoding="Shift_JIS"?>
<layout-server>
    <request>
        <layout>
            <option>
                <proofing>1</proofing> <! - if 1, request the preflight ->
            </option>
        </layout>
    </request>
</layout-server>
```

After the request, the content server 103 waits for a response from the layout server 105 (S2305). Upon reception of a response to the request returned from the layout server 105, the content server 103 receives the generated document as the response (S2306). Furthermore, if the preflight execution request upon layout is issued (S2307), the content server 103 receives the preflight result (S2308).

The content server 103 checks the received preflight result (S2309).

If a layout error has occurred (S2310), the content server 103 stores in its storage device 209 that layout error as a layout error log together with the template designation value and variable data designation value upon issuing the request (S2311).

Finally, the content server 103 sends the generated document received as the response to the Web server 106 so as to return it to the Web browser application 125 which issued the request (S2312), thus ending the processing.

(Layout Check Processing in Layout Server)

Figure 24:
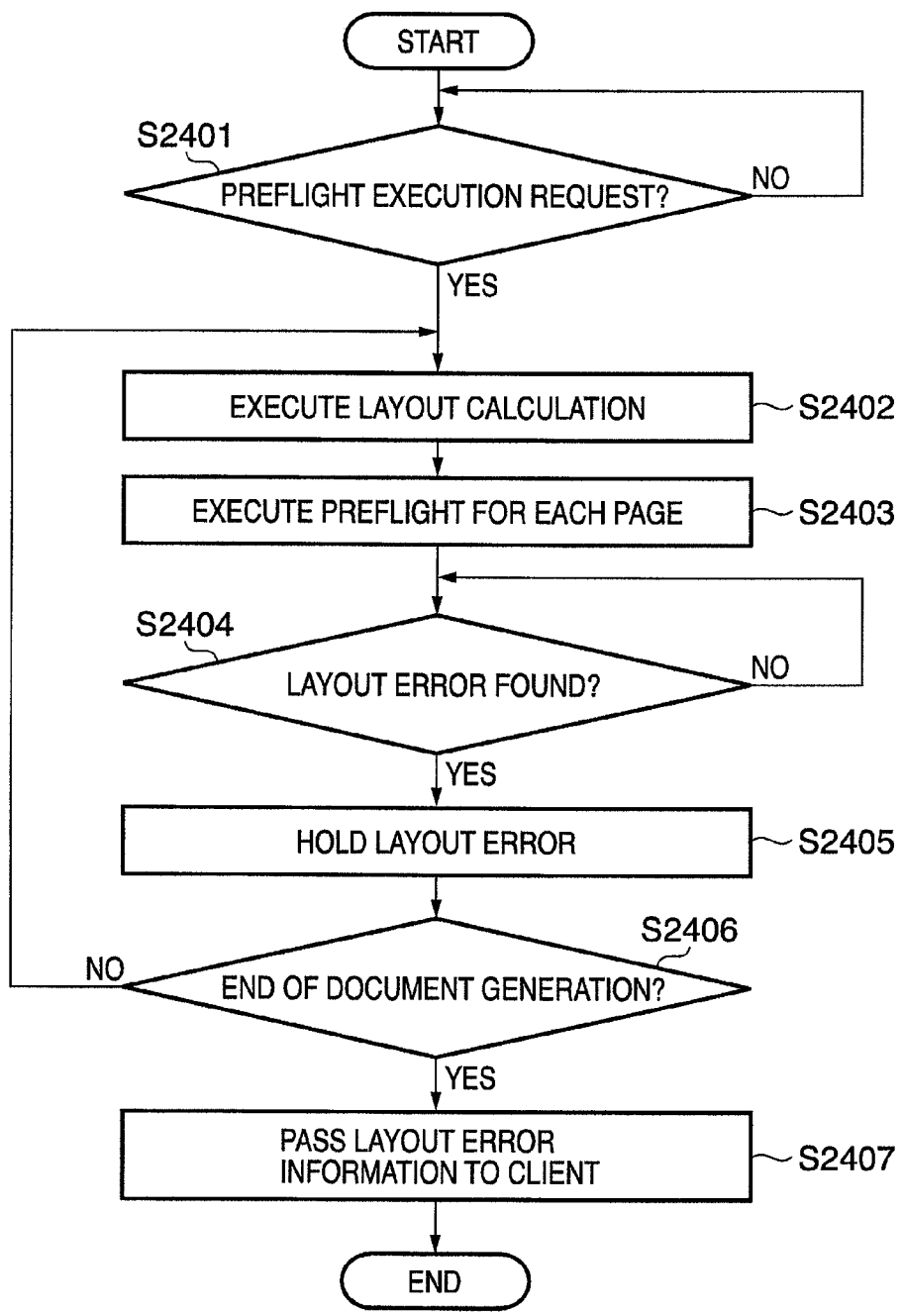
FIG. 24 is an operation flowchart upon execution of layout check processing of a layout server according to the present invention.

FIG. 24 is a flowchart showing the operation upon execution of the layout check processing in the layout server 105. Referring to FIG. 24, the layout server 105 can receive an additional request to execute preflight upon layout from the content server 103 or the like. Upon reception of the additional request (S2401), the layout server 105 executes the layout calculation shown in FIGS. 8 and 9, and generates a document page (S2402). In this case, the layout server 105 executes preflight for each page (S2403) to check an error on the layout such as overflow of the content and the like.

The layout server 105 checks if any layout error is found by the above check process (S2404). If any layout error is found, the layout server 105 holds that error for each page in the following data format (S2405).

Pre-Print: 0x13127,
Print-Page#1: 0x13020, 0x13022, 0x13060,
Print-Page#2:,
Print-Page#3:,
Print-Page#4: 0x13020, 0x13021, 0x13022, 0x13060, 0x13121, 0x13123,
Post-Print: 0x13128, 0x13129.

Identifiers (called layout check step identifiers) in the data format indicate processing steps in which errors have been detected. The meanings of these identifiers are as follows.

Pre-Print: Pre-Print Check
Print-Page#n (n: page number): post-page print check
Post-Print: post-print check The meanings of error numbers corresponding to the respective identifiers are as shown in FIG. 27. Note that not all error codes always require to edit the layout. Of the errors shown in FIG. 27, "0x13020" corresponds to a text overflow, and "0x13021" corresponds to an image overflow. Also, "0x13060 corresponds to a container error.

Upon completion of document generation (S2406), the layout server returns information of found layout errors to the client such as the content server 103 or the like as the source of the additional request (S2407), thus ending the processing.

<Storage of Layout Error Log in Server>

Figure 25:
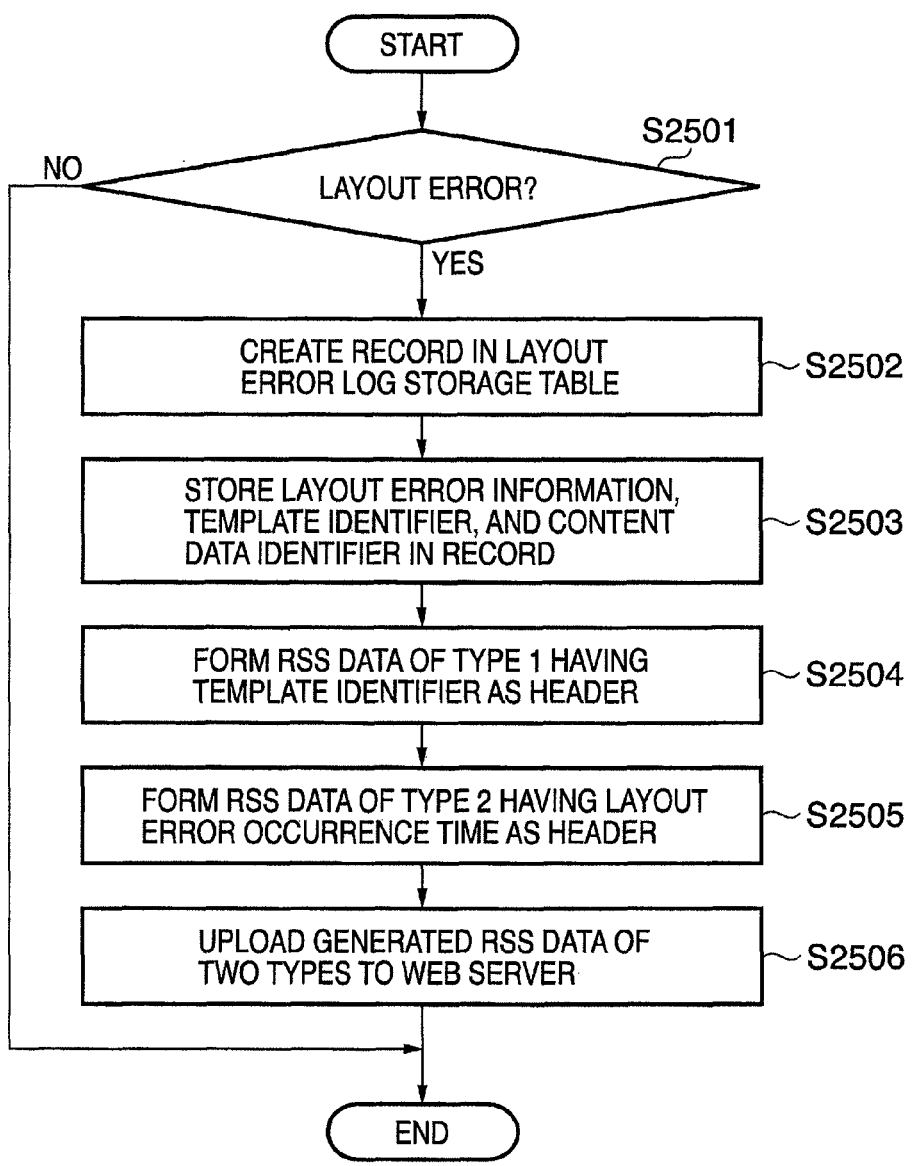
FIG. 25 is an operation flowchart upon storing a layout error log of the content server according to the present invention.

FIG. 25 is a flowchart showing the operation upon storing the layout error log in the content server 103. By the operation upon execution of the layout check processing in the content server 103 shown in FIG. 23 and by the operation upon execution of the layout check processing in the layout server 105 shown in FIG. 24, the content server 103 receives layout error information from the layout server 105. The content server 103 inspects this information and determines if layout errors have occurred upon generation of the requested document (S2501). If layout errors have occurred, the content server 103 creates a new record in a layout error log storage table in its database 119 (S2502). The content server 103 stores information of layout errors that have occurred, an identifier of the template used, and a record identifier of the content data in that record (S2503).

The content server 103 forms RSS data of a type which includes, as a header, information of the template identifier in a "Template ID" field 2602 shown in FIG. 26 (to be referred to as "type 1" hereinafter for descriptive purpose) from the data (record) stored in the layout error log storage table (S2504). Furthermore, the contents server 103 forms RSS data of a type which includes, as a header, information of the layout error occurrence time in a "Date and Time" field 2605 shown in FIG. 26 (to be referred to as "type 2" hereinafter for descriptive purpose) (S2505). The content sever 103 uploads the two RSS data of type 1 and type 2 to the Web server 106 (S2506), so that the Web browser application 122 can access these data. After that, the content server 103 ends the layout error log storage processing.

FIG. 26 shows a description example of the layout error log storage table. Referring to FIG. 26, a layout error log storage table 2601 stores information in the "Template ID" field 2602, a "Contents Record IDs String" field 2603, a "Layout Error String" field 2604, and the "Date and Time" field 2605. The "Template ID" field 2602 is a character string type column. The "Contents Record IDs String" field 2603 is a numeric array type column. The "Layout Error String" field 2604 is a character string type column. The "Date and Time" field 2605 is a date/time type column.

The "Template ID" field 2602 stores character strings of the template identifiers in which layout errors have occurred. For example, a record 2611 stores a template identifier "MITUMORI". This identifier is separately managed by the content server, and is associated with data, i.e., a file of an actual document template stored in the file server 104.

The "Contents Record IDs String" field 2603 stores numerical values of record identifiers of content data that have caused layout errors as elements of variable-length arrays. For example, the record 2611 of the layout error log storage table 2601 stores record identifiers "200", "133", "31", "42938", "3187", "98" . . . of a content data management table as elements of an array. FIG. 26 shows a comma-delimited character string for the sake of convenience. The content data management table is assured on the database 109 managed by the content server 103. Each record identifier in the content data management table is used to associate with actual content data, and is also used as the management number of content data. The arrangement order of record identifiers in the content data management table, i.e., the storage order in an array which normally starts from index 0, is the same as the order of records which are transmitted from the content server 103 to the layout server 105, and are merged with the template in the layout server 105.

The "Layout Error String" field 2604 stores character strings of layout error information received from the layout server 105. The "Date and Time" field 2605 stores information of dates and times of layout errors received from the layout server 105 as information of the layout error occurrence times.

As described above, error summary information that summarizes errors is generated in the format of RSS data which has link information to template data and content data associated with errors together with information indicating a summary of layout errors that have occurred.

<Generation of RSS Data (Type 1)>

FIG. 28 shows an example of RSS data "LayoutErrorList.rss" of type 1 generated in step S2504 in FIG. 25. This example uses a description in RSS1.0, but may use other feed formats such as other versions of RSS, Atom, and the like.

Referring to FIG. 28, reference numeral 2801 denotes a declaration field of an XML document. Reference numeral 2802 denotes document elements of an RDF nominal space. As the RSS1.0 bylaws, the RDF element must include one channel element and one or more item elements. Reference numeral 2803 denotes a channel element; and 2810, 2814, and 2818, item elements. The channel element 2803 describes basic information of this channel which feeds summary information. An about attribute of the channel element 2803 indicates information of the URI of this RSS itself. A title element 2804 of the channel element 2803 describes title information of this channel. Likewise, a link information 2805 describes URI information of an object to be summarized of this channel. Also, a description element 2806 describes briefing information of this channel. In the example of FIG. 28, the URI of this channel is http://www.canon.com/iwBS/5DWF506/LayoutErrorList.rss. The title of this channel is "Recent Layout Error". The URI of the object to be summarized of this channel is http://www.canon.com/iwBS/5DWF506/LayoutErrorList.html. The briefing information of this channel is "Recent Layout Error List".

An items element 2807 provides indices of the item element groups 2810, 2814, and 2818, and "li" elements 2809 listed in the contents of a "Seq" element 2808 indicate respective update information URIs. The item elements 2810, 2814, and 2818 respectively include title elements 2811, 2815, and 2819, link elements 2812, 2816, and 2820, and description elements 2813, 2817, and 2821 as in the channel element 2803.

Figure 30A:
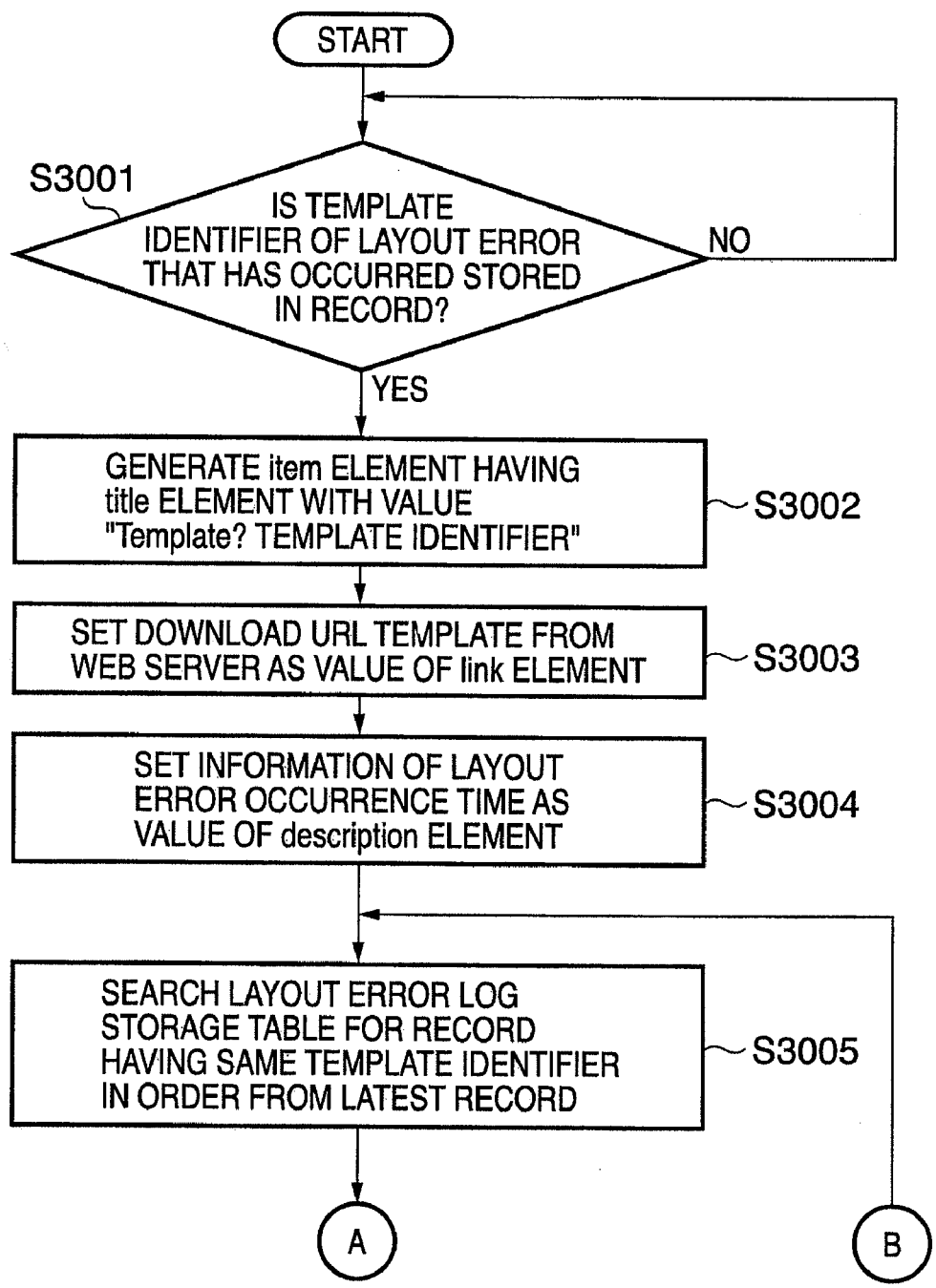
FIGS. 30A to 30B are operation flowcharts upon forming the RSS data of type 1 of the content server according to the present invention.
Figure 30B:
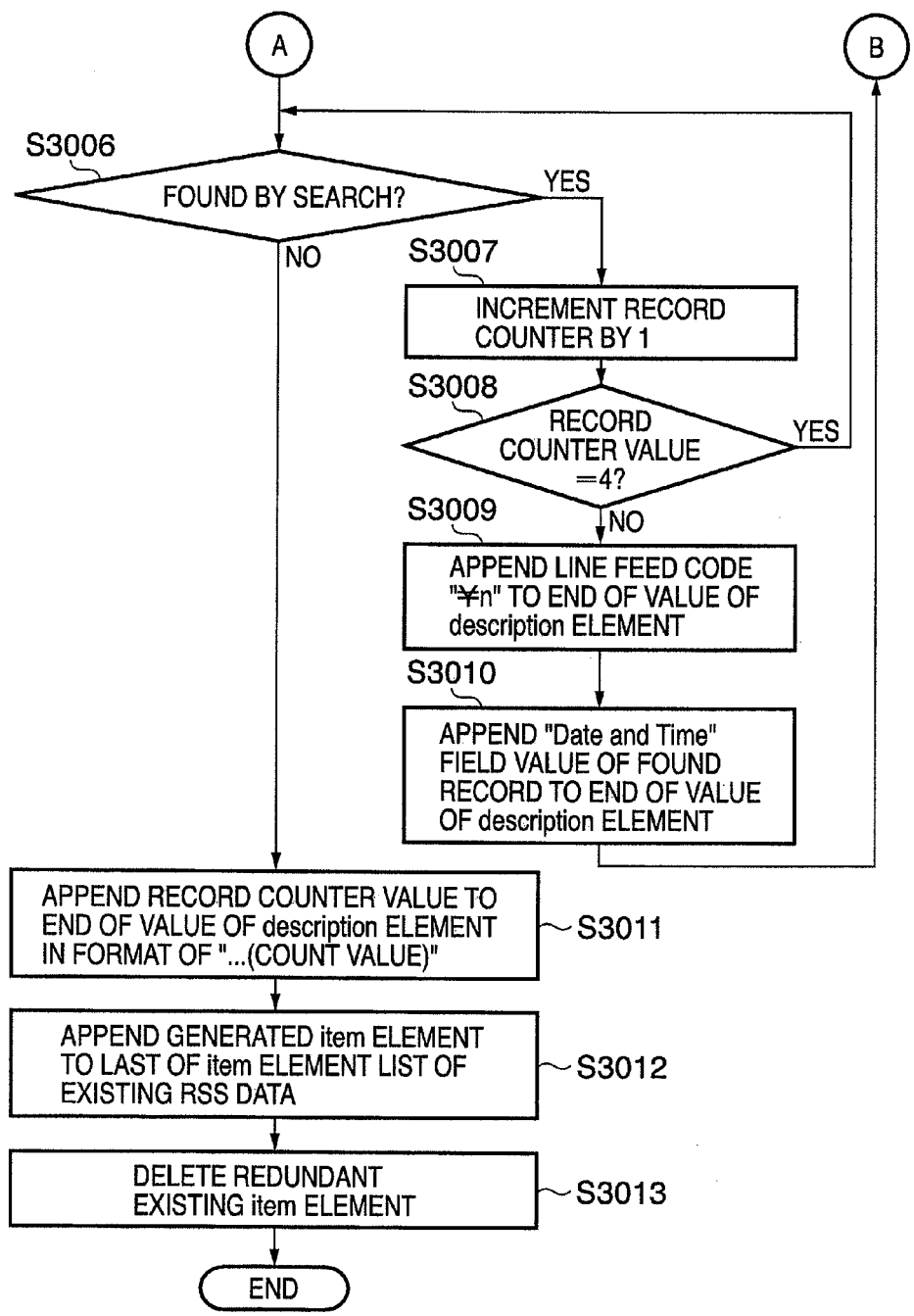

FIGS. 30A and 30B are flowcharts showing the operation upon forming RSS data "LayoutErrorList.rss" of type 1 shown in FIG. 29. That is, FIGS. 30A and 30B show details of step S2504 in FIG. 25.

As shown in FIG. 25, the content server 103 creates a new record in the layout error log storage table 2601 in the database 119. The content server 103 stores information of layout errors that have occurred, the identifier of a template used, and the record identifiers of content data in that record. If it is determined that a new record is stored in the layout error log storage table 2601 (S3001), the content server 103 generates an item element 2810 in which a title element 2811 has a value in the format of "Error Template—template identifier" (S3002). For example, if the template identifier is "MITU-MORI", the content server 103 generates the item element in which the title element 2811 has a value "Template—MITU-MORI", as shown in FIG. 28. The content server 103 sets a download URL "http://www.canon.com/iwBS/5DWF506/Template/MITUMORI.dle" as a value of a link element 2812 (S3003). The content server 103 sets, as a value of a description element 2813, information "2005/10/18 13:48:23.785" of the layout error occurrence time stored in the "Date and Time" field 2605 (S3004). Furthermore, the content server 103 searches in turn from the latest record in the layout error log storage table 2601 for a record which has the same identifier as that of the template in which layout errors have occurred (S3005). If a record having the same identifier is found by search (YES in S3006), the content server 103 increments an identical record counter by 1 (S3007). If the record counter value is "1" as an initial value, it is incremented to "2". The content server 103 checks if the record counter value is "4" (S3008). If the record counter value is not "4", the content server 103 appends a line feed code "¥n" after the value "2005/10/18 13:48:23.785" set as the value of the description element 2813 by the above sequence (S3009). After that, the content server 103 appends the value of the "Date and Time" field 2605 of the found record to the value of the description element 2813 like "2005/10/18 13:48:23.785¥n 2005/10/18 12:38:44.008" (S3010). The content server 103 continues to conduct the next search (S3005).

If the record counter is "4" in step S3008, the content server 103 quits appending of the "Date and Time" field value of the found record to the description element 2813, and starts the next search. The record counter becomes "4" when the "Date and Time" fields of the latest three records are set as the values of the description element 2813.

If no more record having the same identifier is found (NO in S3006), the content server 103 appends the number of counted records like " . . . (12)" together with a character string " . . . (",")" to the values of the description element 2813 (S3011).

As a result, the description element 2813 has values "2005/10/18 13:48:23.785¥n "2005/10/18 12:38:44.008¥n 2005/10/18 09:13:14.865 . . . (12)".

If existing RSS data "LayoutErrorList.rss" that has already been uploaded to the Web server 106 is available, the content server 103 appends the generated item element 2810 to the end of an item element list of that data (S3012). Furthermore, if that RSS data includes a redundant existing item element, the content server 103 deletes that item element (S3013). Note that if no existing RSS data "LayoutErrorList.rss" is available, new RSS data is created in a step before step S3012.

<Generation of RSS Data (Type 2)>

RSS data "LayoutErrorList-MITUMORI.rss" of type 2 shown in FIG. 29 is as follows. This example uses a description in RSS1.0, but may use other feed formats such as other versions of RSS, Atom, and the like.

Referring to FIG. 29, reference numeral 2901 denotes a declaration field of an XML document. Reference numeral 2902 denotes document elements of an RDF nominal space. As the RSS1.0 bylaws, the RDF element must include one channel element and one or more item elements. Reference numeral 2903 denotes a channel element; and 2910, 2914, and 2918, item elements.

The channel element 2903 describes basic information of this channel which feeds summary information. An about attribute of the channel element 2903 indicates information of the URI of this RSS itself. A title element 2904 of the channel element 2903 describes title information of this channel. Likewise, a link information 2905 describes URI information of an object to be summarized of this channel. Also, a description element 2906 describes briefing information of this channel. In the example of FIG. 29, the URI of this channel is http://www.canon.com/iwBS/5DWF506/LayoutErrorList-MITUMORI.rss. The title of this channel is "Recent Layout Error—MITUMORI". The URI of the object to be summarized of this channel is "http://www.canon.com/iwBS/5DWF506/LayoutErrorList—MITUMORI.html". The briefing information of this channel is "Recent Layout Error List—MITUMORI".

An items element 2907 provides indices of the item element groups 2910, 2914, and 2918, and li elements 2909 listed in the contents of a Seq element 2908 indicate respective update information URIs. The item elements 2910, 2914, and 2918 respectively include title elements 2911, 2915, and 2919, link elements 2912, 2916, and 2920, and description elements 2913, 2917, and 2921 as in the channel element 2903.

Figure 31:
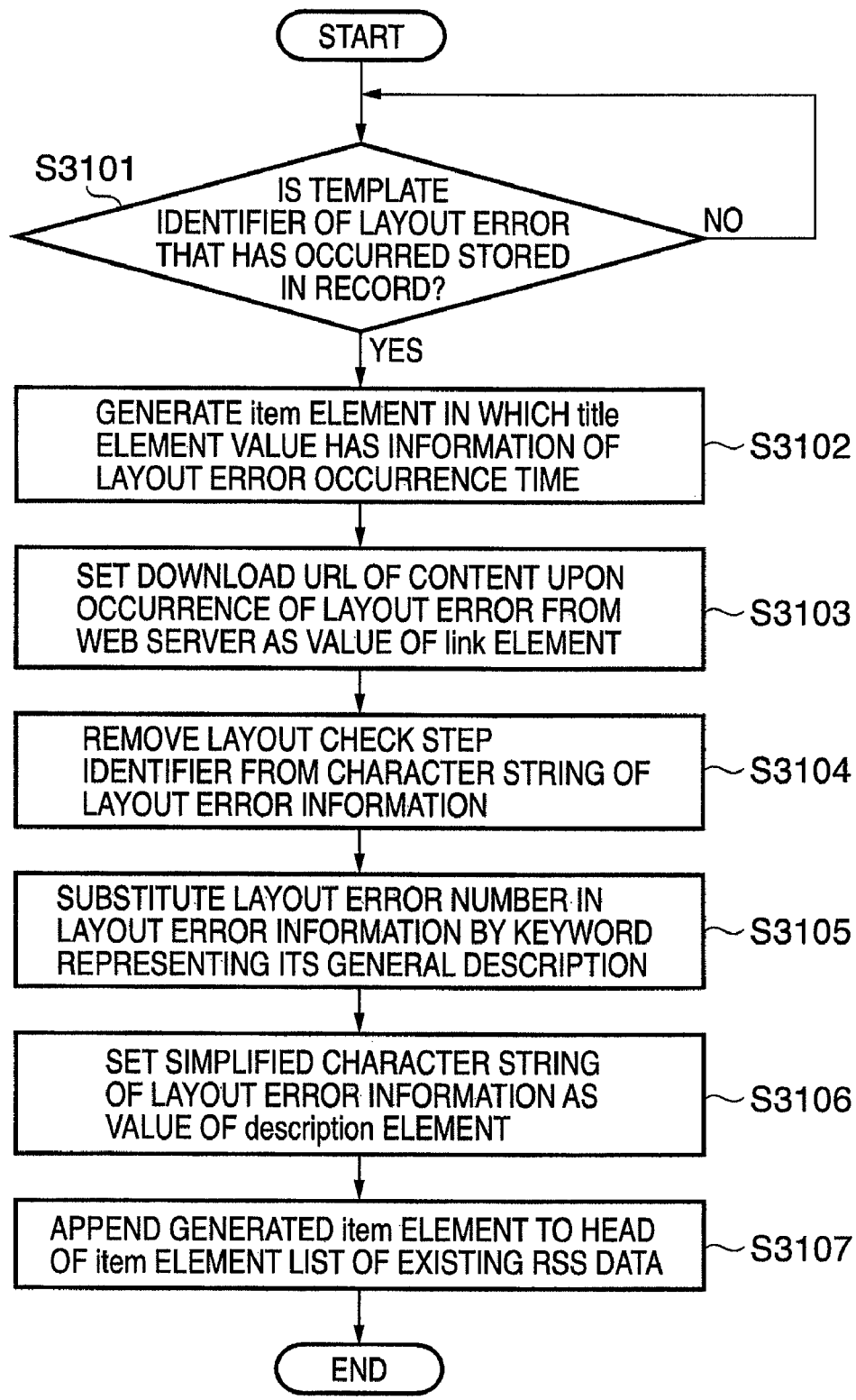
FIG. 31 is an operation flowchart upon forming the RSS data of type 2 of the content server according to the present invention.

FIG. 31 is a flowchart showing the operation upon forming RSS data "LayoutErrorList-MITUMORI.rss" of type 2 shown in FIG. 29. As shown in FIG. 25, the content server 103 creates a new record in the layout error log storage table 2601 in the database 119. The content server 103 stores information of layout errors that have occurred, the identifier of a template used, and the record identifiers of content data in that record. If the new record is stored (YES in S3101), the content server 103 generates an item element 2910 in which the value of a title element 2911 has information of the layout error occurrence time (S3102). For example, assume that a layout error has occurred at time "2005/10/17 03:12:21.009" during the layout processing using a template with the template identifier "MITUMORI". In this case, the content server 103 generates the item element in which the title element 2911 has a value "2005/10/17 03:12:21.009", as shown in FIG. 29.

The content server 103 sets, as a value of a link element 2912, a URL "http://www.canon.com/iwBS/5DWF506/Data/MITUMORI-20051017 031221009.zip" required to download the content upon occurrence of the layout error from the Web server (S3103). The content server 103 reads out the character string of the layout error information stored in the "Layout Error String" field 2604 onto the memory 206, and removes the aforementioned layout check step identifiers (S3104). The layout check step identifiers indicate processing steps in which errors have been detected, and include Pre-Print, Print-Page#n, and Post-Print.

Next, the content server 103 substitutes layout error numbers to keywords indicating general descriptions such as "TEXT_OVERFLOW" based on correspondence between the layout error numbers and their general descriptions shown in FIG. 27 (S3105). Furthermore, for the sake of simplicity, when the number of layout error numbers exceeds three, the content server 103 appends the number of layout errors like " . . . (8)" together with "" . . . (",")". The content server 103 sets a character string "TEXT_OVERFLOW IMAGE_OVERFLOW MINMAX_CONT_SIZE . . . (8)" obtained in this manner on the memory as the value of the description element 2913 (S3106).

If existing RSS data "LayoutErrorList-MITUMORI.rss" that has already been uploaded to the Web server 106 is available, the content server 103 appends the generated item element 2910 to the head of an item element list of that data (S3107).

Note that if no existing RSS data "LayoutErrorList-MITUMORI.rss" is available, new RSS data is created in a step before step S3105. Also, in this embodiment, syndication data is created for each timing at which a layout error has occurred, but it may be created at given time intervals.

<Access to Syndication Data from Web Browser>

Figure 32:
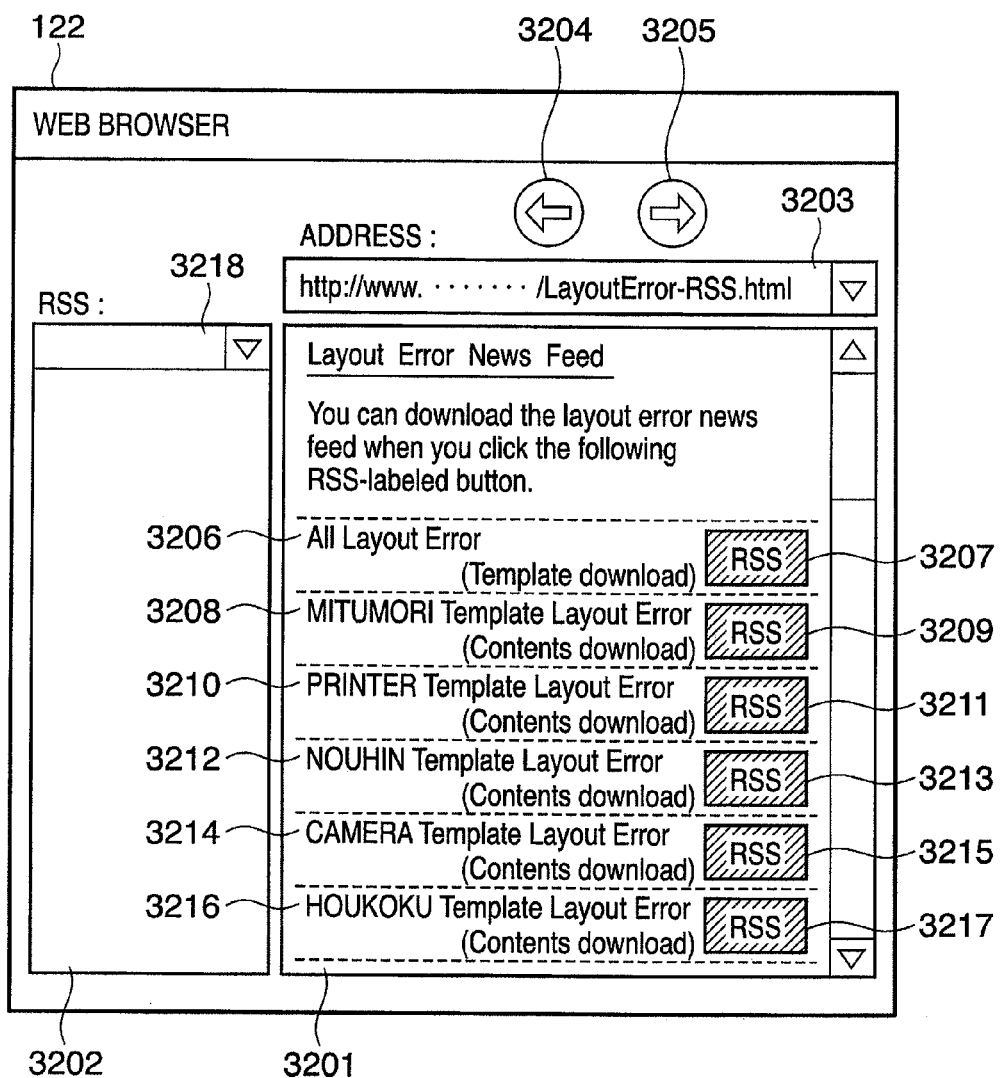
FIG. 32 shows a display window of a RSS feed download page according to the present invention.

FIG. 32 shows a window that displays a Web page "http://www.canon.com/iwBS/5DWF506/LayoutError-RSS.html" used to download an RSS feed by the Web browser 122 of the administrator client 101.

Referring to FIG. 32, a display window 3201 displays a Web page. A list display area 3202 displayed by an RSS reader built in the Web browser (to be simply referred to as an RSS reader 3202 hereinafter) displays an RSS feed. An address bar 3203 displays the URI of the currently displayed page. Upon pressing of a "back" button 3204, a page displayed immediately before the current page is displayed. Upon pressing of a "next" button 3205, a page displayed immediately after the current page is displayed. Buttons 3207, 3209, 3211, 3213, 3215, and 3217 are RSS feed download buttons. If one of these buttons is pressed, the corresponding RSS data is downloaded. Labels 3206, 3208, 3210, 3212, 3214, and 3216 are those of the respective RSS feed download buttons. A bar 3218 is an RSS channel switching bar.

Upon pressing of the RSS feed download button 3207 on the display window of the Web page, RSS data "LayoutErrorList.rss" of type 1 formed in the flowcharts of FIGS. 30A and 30B is downloaded from the Web server 106 to the Web browser 122. RSS data to be downloaded in the mechanism of RSS is called syndication data, and download of the syndication data is called an RSS feed. The syndication data is also called an RSS feed in some cases. Likewise, upon pressing of the RSS feed download button 3209, RSS data "LayoutErrorList-MITUMORI.rss" of type 2 formed in the flowchart of FIG. 31 is downloaded from the Web server 106 as syndication data, and is RSS-fed. The URIs required to identify these syndication data are stored in the RSS channel switching pull-down list box 3218 as links.

The RSS feed data downloaded from the Web server 106 to the Web browser 122 is passed to the RSS reader 3202, which displays information.

Figure 33:
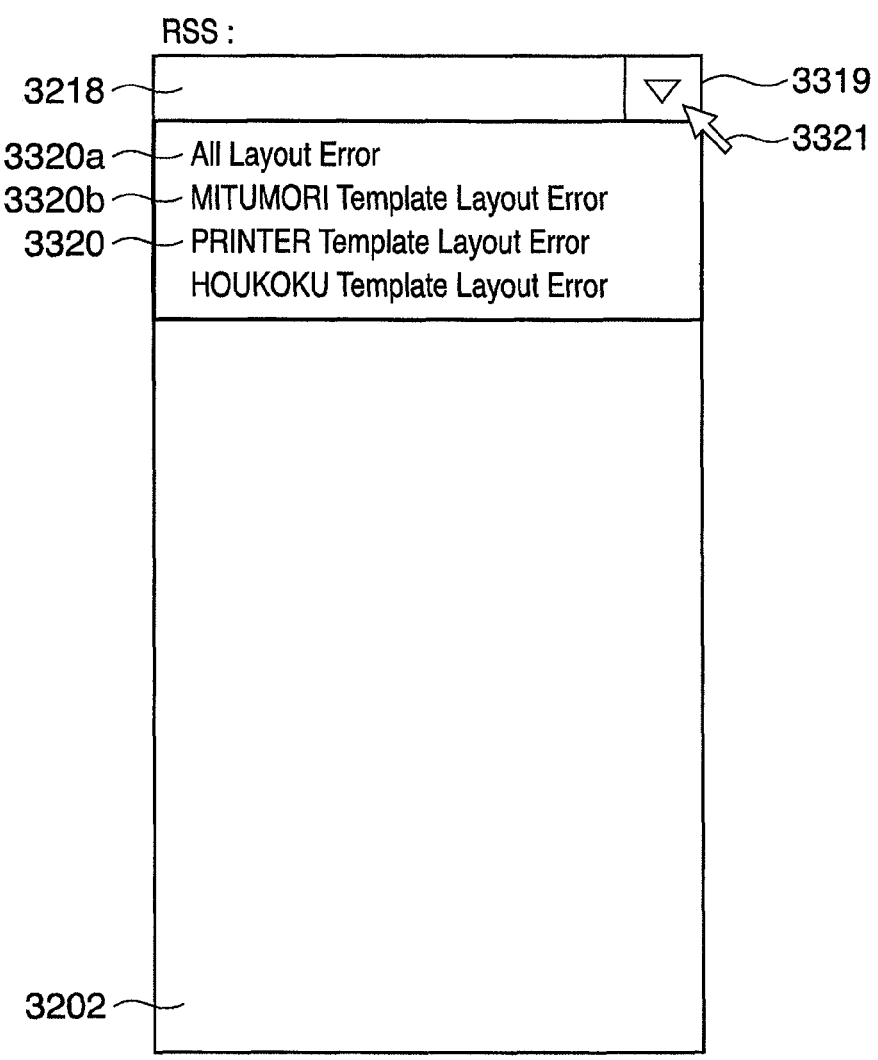
FIG. 33 shows a list display window of an RSS channel switching pull-down list box on a Web browser according to the present invention.

FIG. 33 shows a list display of links stored in the RSS channel switching pull-down list box 3218 of the Web browser 122. When the user presses a pull-down button 3319 using a mouse pointer 3321, the pull-down box 3218 is developed to display a list box 3320. In FIG. 33, the list box 3320 lists the identifiers of URI links of syndication data.

FIG. 33 shows an example in which the RSS channel switching pull-down list box 3218 displays a list of some identifiers of channels, i.e., RSS feeds. In FIG. 33, an identifier "All Layout Error" 3320a is a URI link to syndication data "LayoutErrorList-MITUMORI.rss" on the Web server 106. An identifier "MITUMORI Template Layout Error" 3320b is a URI link to syndication data "LayoutErrorList-MITUMORI.rss" on the Web server 106. Similarly, other identifiers are also embedded with links to syndication data on the server, and when the user selects and designates the identifier, data at the link destination is downloaded. The identifier is downloaded as, e.g., a part of syndication data.

<Use of Layout Error Log Syndication in Client>

Figure 34:
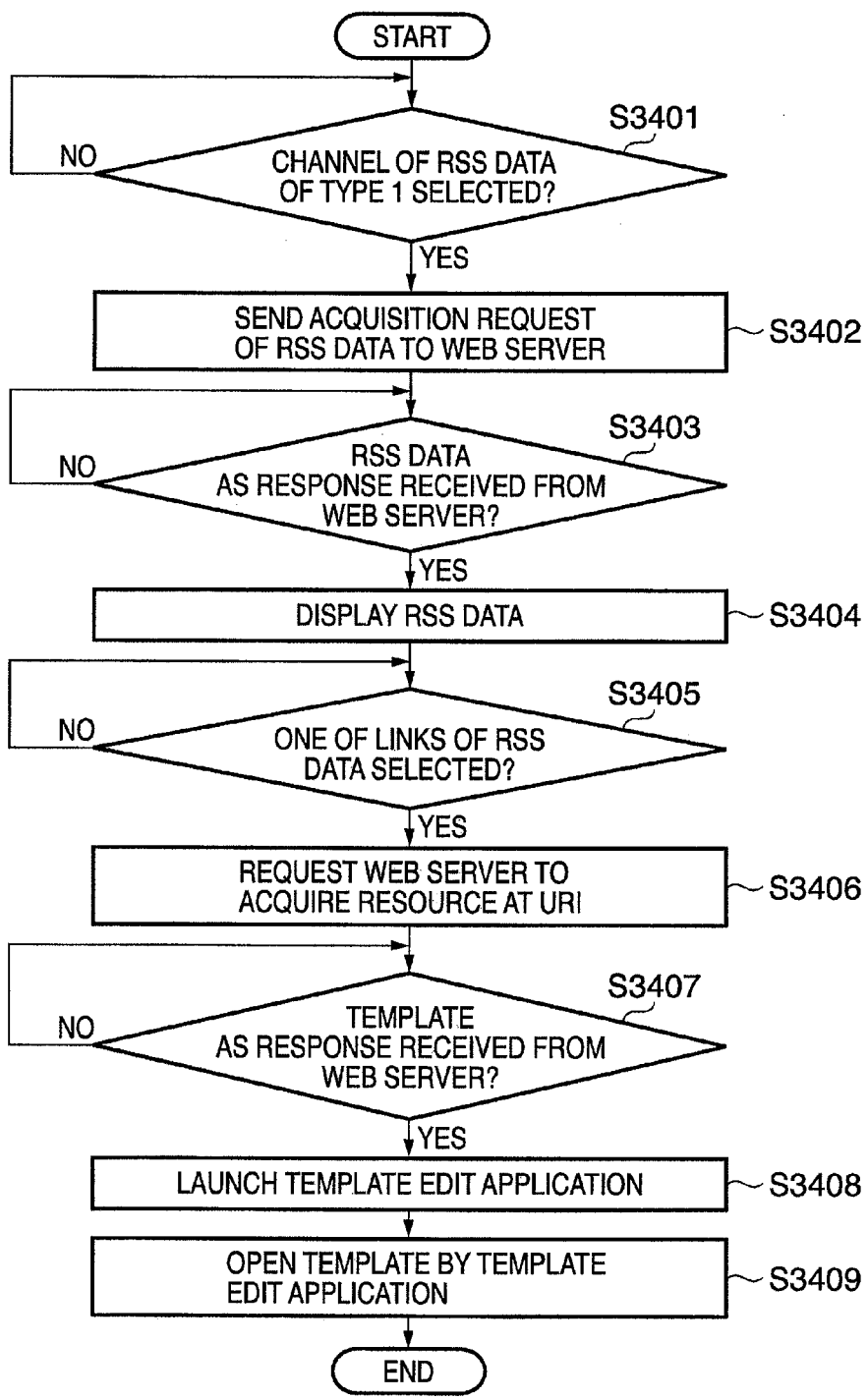
FIG. 34 is an operation flowchart of template download processing upon using layout error log syndication of an administrator client according to the present invention.

FIG. 34 is a flowchart showing an example of the template download operation upon using layout error log syndication at the administrator client 101. FIG. 34 shows an example of the processing executed when the user of the administrator client 101 selects a feed of "All Layout Error" as RSS data of type 1 from the RSS channel switching pull-down list box 3218 of the Web browser 122. Hence, it is checked in step S3401 if the user selects RSS data of type 1. If the user selects RSS data of type 1, the RSS reader 3202 of the Web browser 122 sends an HTTP acquisition request to the Web server 106 (S3402), and receives a response of syndication data "LayoutErrorList.rss" from the Web server 106 (S3403). Upon reception of the response data of an RSS feed as syndication data, the RSS 3202 displays the RSS data (S3404).

Figure 35:
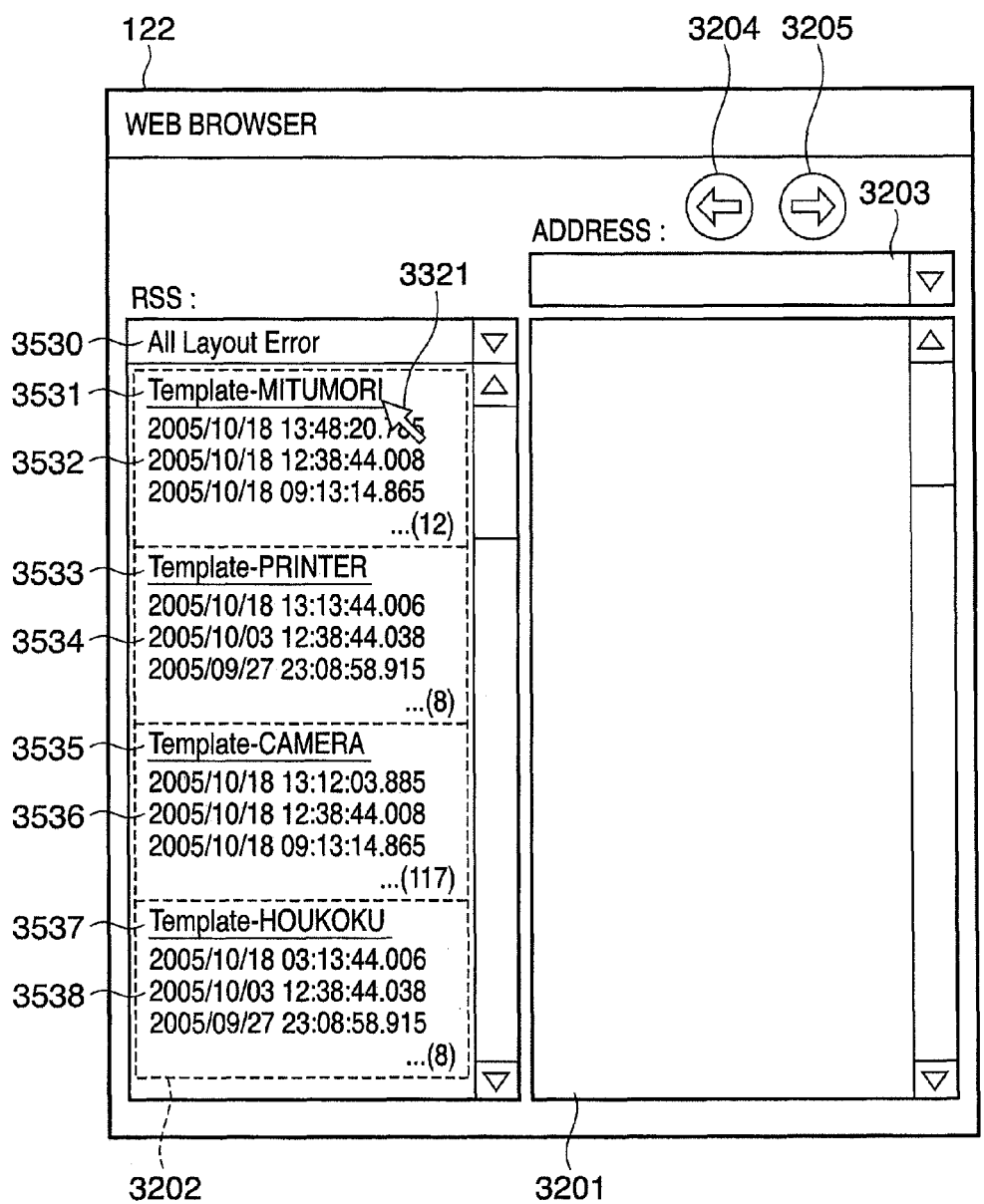
FIG. 35 shows a display window of an RSS feed of type 1 by an RSS reader of the administrator client according to the present invention.

FIG. 35 shows a window that displays the RSS feed data "LayoutErrorList.rss" of type 1 by the RSS reader 3202 of the Web browser 122 in the administrator client 101. Character strings 3531, 3533, 3535, and 3537 are hyperlinks. Each character string indicates a template associated with errors that have occurred. In FIG. 35, if the user selects one of the hyperlinks using the mouse pointer 3321 (YES in S3405), the RSS reader 3202 requests the Web serer 106 to acquire the resource at that URI via the Web browser 122 (S3406). The Web browser 122 receives a template (template data) as the link destination of the hyperlink as a response from the Web server 106. Upon reception of the template at the link destination (YES in S3407), the Web browser 122 launches the template edit application 121 to open that template (S3408). The Web browser 122 passes that template to the template edit application 121, which opens the template (S3409).

Figure 36:
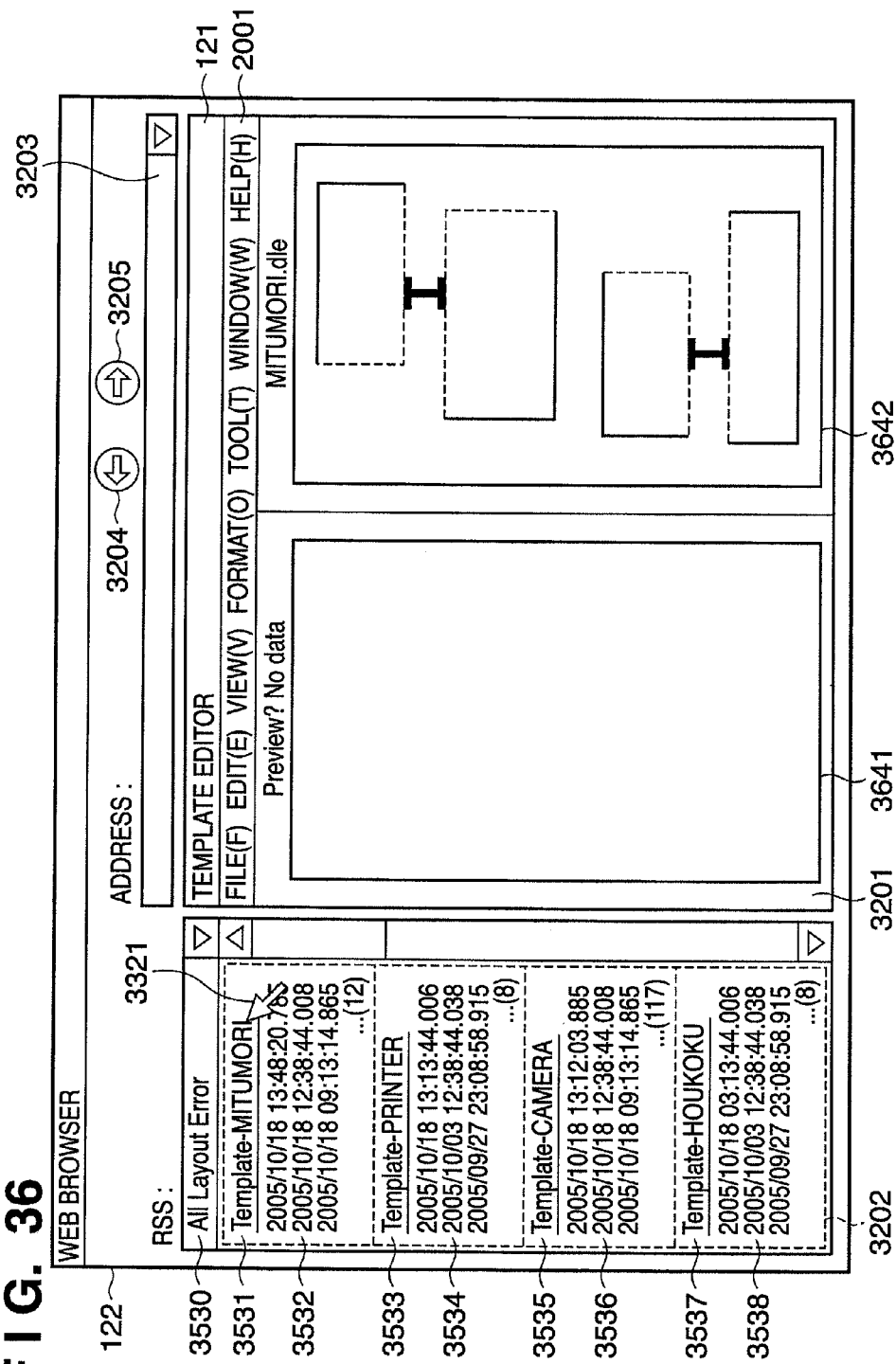
FIG. 36 shows a template display window of the template edit application, which is inline-displayed on the Web browser of the administrator client according to the present invention.

FIG. 36 shows an example of a display window of the template by the template edit application 121, which is inline-displayed on the Web browser 122 of the administrator client 101. In FIG. 36, a template display/edit pane 3642 displays a template "MITUMORI.dle", which is ready to be edited by the user. In the example of FIG. 36, since content data to be merged with the template "MITUMORI.dle" is not designated yet, a preview display pane 3641 displays a blank page. Note that the template is edited within the pane 3642 in this example. However, an edit window provided by the template edit application 121 may be used to edit the template.

Figure 37:
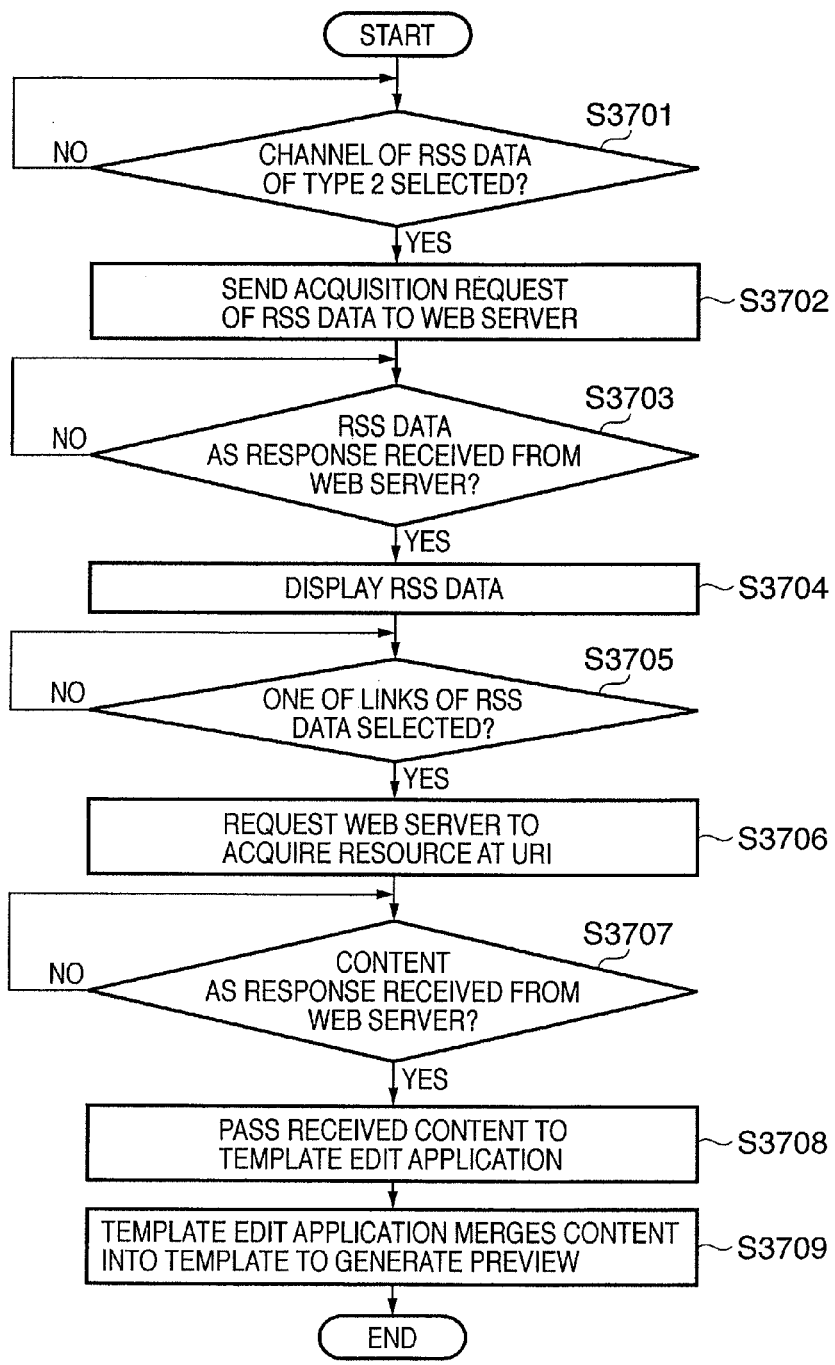
FIG. 37 is an operation flowchart of content download processing upon using layout error log syndication of the administrator client according to the present invention.

FIG. 37 is a flowchart showing the content download operation upon using layout error log syndication at the administrator client 101. FIG. 37 shows an example when the user of the administrator client 101 selects a feed of RSS data "MITUMORI Template Layout Error" of type 2, corresponding to the template which is currently inline-displayed on the Web browser 122 and is undergoing the edit processing by the template edit application, from the RSS channel switching pull-down list box 3218 of the Web browser 122. Hence, it is checked in step S3701 if the user selects RSS data of type 2. If the user selects a feed of type 2 (YES in S3701), the RSS reader 3202 of the Web browser 122 sends an HTTP acquisition request to the Web server 106 (S3702). In response to the request, the RSS reader 3202 receives a response "LayoutErrorList-MITUMORI.rss" as syndication data from the Web server 106 (S3703). Upon reception of the response data of an RSS feed as syndication data, the RSS reader 3202 displays the RSS data (S3704).

Figure 38:
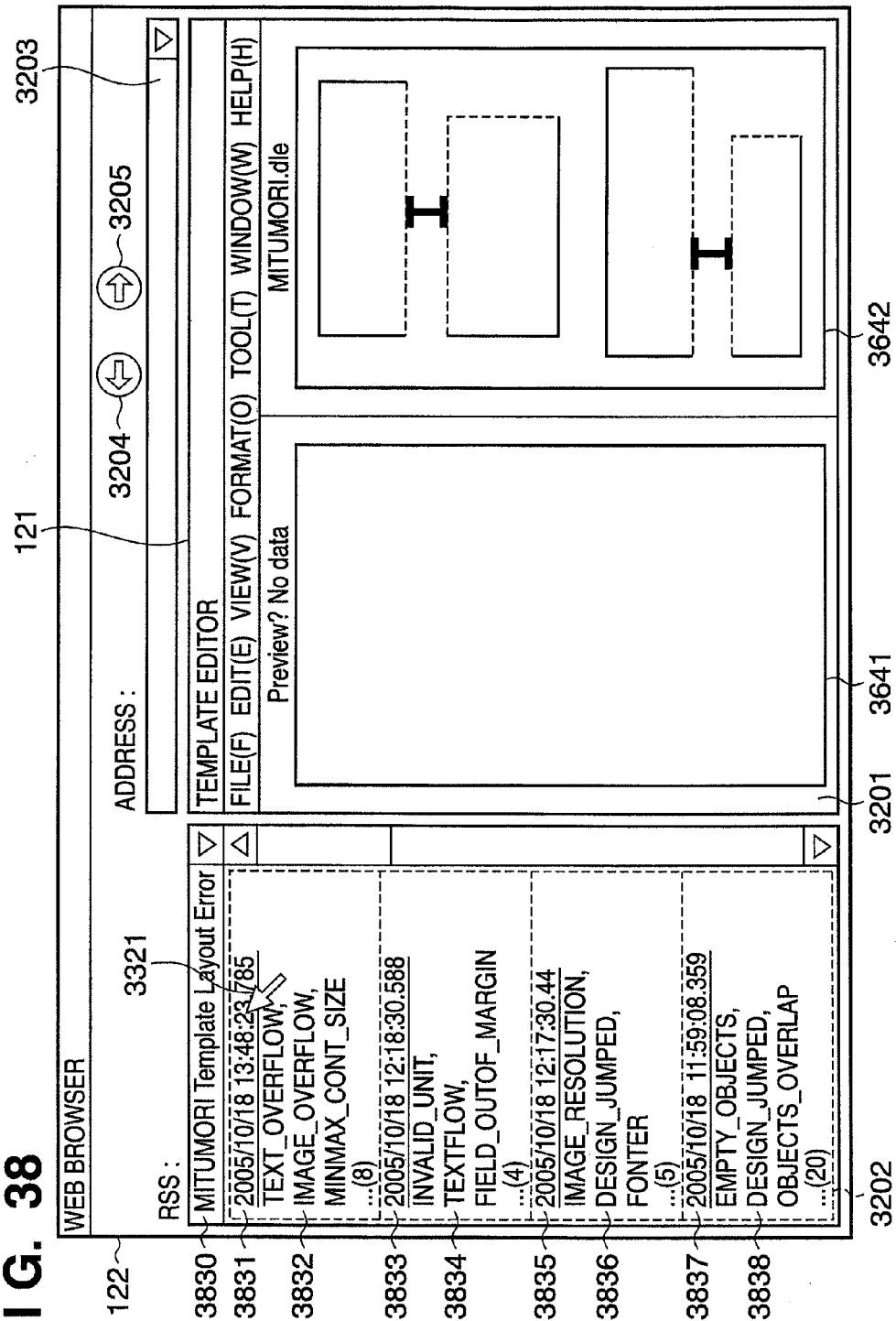
FIG. 38 shows a display window of an RSS feed of type 2 by an RSS reader of the administrator client according to the present invention.

FIG. 38 shows a screen that displays the RSS feed data "LayoutErrorList-MITUMORI.rss" of type 2 by the RSS reader 3202 of the Web browser 122 in the administrator client 101 in step S3704. Character strings 3831, 3833, 3835, and 3837 are hyperlinks. Each character string corresponds to error information associated with the template represented by the "MITUMORI Template Layout Error". In FIG. 38, the user can select one of the character strings (hyperlinks) 3831, 3833, 3835, and 3837.

Hence, it is checked in step S3705 in FIG. 37 which of the hyperlinks the user selects using the mouse pointer 3321. If the user selects one of these hyperlinks (YES in S3705), the RSS reader 3202 requests the Web server 106 to acquire the resource at that URI via the Web browser 122 (S3706). If the Web browser 122 receives content data as the link destination of the hyperlink from the Web server 106 (YES in S3707), it passes the received content data to the template edit application 121 (S3708). The template edit application 121 merges the content data with the template to generate a preview (S3709). That is, the template edit application 121 lays out the content data in a page to generate a preview image of that page.

Figure 39:
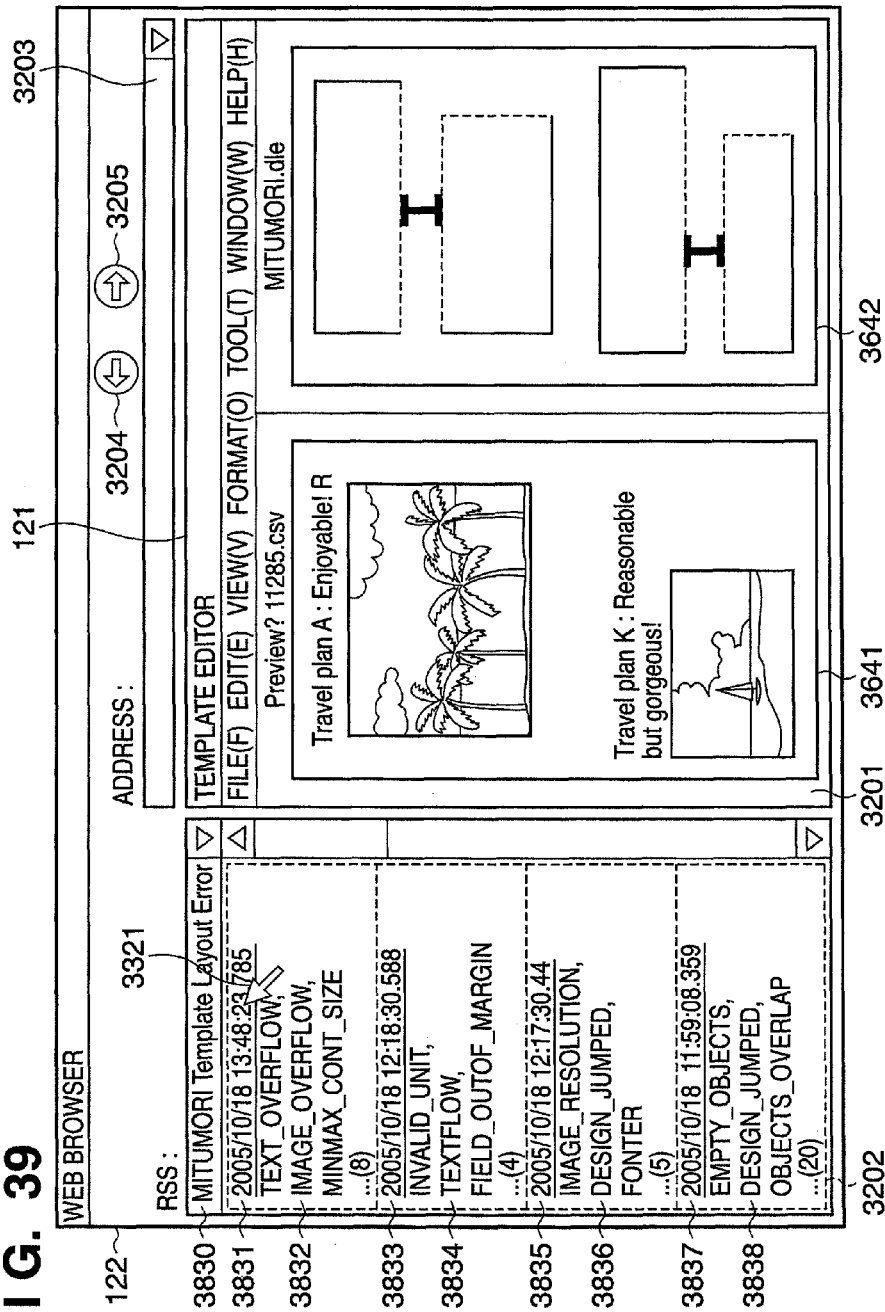
FIG. 39 shows a preview display window by the template edit application of the Web browser according to the present invention.

FIG. 39 shows a preview display window by the template edit application 121 of the Web browser 122. A preview display pane 3941 displays a preview of the result obtained by merging the content data into the template "MITUMORI.dle" and laying it out.

Figure 40:
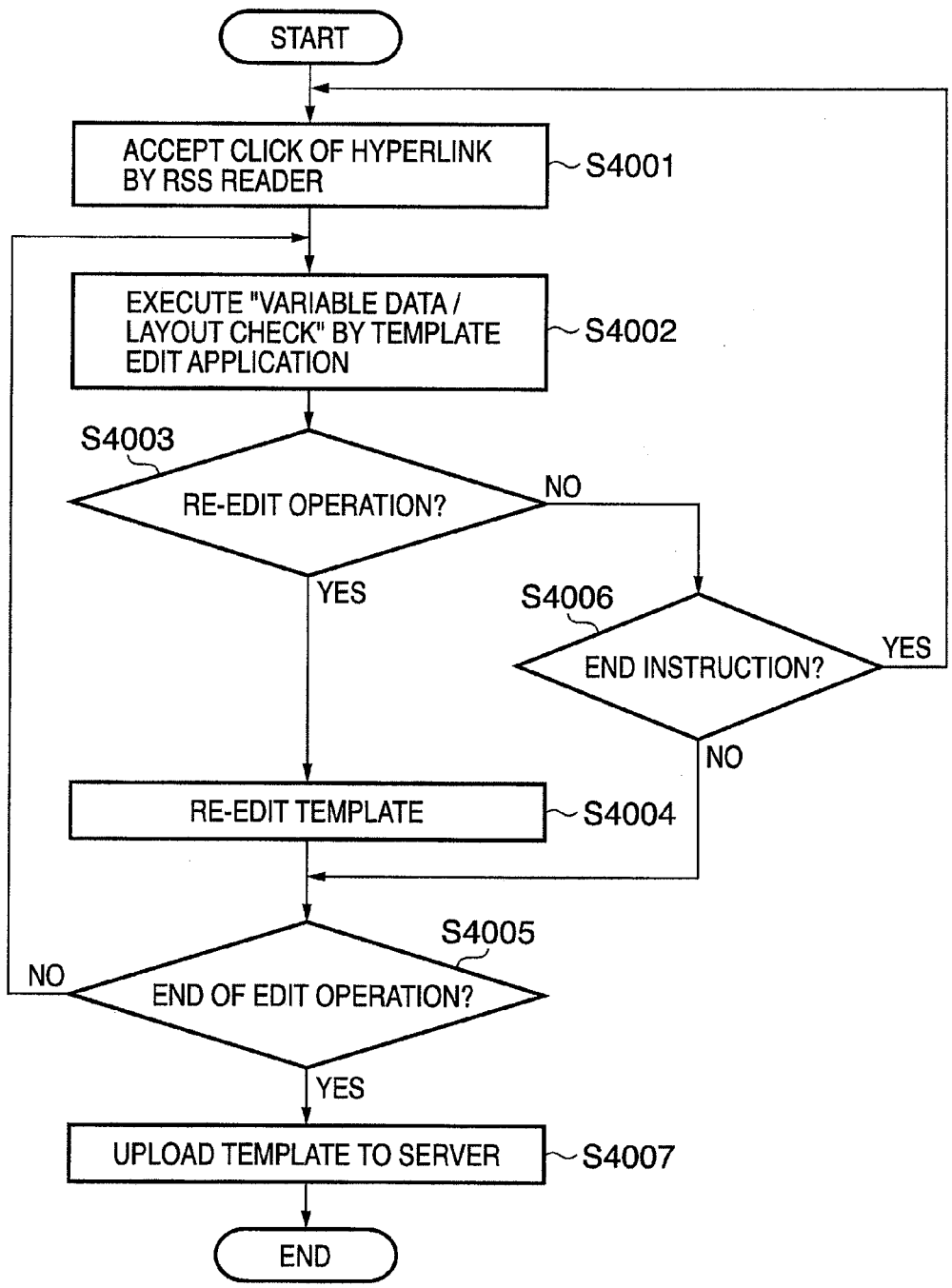
FIG. 40 is an operation flowchart of layout error correction processing and upload processing to a server of a template using the RSS reader and template edit application of the administrator client according to the present invention.

FIG. 40 is a flowchart of the layout error correction operation of a certain template and upload operation to the server using the RSS reader 3202 of the Web browser 122 and template edit application 121 in the administrator client 101 by the user. That is, FIG. 40 shows user's decisions and operations, and the processing contents according to the operations. The user can click one of the hyperlinks of "MITUMORI Template Layout Error" by the RSS reader 3202 of the Web browser 122 in the administrator client 101. More specifically, the user can select and click information associated with a desired error from a list of errors indicated by the title "MITUMORI Template Layout Error". The title is given in association with the template associated with errors or all the errors.

If the user clicks one of the hyperlinks (S4001), content data that has caused an error in the template "MITU-MORI.dle" whose editing is underway is downloaded, and is laid out in accordance with the template to obtain a preview of the layout result. The user can select the menu item "variable data/layout check (C) . . . " 2002 from the menu bar 2001 of the template edit application 121. Upon selection of the layout check processing, the variable data/layout check processing starts to obtain the check result (S4002). The user determines if the check result displayed on the "variable data/layout check" dialog 2201 includes errors which are not allowable for the user. If errors which are not allowable for the user are included, the user instructs a re-edit operation of the template. Upon starting the re-edit operation (YES in S4003), the user re-edits the template by changing the sizes, variable settings, and the like of containers on the template while observing the layout result including errors. The template is changed according to the re-edit operation (S4004). Furthermore, the user performs the variable data/layout check operation, and changes the template until no error occurs or errors are allowable.

After the user changes the template until no error occurs or errors are allowable, if he or she does not quit the re-edit operation, the user clicks another one of the hyperlinks on the RSS reader 3202 of the Web browser 122 in the administrator client 101 (NO in S4003, and YES in S4006). As a result, another content data is downloaded. The user then repeats the layout check operation and re-edit operation of the template. Finally, upon completion of the re-edit operations, since the user issues a save instruction (YES in S4005), the edited template is updated to the server (S4007). The save instruction is issued when the user selects a menu item "save (S) . . . " from the menu bar 2001 of the template edit application 121.

Also, the user can select "All Layout Error" from the RSS channel switching pull-down list box 3218, and can click another hyperlink such as "PRINTER Template Layout Error" or the like from the "LayoutErrorList.rss" displayed on the RSS reader. In this case, another template "Printer.dle" or the like is downloaded in response to that operation. The template edit application 121 opens the downloaded template. Furthermore, when the user selects "PRINTER Template Layout Error" or the like from the RSS channel switching pull-down list box 3218, content data is downloaded in response to that operation. Then, the user starts the edit operation of another template.

Figure 41:
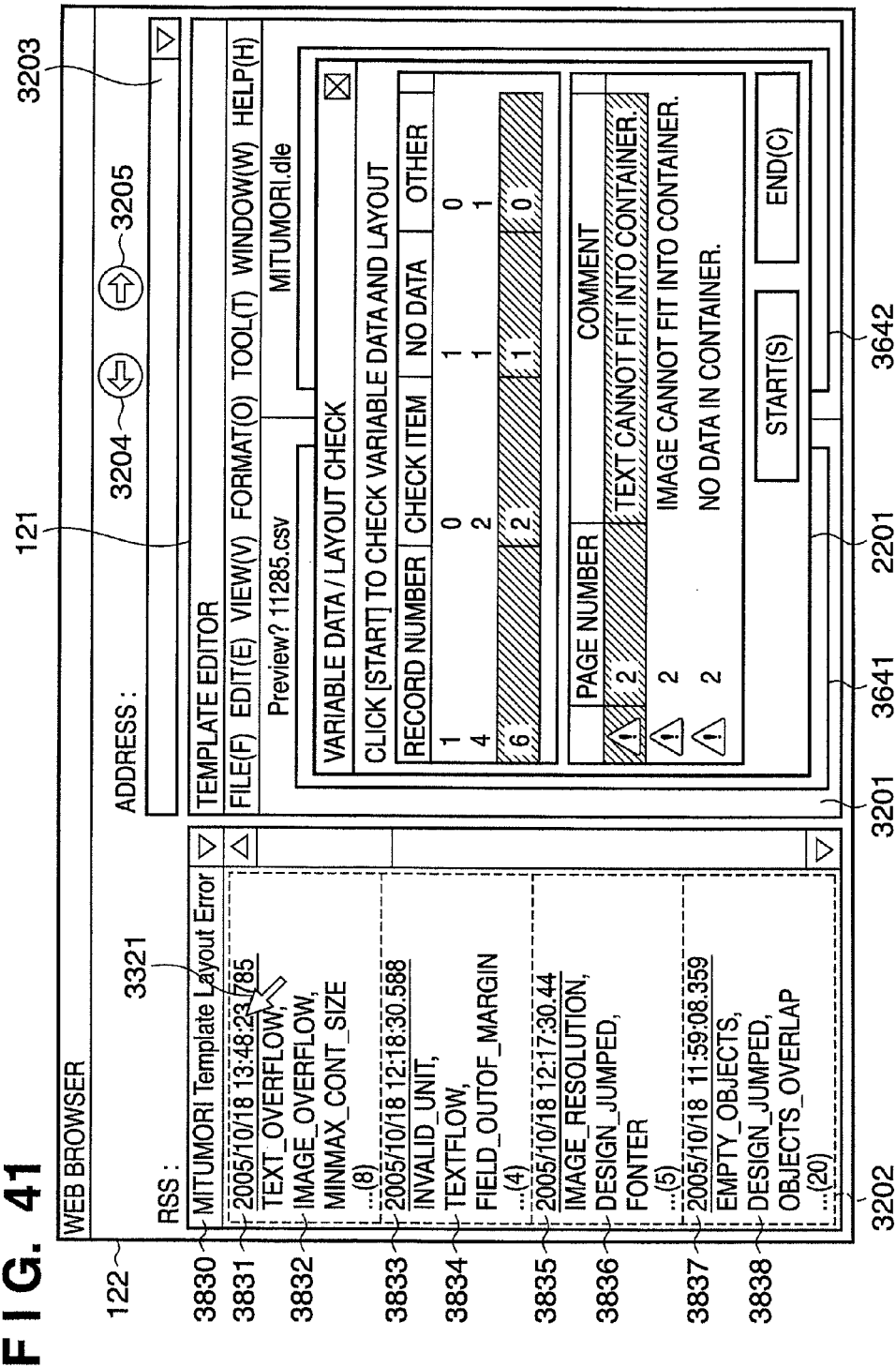
FIG. 41 shows a display window of a "variable data/layout check" dialog by the template edit application of the Web browser according to the present invention.

FIG. 41 shows a display window of the "variable data/layout check" dialog 2201 of the template edit application 121 on the Web browser 122, which corresponds to the operation result in step S4002 in FIG. 40.

Figure 42:
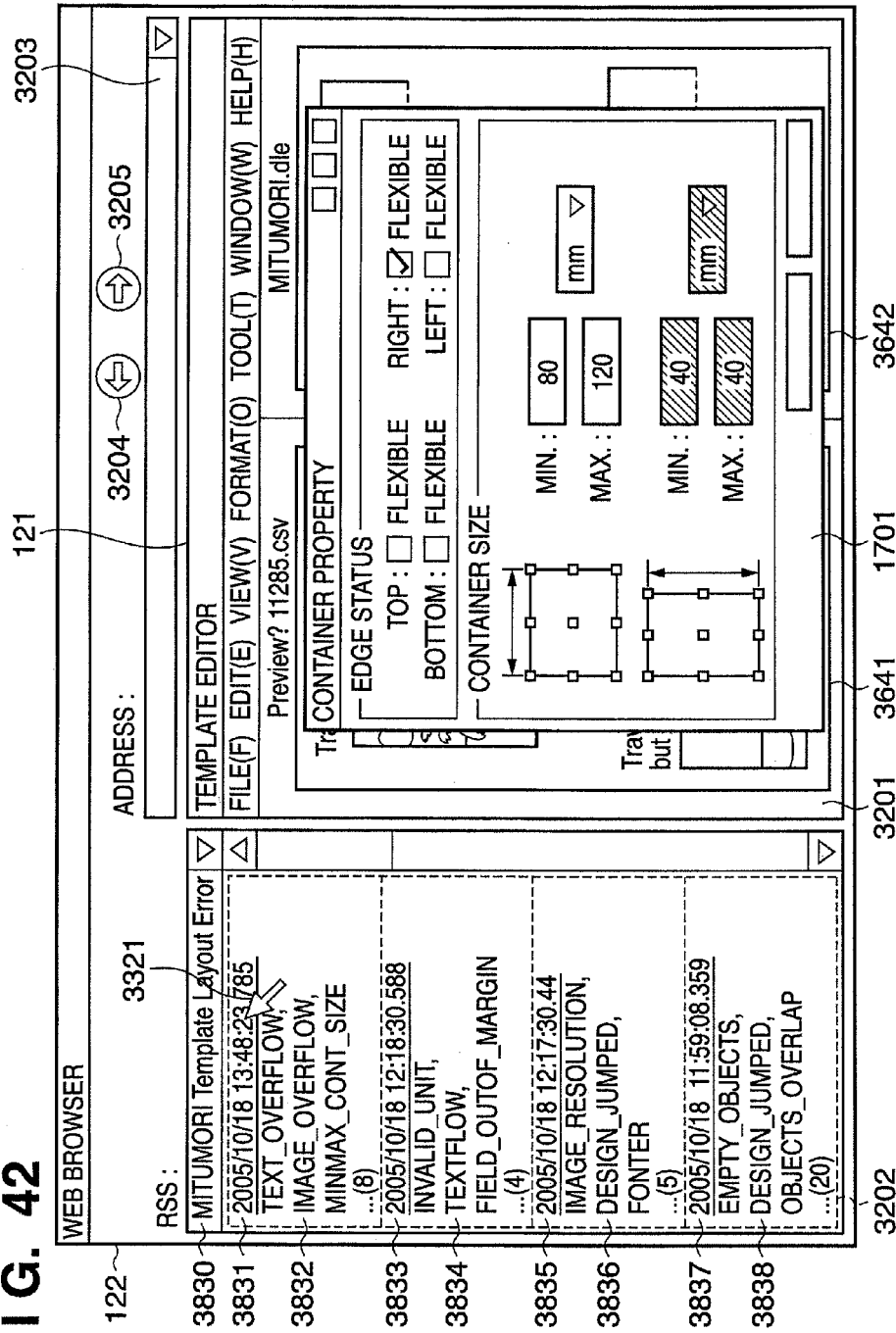
FIG. 42 shows a display window on which the properties of a container are being changed by the template edit application of the Web browser according to the present invention.

FIG. 42 shows a display window on which the properties of a container are being changed by the template edit operation 121 on the Web browser 122, the operation of which is made in step S4004 in FIG. 40.

Figure 43:
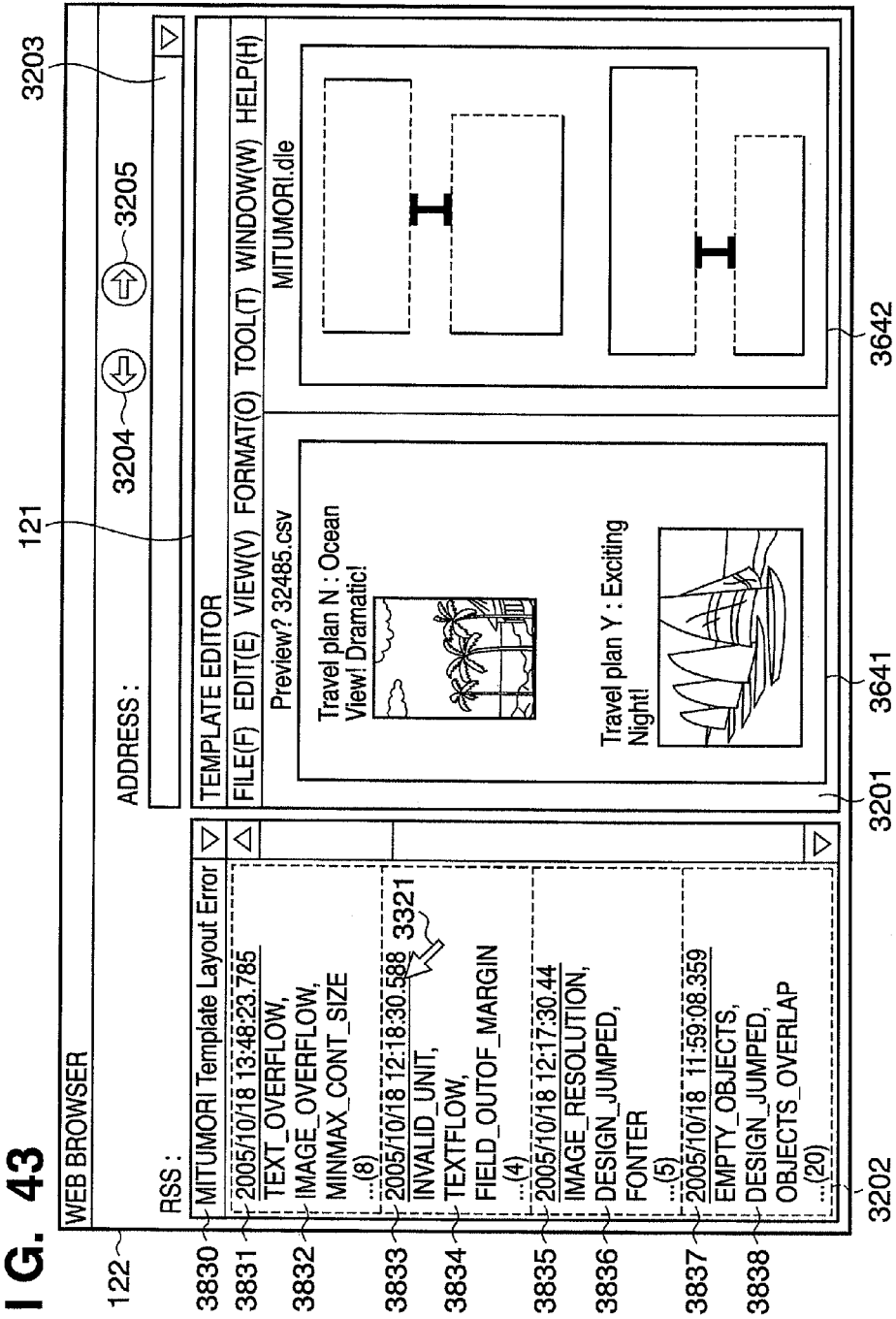
FIG. 43 shows a preview display window of another content by the template edit application of the Web browser according to the present invention.

FIG. 43 shows a preview display window of another content data by the template edit application 121 of the Web browser 122, the operation of which is made in step S4006→step S4001 in FIG. 40.

Figure 44:
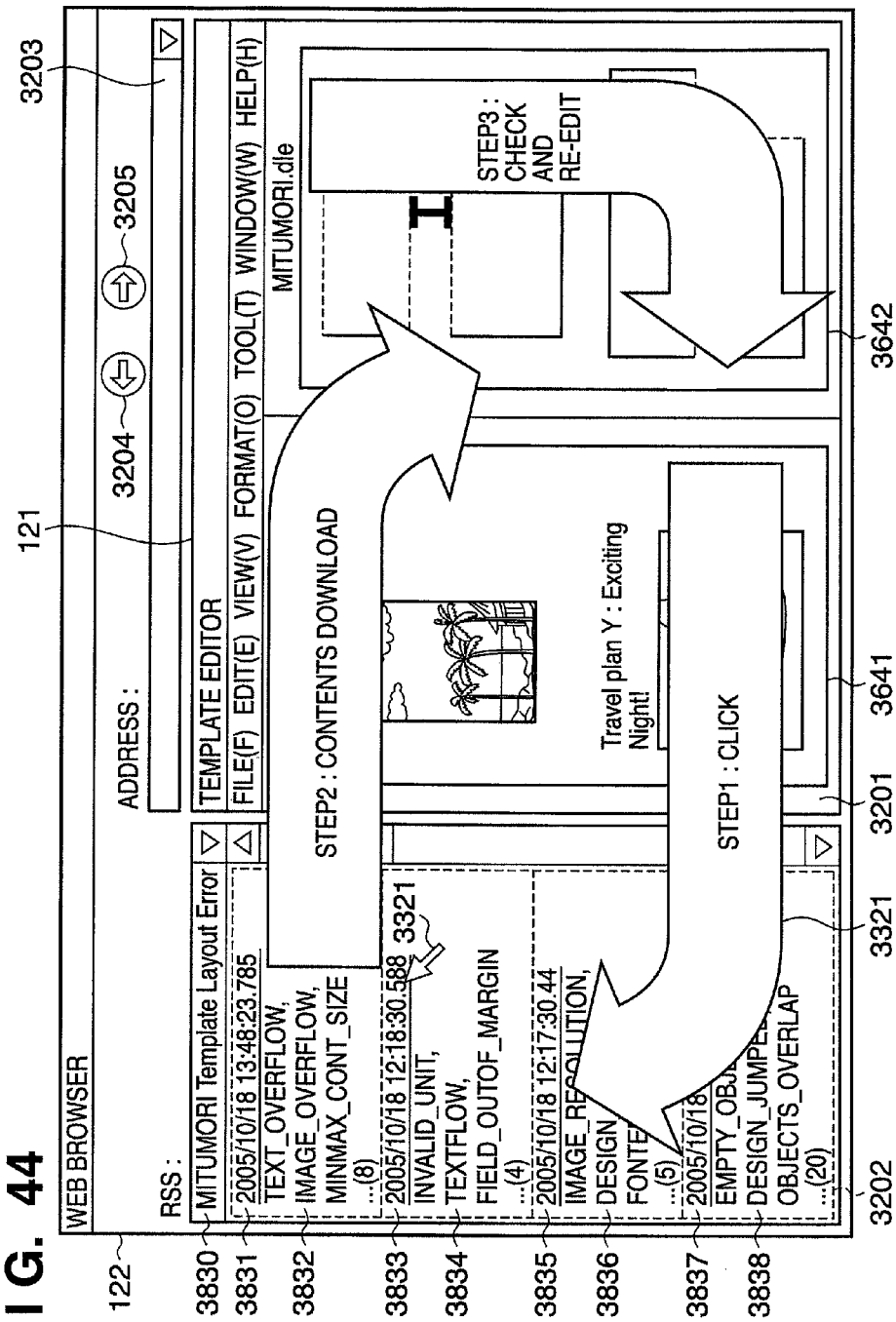
FIG. 44 is a view showing the concept of operations by the template edit application of the Web browser according to the present invention.

FIG. 44 is a view showing the concept of operations in steps S4001 to S4006 in FIG. 40. Referring to FIG. 44, when the user selects a character string with a hyperlink from the display area 3202 (STEP 1), data at a destination designated by that link is downloaded (STEP 2). The layout operation is made using that data on a trial basis, and the template is edited as needed (STEP 3).

Note that during display of RSS data such as "LayoutErrorList.rss", "LayoutErrorList-MITUMORI.rss", or the like on the RSS reader 3202 of the Web browser 122 in the administrator client 101, the RSS data which is being displayed may be updated on the server side. For example, the RSS data which is being displayed may be updated on the server side by the operation upon storing the layout error log in the content server 103 shown in FIG. 25. In this case, in terms of the characteristics of the RSS data, the Web server 106 sends new RSS data, and the RSS reader 3202 updates the data display by the newly received data.

<Layout Error Content Transmission to Client in Server>

Figure 45:
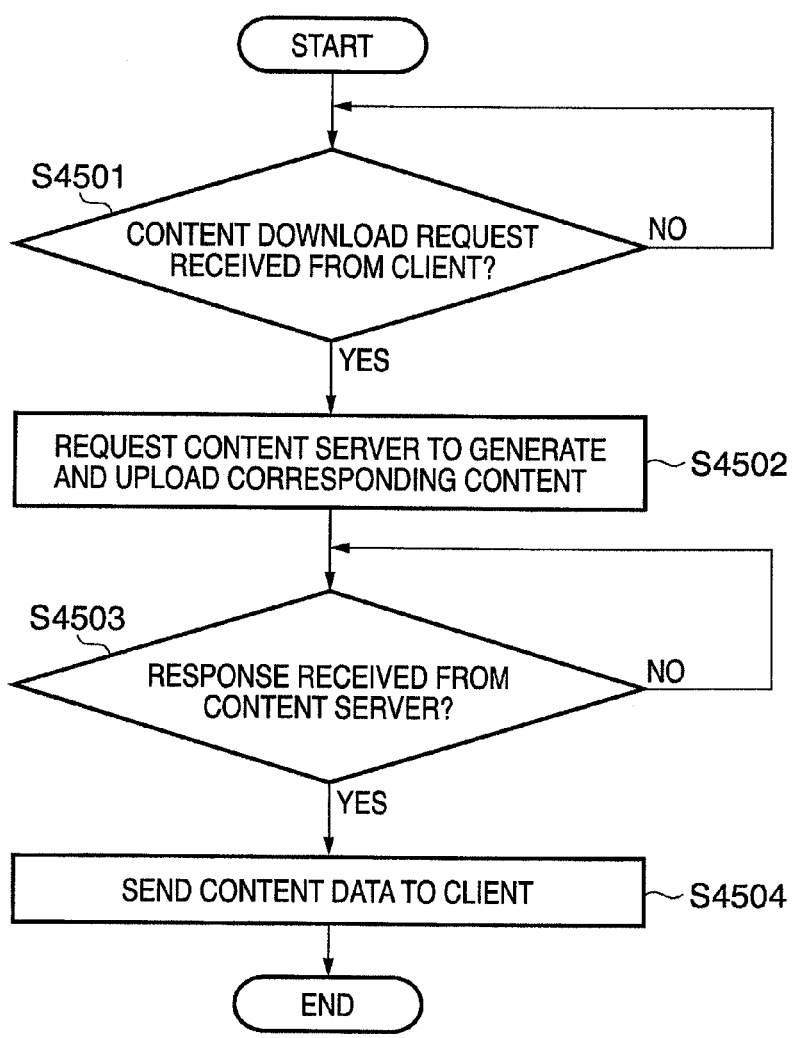
FIG. 45 is an operation flowchart of content transmission processing of a Web server according to the present invention.

FIG. 45 is a flowchart showing the content transmission operation by the Web server 106 corresponding to the content download operation upon using layout error syndication at the administrator client 101 in FIG. 37.

The Web server 106 can receive, from a client, an acquisition request to the content download URL such as "http://www.canon.com/iwBS/5DWF506/Data/MITUMORI-20051017 031221.009.zip" or the like. Upon reception of the request (YES in S4501), the Web server 106 requests the content server 103 to create and upload the corresponding content data (S4502). Upon reception of the corresponding content file uploaded to the Web server 106 as a response from the content server 103 (S4503), the Web server 106 sends the file data to the client (S4504), thus ending the processing.

Figure 46:
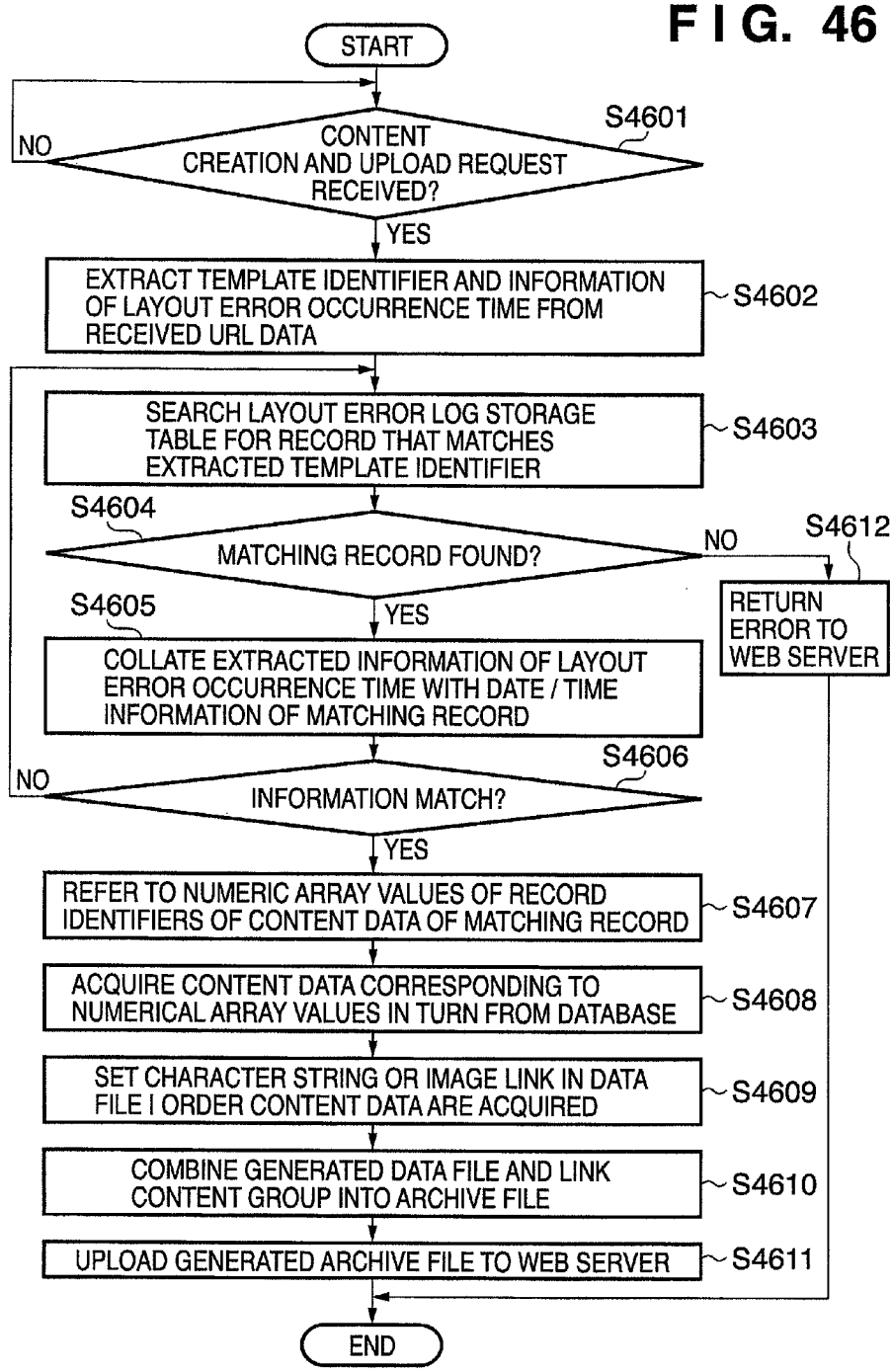
FIG. 46 is an operation flowchart of processing upon reception of a content creation & upload request of the content server according to the present invention.

FIG. 46 is a flowchart showing the operation of the content server 103 upon reception of the content creation and upload request from the Web server 106. The content server 103 receives a content creation and upload request together with data "http://www.canon.com/iwBS/5DWF506/Data/MITU- MORI-20051017 031221.009.zip" at the content download URL from the Web server 106. Upon reception of the request (YES in S4601), the content server 103 extracts the template identifier "MITUMORI" and information "2005/10/17 03:12:21.009" of the layout error occurrence time from the data of that URL character string (S4602).

The content server 103 searches the layout error log storage table 2601 for a record which has the same value of the "Template ID" field 2602 based on the extracted template identifier "MITUMORI" (S4603). If a match is found (YES in S4604), the content server 103 collates if the date/time information in the "Date and Time" field of that record matches the extracted information "2005/10/17 03:12:21.009" of the layout error occurrence time (S4605). If they do not match (NO in S4606), the content server 103 searches for another record which has the same value of the "Template ID" field 2602. If such record is found, the content server 103 collates if the date/time information in the "Date and Time" field of that record matches the extracted information of the layout error occurrence time. If no record having the same values is found (NO in S4604), the content server 103 returns an error to the Web server 106 (S4612). If a record having both the same values is found (YES in S4606), the content server 103 refers to the value of the "Contents Record IDs string" field 2603, i.e., a content identifier array of that record (S4607). The content server 103 acquires record data of contents corresponding to the values of elements in that numeric array, e.g., identifiers "200", "113", "31", "42938", "3187", "98", . . . in turn from the content data management table in the database 109 (S4608). The content server 103 additionally stores the identifiers of the content data in one data file "11285.csv" in the order they are acquired (S4609). The content server 103 combines the finally generated data file and a content group to be referred to from the data file into one archive file "MITUMORI-20051017 031221.009.zip" (S4610). The content server 103 uploads the generated archive file to the Web server 106 as the request source (S4611), thus ending the processing.

Note that the generated data file and content group to be referred to from the data file bring the same result as that stored in the corresponding record of the layout error log storage table 2601 by the preflight upon layout when the corresponding content group is merged with the corresponding template based on the order set in that data file.

The generated data file "11285.csv" has a format like a file 4701 in FIG. 47. When the field data of a record in the content data management table is a character string, that character string is stored in the data file. When field data is an image file name, a link to that image file is stored in the data file. The same applies to another data file 4702. The archive file "MITUMORI-20051017 031221009.zip" in the above example is a file of a general PK-ZIP format.

As described above, according to this embodiment, errors which have occurred in the layout server upon so-called automatic layout or variable printing can be delivered to the client using the RSS feed technique. For this reason, the client can acquire information indicating occurrence of errors, and link information to related data without requiring the user to always monitor them. Since the link information to the related template data and content data is obtained, attempts to reproduce errors can be easily made. The template can be edited to be free from any errors with reference to errors which have occurred as a result of the attempts. The edited template can be updated to the server again to execute variable printing again. It is desired to execute the re-edit operation of the template upon preflight inspection. However, the re-edit operation of the template may be made in an actual operation.

Other Embodiments

Note that syndication by means of an RSS feed prepares syndication data (RSS data) having a given format in a server (e.g., a Web server). A client (RSS reader) which knows information of the location of the RSS data accesses the server upon occurrence of a predetermined event, and acquires newer information than the currently acquired data if it is available. The predetermined event includes that upon launching the RSS reader, that upon an elapse of a predetermined period of time (i.e., periodic), and the like. That is, syndication of data indicates delivery and distribution of data from the server to the client. Of course, syndication can be implemented not only by RSS1.0 which is currently put into practical use but also RSS of all currently valid versions and that of versions which will be put into practical use in future. Also, syndication can be implemented using atom or by delivery of XML meta data of similar kinds (which can be used for syndication).

Error monitoring using an RSS feed is not limited to automatic layout or variable printing. For example, in a Web service, an application server executes processing requested by the client. This embodiment is applied to deliver status information indicating processing status such as errors or the like upon processing, and information indicating occurrence of errors and link information to data associated with the errors are sent as an RSS feed to the administrator client terminal. As in this embodiment, the administrator client reproduces errors, edits programs and data that have caused the errors, and executes processing again.

In this manner, the administrator can acquire information associated with errors which have occurred in a remote server, and a remote client can take measures to eliminate the errors.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). The objects of the present invention are also achieved by supplying a storage medium, which records a program code of a software program that can implement the functions of the above-mentioned embodiments to the system or apparatus, and reading out and executing the program code stored in the storage medium by a computer of the system or apparatus. In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code. Furthermore, the functions of the above-mentioned embodiments may be implemented by some or all of actual processing operations executed by a CPU or the like arranged in a function expansion board or a function expansion unit, which is inserted in or connected to the computer, after the program code read out from the storage medium is written in a memory of the expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-104716, filed Apr. 5, 2006, which is hereby incorporated by reference herein in its entirety.

What is claimed is:

1. An information providing method that generates and provides information to be delivered to a client having a Resource Description Framework Site Summary ("RSS") reader, the method comprising steps of:
    layout processing of content data acquired from a content server in accordance with template data;
    checking for a cause of a layout error when the layout error has occurred in said layout processing step, identifying one or more templates that have caused the layout error to occur, and storing one or more identifiers of the one or more templates in a memory;
    generating RSS data based on a result of the layout error, and uploading the RSS data to an information providing server, wherein the RSS data includes one or more Uniform Resource Locators ("URLs") corresponding to the stored one or more templates;
    providing requested data to the client when the client has requested the data in accordance with the one or more URLs included in the RSS data provided to the client, wherein the client downloads the one or more templates based on the one or more URLs, edits the one or more templates using a template editing application installed in the client, and uploads one or more edited templates that do not cause the layout error; and
    storing the one or more edited templates uploaded by the client,
    wherein at least one of the above steps is performed, at least in part, by a computer processor.

2. A server system that generates information to be delivered to a client having a Resource Description Framework Site Summary ("RSS") reader, the system comprising:
    a memory and a processor, said processor configured to function as:
        a layout unit that performs layout processing of content data acquired from a content server, in accordance with template data;
        a check unit that checks for a cause of a layout error when the layout error has occurred in the layout processing by said layout unit, wherein said check unit identifies one or more templates that have caused the layout error to occur and one or more contents in which the layout error has occurred, and stores one or more identifiers of the one or more templates and one or more identifiers of the one or more contents in the memory;
        an information providing unit; and
        an RSS data distribution unit that generates two types of RSS data based on a result of the layout error checked for by said check unit, and uploads the RSS data to said information providing unit,
    wherein the RSS data of the first type includes the one or more identifiers of the one or more templates that have caused the layout error, in a title element in an item element in the RSS data of the first type, and link information to the stored one or more templates, in a link element associated with the title element of the RSS data of the first type, and wherein the RSS data of the second type includes, for each of the one or more templates identified by said check unit, a date and a time of an occurrence of the layout error, in a title element in an item element in the RSS data of the second type, and link information to the stored content data applied to the one or more templates that have caused the layout error, in a link element associated with the title element of the RSS data of the second type,
    wherein said information providing unit provides requested data to the client when the client has requested the data in accordance with the link information included in one or more of the link elements included in the RSS data provided to the client,
    wherein the client downloads the one or more templates based on the link information, edits the one or more templates using a template editing application installed in the client, and uploads one or more edited templates that do not cause the layout error, and
    wherein the memory stores the one or more edited templates uploaded by the client.

3. The system according to claim 2, wherein when one of a text overflow which occurs when text data cannot be fit into a frame included in a template, an image overflow which occurs when image data cannot be fit into the frame included in the template, and a container error which occurs when there is no content data to be fit into the frame has occurred, said RSS data distribution unit generates the RSS data and uploads the RSS data to said information providing unit.

4. The server system according to claim 2, wherein the server system is incorporated into an automatic layout system that includes said client,
    wherein said client includes a control unit that controls an RSS reader for displaying the RSS data provided from said information providing unit,
    wherein said RSS reader receives the RSS data of the first type, displays the link information based on the link element in the item element in the RSS data of the first type, and receives the one or more templates from said server system in response to a selection of the displayed link information when a channel of the RSS data of the first type is selected,
    wherein said RSS reader receives the RSS data of the second type, displays the link information based on the one or more link elements in the one or more item elements in the RSS data of the second type, and receives the content data from said server system in response to a selection of the displayed link information when a channel of the RSS data of the second type is selected, and
    wherein said control unit activates the template editing application installed in said client that edits the received one or more templates when the one or more templates are received by said RSS reader, and causes the template editing application to display a preview of the received content data when the content data is received by said RSS reader.

* * * * *